(12) United States Patent
Shinozaki et al.

(10) Patent No.: US 6,630,559 B2
(45) Date of Patent: Oct. 7, 2003

(54) PROPYLENE POLYMER, PROPYLENE BLOCK COPOLYMER, PROCESS FOR PREPARING SAID POLYMER AND SAID BLOCK COPOLYMER, AND PROPYLENE POLYMER COMPOSITION

(75) Inventors: Tetsunori Shinozaki, Waki-cho (JP); Kazumitsu Kawakita, Waki-cho (JP); Mamoru Kioka, Waki-cho (JP)

(73) Assignee: Mitsui Chismicans, Inc., Tokyo (JP)

( * ) Notice: Subject to any disclaimer, the term of this patent is extended or adjusted under 35 U.S.C. 154(b) by 0 days.

(21) Appl. No.: 09/899,135

(22) Filed: Jul. 6, 2001

(65) Prior Publication Data
US 2002/0032296 A1 Mar. 14, 2002

Related U.S. Application Data

(62) Division of application No. 08/351,136, filed on Nov. 30, 1994, now Pat. No. 6,284,857, which is a continuation of application No. 08/094,977, filed on Jul. 22, 1993, now abandoned.

(51) Int. Cl.$^7$ .......................... C08F 4/642; C08F 4/649; C08F 110/06
(52) U.S. Cl. ................ 526/351; 526/65; 526/124.9; 526/125.3; 525/240; 525/323; 525/247; 525/249; 525/254; 525/270
(58) Field of Search ................ 525/240, 323, 525/247, 249, 254, 270; 526/65, 124.9, 125.3, 351

(56) References Cited

U.S. PATENT DOCUMENTS

| | | |
|---|---|---|
| 4,921,905 A | 5/1990 | Fujio et al. |
| 4,977,210 A | 12/1990 | Kerth et al. |
| 4,990,477 A | 2/1991 | Kioka et al. |
| 4,990,479 A * | 2/1991 | Ishimaru et al. ............ 502/125 |
| 5,015,612 A * | 5/1991 | Kioka et al. ................ 502/133 |
| 5,247,031 A | 9/1993 | Kioka et al. |
| 5,262,487 A | 11/1993 | Fujita et al. |

* cited by examiner

Primary Examiner—David W. Wu
Assistant Examiner—R. Rabago
(74) Attorney, Agent, or Firm—Sherman & Shalloway

(57) ABSTRACT

Disclosed are a propylene polymer having a high crystallinity of a boiled heptane-insoluble component contained therein, a high stereoregularity and an extremely long mesochain (continuous propylene units wherein directions of á-methyl carbons are the same as each other), and a process for preparing said polymer. Further disclosed is a propylene polymer composition comprising the above propylene polymer and at least one stabilizer selected from a phenol type stabilizer, an organophosphite type stabilizer, a thioether type stabilizer, a hindered amine type stabilizer a metallic salt of higher aliphatic acid. The propylene block polymer of the invention is well-balanced between rigidity, heat resistance and moisture resistance, and can be favorably used for sheet, filament, injection molded product, blow molded product, etc. The propylene polymer composition of the invention has excellent properties of the propylene polymer of or the propylene block copolymer, and moreover is excellent in heat stability during the molding stage, long-term heat stability and weathering resistance. The propylene polymer composition can be favorably used for sheet, film, filament, injection mold product, blow molded product, etc.

3 Claims, 2 Drawing Sheets

(A) Transition metal catalyst component
- Titanium compound
- Magnesium compound
- Electron donor (B) Organometallic catalyst component
- Organoaluminum compound (C) The third component $R^a{}_n\text{-Si-}(OR^b)_{4-n}$
($n=1, 2$ or $3$, $R^a$=secondary or tertiary hydrocarbon, $R^b=C_{1-4}$ hydrocarbon)

Propylene or Propylene & Olefin

PROPYLENE POLYMER, PROPYLENE BLOCK COPOLYMER, PROCESS FOR PREPARING SAID POLYMER AND SAID BLOCK COPOLYMER, AND PROPYLENE POLYMER COMPOSITION

This application is a division of applicants application Ser. No. 08/351,136, filed Nov. 30, 1994, now U.S. Pat. No. 6,284,857, which is a continuation of application Ser. No. 08/094,977, filed Jul. 22, 1993, now abandoned, to both of which applicants claim priority.

FIELD OF THE INVENTION

The present invention relates to a propylene polymer, a propylene block copolymer and process for the preparation thereof, and a propylene polymer composition comprising the propylene polymer or the propylene block copolymer and a stabilizer. More particularly, the invention relates to a propylene polymer having a high crystallinity, a high stereoregularity and an extremely long mesochain (continuous propylene units wherein directions of α-methyl carbons are the same as each other), a propylene block copolymer containing a crystalline propylene portion having a high crystallinity, a high stereoregularity and an extremely long mesochain, and a propylene polymer composition comprising the above propylene polymer or propylene block copolymer and an specific stabilizer.

BACKGROUND OF THE INVENTION

It has been well known that polyolefins such as crystalline polypropylene are obtained by polymerizing olefins in the presence of so-called Ziegler-Natta catalyst which comprises a compound of a transition metal of Group IV to Group VI in the periodic table and an organometallic compound of a metal of Group I to Group III of the periodic table. Recently, there have been made studies on a process in which crystalline polyolefins of high stereoregularity can be obtained with high polymerization activity using such catalysts as mentioned above.

For example, Japanese Patent Laid-Open Publications No. 209207/1986, No. 104810/1987, No. 104811/1987, No. 104812/1987, No. 104813/1987, No. 311106/1989, No. 318011/1989 and No. 166104/1990 disclose that polyolefins of high stereoregularity can be obtained with high polymerization activity by polymerizing olefins in the presence of a catalyst formed from a titanium-containing sold catalyst component which contains titanium, magnesium, halogen and an electron donor, an organoaluminum compound and an electron donor.

The present applicant has also made a number of proposals with respect to a catalyst for olefin polymerization and an olefin polymerization process by which crystalline polyolefin of high stereoregularity can be obtained with high polymerization activity, as described in, for example, Japanese Patent Laid-Open Publications No. 108385/1975, No. 126590/1975, No. 20297/1976, No. 28189/1976, No. 64586/1976, No. 92885/1976, No. 133625/1976, No. 87489/1977, No. 100596/1977, No. 147688/1977, No. 104593/1977, No. 2580/1978, No. 40093/1978, No. 40094/1978, No. 43094/1978, No. 135102/1980, No. 135103/1980, No. 152710/1980, No. 811/1981, No. 11908/1981, No. 18606/1981, No. 83006/1983, No. 138705/1983, No. 138706/1983, No. 138707/1983, No. 138708/1983, No. 138709/1983, No. 138710/1983, No. 138715/1983, No. 138720/1983, No. 138721/1983, No. 215408/1983, No. 47210/1984, No. 117508/1984, No. 117509/1984, No. 207904/1984, No. 206410/1984, No. 206408/1984, No. 206407/1984, No. 69815/1986, No. 69821/1986, No. 69822/1986, No. 69823/1986, No. 22806/1988, No. 95208/1988, No. 199702/1988, No. 199703/1988, No. 202603/1988, No. 202604/1988, No. 223008/1988, No. 223009/1988, No. 264609/1988, No. 87610/1989, No. 156305/1989, No. 77407/1990, No. 84404/1990, No. 229807/1990, No. 229806/1990 and No. 229805/1990.

Crystalline polypropylene is rigid and usually has a high heat distortion temperature, a high melting point and a high crystallization temperature, and hence it shows excellent properties such as high heat resistance, high crystallization speed and high transparency. Accordingly, crystalline polypropylene has been applied to various uses such as containers and films. Since rigidity and heat resistance of polypropylene are enhanced with increase of crystallinity, polypropylene having high crystallinity can be applied to such uses as require higher rigidity and higher heat resistance. Further, in the conventional uses, a product formed from the polypropylene can be made thin or an amount of a filler to be added can be reduced, that is, weight-saving can be attained.

A propylene block copolymer usually comprises a crystalline polypropylene portion and a non-crystalline polymer portion, and has excellent properties such as lightweight and good balance between rigidity, a heat distortion temperature and impact resistance. Accordingly, the propylene block copolymer has been applied to various uses such as structural materials for containers and electrical appliances and automotive interior trims. Since rigidity and heat resistance of a propylene block copolymer are enhanced with increase of crystallinity of the crystalline polypropylene portion, a propylene block copolymer containing a polypropylene portion of high crystallinity can be applied to such uses as require higher rigidity and higher heat resistance. Further, in the conventional uses, a product formed from the the propylene block copolymer can be made thin or an amount of a filler to be added can be reduced, that is, weight-saving can be attained.

The crystallinity of crystalline polypropylene has been conventionally heightened by a method of adding a nucleating agent or other method, but the conventional crystalline polypropylene has an isotactic pentad value (pentad isotacticity) by the NMR measurement of about 90 to 95%, and the improvement of the rigidity and the heat resistance is limited to a certain extent. Accordingly, there have been keenly desired the advent of a crystalline polypropylene having a prominently high isotactic pentad value, namely a crystalline polypropylene having a high stereoregularity, and the advent of a propylene block copolymer containing a crystalline polypropylene portion having a prominently high isotactic pentad value, namely a propylene block copolymer containing a crystalline polypropylene portion having a high stereoregularity.

Films made of the conventional crystalline polypropylene are not always sufficient in moisture resistance, and hence the advent of a crystalline polypropylene excellent in the moisture resistance as well as in the rigidity and the heat resistance has been also desired.

In the case of molding the above-mentioned crystalline polypropylene, moldability of a resin is improved when a melt viscosity of the resin is low, and hence a resin temperature is generally elevated to lower the melt viscosity of the resin. However, if the resin is molded at a high temperature, the resin tends to be thermally decomposed or deteriorated to sometimes cause various problems such as coloring of the resulting molded product, occurrence of cracks, lowering of long-term heat stability and weathering resistance, and reduction of rigidity and heat resistance.

Further, sheets or films made of the conventional crystalline polypropylene are not always sufficient in the moisture resistance in some uses, and accordingly the advent of a crystalline polypropylene excellent in the moisture resistance as well as in the rigidity and the heat resistance has been desired.

The present inventors have earnestly studied to solve the above-mentioned problems, and as a result, they have found that a propylene polymer composition comprising a propylene polymer (or a propylene block copolymer) which has a much higher stereoregularity than a conventional one and an extremely long mesochain and a specific stabilizer shows high rigidity, high heat resistance and high moisture resistance, and moreover is excellent in heat stability during the molding stage, long-term heat stability of the molded product and weathering resistance thereof as compared with a conventional crystalline polypropylene. Thus, the present invention has been accomplished.

OBJECT OF THE INVENTION

It is an object of the present invention to provide a propylene polymer which is excellent in rigidity, heat resistance and moisture resistance and a process for preparing said propylene polymer.

It is another object of the present invention to provide a propylene block copolymer which is well balanced between rigidity, heat resistance and impact resistance and a process for preparing said propylene block copolymer.

It is a further object of the present invention to provide a propylene polymer composition comprising the above-mentioned propylene polymer or propylene block copolymer and a stabilizer, which has excellent properties of the propylene polymer or the propylene block copolymer and is capable of forming a molded product excellent in heat stability during the molding stage, long-term heat stability and weathering resistance.

SUMMARY OF THE INVENTION

The propylene polymer of the present invention is a propylene polymer having such properties that:

a melt flow rate (MFR) of said polymer at 230° C. under a load of 2.16 kg is in the range of 0.1 to 500 g/10 min, a pentad isotacticity $[M_5]$ obtained from the following formula (1) using absorption intensity [Pmmmm] and [Pw] in a $^{13}$C-NMR spectrum of a boiled heptane-insoluble component contained in said polymer is in the range of 0.970 to 0.995, a pentad tacticity $[M_3]$ obtained from the following formula (2) using absorption intensity [Pmmrm], [Pmrmr], [Pmrrr], [Prmrr], [Prmmr], [Prrrr] and [Pw] in a $^{13}$C-NMR spectrum of a boiled heptane-insoluble component contained in said polymer is in the range of 0.0020 to 0.0050, and a crystallinity of a boiled heptane-insoluble component contained in said polymer is not less than 60%;

$$[M_5] = \frac{[Pmmmm]}{[Pw]} \quad (1)$$

wherein

[Pmmmm] is absorption intensity of methyl groups present in the third unit among continuous five propylene units which are bonded to each other with meso form, and

[Pw] is absorption intensity of all methyl groups in a propylene unit;

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by  in which ] and ] are each a propylene unit,

[Pmrmr] is absorption intensity of methyl groups present in the third unit among continuous five propylene units represented by  in which ] and ] are each a propylene unit,

[Pmrrr] is absorption intensity of methyl groups present in the third unit among continuous five propylene units represented by ]]]] in which ] and ] are each a propylene unit,

[Prmrr] is absorption intensity of methyl groups present in the third unit among continuous five propylene units represented by ]]]] in which ] and ] are each a propylene unit,

[Prmmr] is absorption intensity of methyl groups present in the third unit among continuous five propylene units represented by ]]]] in which ] and ] are each a propylene unit,

[Prrrr] is absorption intensity of methyl groups present in the third unit among continuous five propylene units represented by ]]]] in which ] and ] are each a propylene unit, and

[Pw] is absorption intensity of all methyl groups in a propylene unit.

The propylene polymer of the invention desirably contains 10–10,000 ppm of polymer comprising constituent units derived from a compound represented by the following formula (i) or (ii):

$$H_2C=CH-X \quad (i)$$

$$H_2C=CH-CH_2-X \quad (ii)$$

wherein X is a cycloalkyl group, an aryl group or

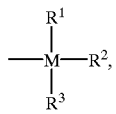

M is carbon or silicon, $R^1$ and $R^2$ are each a hydrocarbon group, and $R^3$ is hydrogen or a hydrocarbon group.

The propylene block copolymer of the present invention is a propylene block copolymer having such properties that:

a melt flow rate (MFR) of said copolymer at 230° C. under a load of 2.16 kg is in the range of 0.1 to 500 g/10 min, a pentad isotacticity $[M_5]$ obtained from the following formula (1A) using absorption intensity [Pmmmm], [Pw], [Sαγ], [Sαδ$^+$] and [Tδ$^+$δ$^+$] in a $^{13}$C-NMR spectrum of a boiled heptane-insoluble component contained in said copolymer is in the range of 0.970 to 0.995, a pentad tacticity $[M_3]$ obtained from the following formula (2A) using absorption intensity [Pmmrm], [Pmrmr], [Pmrrr], [Prmrr], [Prmmr], [Prrrr], [Pw], [Sαγ], [Sαδ$^+$] and [Tδ$^+$δ$^+$] in a $^{13}$C-NMR spectrum of a boiled heptane-insoluble component contained in said copolymer is in the range of 0.0020 to 0.0050, and a crystallinity of a boiled heptane-insoluble component contained in said copolymer is not less than 60%

$$[M_5] = \frac{[Pmmmm]}{[Pw] - 2([S\alpha\gamma] + [S\alpha\delta^+]) + 3[T\delta^+\delta^+]} \quad (1A)$$

wherein

[Pmmmm] and [Pw] have the same meanings as defined in the aforementioned formula (1),

[$S\alpha\gamma$] is absorption intensity of such secondary carbons that are present in a main chain and out of two kinds of tertiary carbons positioned nearest to said secondary carbons one is situated at the α position and the other is situated at the γ position,

[$S\alpha\delta^+$] is absorption intensity of such secondary carbons that are present in a main chain and out of two kinds of tertiary carbons positioned nearest to said secondary carbons one is situated at the α position and the other is situated at the δ position or farther than the δ position, and

[$T\delta^+\delta^+$] is absorption intensity of such tertiary carbons that are present in a main chain and out of two kinds of tertiary carbons positioned nearest to said tertiary carbons one is situated at the δ position or farther than the δ position and the other is also situated at the δ position or farther than the δ position;

$$[M_3] = \frac{\begin{array}{c}[Pmmrm] + [Pmrmr] + [Pmrrr] + [Prmrr] + \\ [Prmmr] + [Prrrr]\end{array}}{[Pw] - 2([S\alpha\gamma] + [S\alpha\delta^+]) + 3[T\delta^+\delta^+]} \quad (2A)$$

wherein

[Pmmrm], [Pmrmr], [Pmrrr], [Prmrr], [Prmmr], [Prrrr] and [Pw] have the same meanings as defined in the aforementioned formula (2), and

[$S\alpha\gamma$], [$S\alpha\delta^+$] and [$T\delta^+\delta^+$] have the same meanings as defined in the above-mentioned formula (1A).

The propylene block copolymer of the invention desirably contains 10–10,000 ppm of polymer comprising constituent units derived from a compound represented by the aforementioned formula (i) or (ii).

The first process for preparing a propylene polymer according to the present invention is a process for preparing a propylene polymer having a crystallinity of not less than 60%, which comprises polymerizing propylene in the presence of a catalyst for olefin polymerization comprising:

[I] a prepolymerized catalyst obtained by prepolymerizing at least one reactive monomer represented by the following formula (i) or (ii) using (a) a solid titanium catalyst component containing magnesium, titanium, halogen and an electron donor as essential components and (b) an organometallic catalyst component, said reactive monomer being prepolymerized in an amount of 0.1 to 1,000 g per 1 g of the solid titanium catalyst component (a);

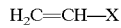  (i)

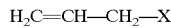  (ii)

wherein X is a cycloalkyl group, an aryl group or

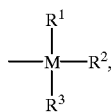

M is carbon or silicon, $R^1$ and $R^2$ are each a hydrocarbon group, and $R^3$ is hydrogen or a hydrocarbon group;

[II] the organometallic catalyst component (b); and

[III] a silicon compound represented by the following formula (iii) or a compound having at least two ether linkages existing via plurality of atoms:

  (iii)

wherein, n is 1, 2 or 3; when n is 1, $R^a$ is a secondary or a tertiary hydrocarbon group; when n is 2 or 3, at least one of Ra is a secondary or a tertiary hydrocarbon group, $R^a$ may be the same or different, and $R^b$ is a hydrocarbon group of 1 to 4 carbon atoms; and when 4−n is 2 or 3, $R^b$ may be the same or different;

in said process, propylene being polymerized in an amount of 3,000 to 1,000,000 g per 1 g of the solid titanium catalyst component (a) contained in the prepolymerized catalyst.

The second process for preparing a propylene polymer according to the present invention is a process which comprises preparing a propylene polymer having an intrinsic viscosity [η] of 3 to 40 dl/g in an amount of 0.1 to 55% by weight based on the amount of the resulting polymer using one or more polymerizers out of two or more polymerizers and then further preparing a propylene polymer using the residual polymerizers, in the presence of a catalyst for olefin polymerization comprising:

[I] a prepolymerized catalyst obtained by prepolymerizing at least one reactive monomer represented by the following formula (i) or (ii) using (a) a solid titanium catalyst component containing magnesium, titanium, halogen and an electron donor as essential components and (b) an organometallic catalyst component, said reactive monomer being prepolymerized in an amount of 0.1 to 1,000 g per 1 g of the solid titanium catalyst component (a);

  (i)

  (ii)

wherein X is a cycloalkyl group, an aryl group or

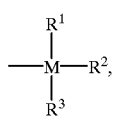

M is carbon or silicon, $R^1$ and $R^2$ are each a hydrocarbon group, and $R^3$ is hydrogen or a hydrocarbon group;

[II] the organometallic catalyst component (b); and

[III] a silicon compound represented by the following formula (iii) or a compound having at least two ether linkages existing via plurality of atoms:

  (iii)

wherein, n is 1, 2 or 3; when n is 1, $R^a$ is a secondary or a tertiary hydrocarbon group; when n is 2 or 3, at least one of Ra is a secondary or a tertiary hydrocarbon group, $R^a$ may be the same or different, and $R^b$ is a hydrocarbon group of 1 to 4 carbon atoms; and when 4−n is 2 or 3, $R^b$ may be the same or different;

the propylene polymer obtained by said process satisfying the following requisites:

(a) a crystallinity of said polymer is not less than 60%, (b) a melt flow rate of said polymer at 230° C. is in the range of 0.1 to 500 g/10 min, and (c) said polymer is a propylene polymer obtained by polymerizing propylene in an amount of 3,000 to 100,000 g per 1 g of the solid titanium catalyst component (a).

The process for preparing a propylene block copolymer according to the present invention is a process which comprises a first polymerization stage for homopolymerizing propylene or copolymerizing propylene with ethylene and/or α-olefin of 4 to 10 carbon atoms to prepare a crystalline polymer and a second polymerization stage for copolymerizing two or more monomers selected from α-olefin of 2 to 20 carbon atoms to prepare a low-crystalline or non-crystalline copolymer, in the presence of a catalyst for olefin polymerization comprising:

[I] a prepolymerized catalyst obtained by prepolymerizing at least one reactive monomer represented by the following formula (i) or (ii) using (a) a solid titanium catalyst component containing magnesium, titanium, halogen and an electron donor as essential components and (b) an organometallic catalyst component, said reactive monomer being prepolymerized in an amount of 0.1 to 1,000 g per 1 g of the solid titanium catalyst component (a);

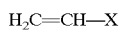 (i)

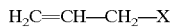 (ii)

wherein X is a cycloalkyl group, an aryl group or

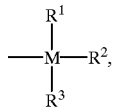

M is carbon or silicon, $R^1$ and $R^2$ are each a hydrocarbon group, and $R^3$ is hydrogen or a hydrocarbon group;

[II] the organometallic catalyst component (b); and

[III] a silicon compound represented by the following formula (iii) or a compound having at least two ether linkages existing via plurality of atoms:

 (iii)

wherein, n is 1, 2 or 3; when n is 1, $R^a$ is a secondary or a tertiary hydrocarbon group; when n is 2 or 3, at least one of $R^a$ is a secondary or a tertiary hydrocarbon group, Ra may be the same or different, and $R^b$ is a hydrocarbon group of 1 to 4 carbon atoms; and when 4−n is 2 or 3, $R^b$ may be the same or different.

The first propylene polymer composition of the present invention comprises:

[A1] a propylene polymer having such properties that
melt flow rate (MFR) of said polymer at 230° C. under a load of 2.16 kg is in the range of 0.1 to 500 g/10 min,
a pentad isotacticity [$M_5$] obtained from the aforesaid formula (1) using absorption intensity [Pmmmm] and [Pw] in a $^{13}$C-NMR spectrum of a boiled heptane-insoluble component contained in said polymer is in the range of 0.970 to 0.995,
a pentad tacticity [$M_3$] obtained from the aforesaid formula (2) using absorption intensity [Pmmrm], [Pmrmr], [Pmrrr], [Prmrr], [Prmmr], [Prrrr] and [Pw] in a $^{13}$C-NMR spectrum of a boiled heptane-insoluble component contained in said polymer is in the range of 0.0020 to 0.0050, and
a crystallinity of a boiled heptane-insoluble component contained in said polymer is not less than 60%; and
[B] a phenol type stabilizer in an amount of 0.001 to 10 parts by weight based on 100 parts by weight of the propylene polymer.

The second propylene polymer composition of the present invention comprises:

[A1] the above mentioned propylene polymer,
[B] a phenol type stabilizer in an amount of 0.001 to 10 parts by weight based on 100 parts by weight of the propylene polymer; and
at least one compound selected from the group consisting of [C] an organophosphite type stabilizer, [D] a thioether type stabilizer, [E] a hindered amine type stabilizer and [F] a metallic salt of a higher aliphatic acid in an amount of 0.001 to 10 parts by weight based on 100 parts by weight of the propylene polymer.

The third propylene polymer composition of the present invention comprises:

[A1] the above-mentioned propylene polymer, and
[C] an organophosphite type stabilizer in an amount of 0.001 to 10 parts by weight based on 100 parts by weight of the propylene polymer.

The fourth propylene polymer composition of the present invention comprises:

[A1] the above-mentioned propylene polymer,
[C] an organophosphite type stabilizer in an amount of 0.001 to 10 parts by weight based on 100 parts by weight of the propylene polymer, and
at least one compound selected from the group consisting of [D] a thioether type stabilizer, [E] a hindered amine type stabilizer and [F] a metallic salt of a higher aliphatic acid in an amount of 0.001 to 10 parts by weight based on 100 parts by weight of the propylene polymer.

The fifth propylene polymer composition of the present invention comprises:

[A1] the above-mentioned propylene polymer, and
[D] a thioether type stabilizer in an amount of 0.001 to 10 parts by weight based on 100 parts by weight of the propylene polymer.

The sixth propylene polymer composition of the present invention comprises:

[A1] the above-mentioned propylene polymer,
[D] a thioether type stabilizer in an amount of 0.001 to 10 parts by weight based on 100 parts by weight of the propylene polymer, and
at least one compound selected from the group consisting of [E] a hindered amine type stabilizer and [F] a metallic salt of a higher aliphatic acid in an amount of 0.001 to 10 parts by weight based on 100 parts by weight of the propylene polymer.

The seventh propylene polymer composition of the present invention comprises:

[A1] the above-mentioned propylene polymer, and
[E] a hindered amine type stabilizer in an amount of 0.001 to 10 parts by weight based on 100 parts by weight of the propylene polymer.

The eighth propylene polymer composition of the present invention comprises:

[A1] the above-mentioned propylene polymer,
[E] a hindered amine type stabilizer in an amount of 0.001 to 10 parts by weight based on 100 parts by weight of the propylene polymer, and
[F] a metallic salt of a higher aliphatic acid in an amount of 0.001 to 10 parts by weight based on 100 parts by weight of the propylene polymer.

The ninth propylene polymer composition of the present invention comprises:

[A1] the above-mentioned propylene polymer, and
[F] a metallic salt of a higher aliphatic acid in an amount of 0.001 to 10 parts by weight based on 100 parts by weight of the propylene polymer.

The propylene polymer used in each of the first to ninth propylene polymer compositions of the invention preferably contains 10–10,000 ppm of polymer comprising constituent units derived from a compound represented by the aforesaid formula (i) or (ii).

Such propylene polymer compositions as described above have properties of the propylene polymer and is excellent. in heat stability during the molding stage, long-term heat stability and weathering resistance.

The tenth propylene polymer composition of the present invention comprises:

[A2] a propylene block copolymer having such properties that a melt flow rate (MFR) of said copolymer at 230° C. under a load of 2.16 kg is in the range of 0.1 to 500 g/10 min, a pentad isotacticity [$M_5$] obtained from the aforesaid formula (1A) using absorption intensity [Pmmmm], [Pw], [S$\alpha\gamma$], [S$\alpha\delta^+$] and [T$\delta^+\delta^+$] in a $^{13}$C-NMR spectrum of a boiled heptane-insoluble component contained in said copolymer is in the range of 0.970 to 0.995, a pentad tacticity [$M_5$] obtained from the aforesaid formula (2A) using absorption intensity [Pmmmm], [Pmrmr], [Pmrrr], [Prmrr], [Prmmr], [Prrrr], [Pw], [S$\alpha\gamma$], [S$\alpha\delta^+$] and [T$\delta^+\delta^+$] in a $^{13}$C-NMR spectrum of a boiled heptane-insoluble component contained in said copolymer is in the range of 0.0020 to 0.0050, and a crystallinity of a boiled heptane-insoluble component contained in said copolymer is not less than 60%, and

[B] a phenol type stabilizer in an amount of 0.001 to 10 parts by weight based on 100 parts by weight of the propylene block copolymer.

The eleventh propylene polymer composition of the present invention comprises:

[A2] the above-mentioned propylene block copolymer,

[B] a phenol type stabilizer in an amount of 0.001 to 10 parts by weight based on 100 parts by weight of the propylene block copolymer; and at least one compound selected from the group consisting of [C] an organophosphite type stabilizer, [D] a thioether type stabilizer, [E] a hindered amine type stabilizer and [F] a metallic salt of a higher aliphatic acid in an amount of 0.001 to 10 parts by weight based on 100 parts by weight of the propylene block copolymer.

The twelfth propylene polymer composition of the present invention comprises:

[A2] the above-mentioned propylene block copolymer, and

[C] an organophosphite type stabilizer in an amount of 0.001 to 10 parts by weight based on 100 parts by weight of the propylene block copolymer.

The thirteenth propylene polymer composition of the present invention comprises:

[A2] the above-mentioned propylene block copolymer,

[C] an organophosphite type stabilizer in an amount of 0.001 to 10 parts by weight based on 100 parts by weight of the propylene block copolymer, and at least one compound selected from the group consisting of [D] a thioether type stabilizer, [E] a hindered amine type stabilizer and [F] a metallic salt of a higher aliphatic acid in an amount of 0.001 to 10 parts by weight based on 100 parts by weight of the propylene block copolymer.

The fourteenth propylene polymer composition of the present invention comprises:

[A2] the above-mentioned propylene block copolymer, and

[D] a thioether type stabilizer in an amount of 0.001 to 10 parts by weight based on 100 parts by weight of the propylene block copolymer.

The fifteenth propylene polymer composition of the present invention comprises:

[A2] the above-mentioned propylene block copolymer,

[D] a thioether type stabilizer in an amount of 0.001 to 10 parts by weight based on 100 parts by weight of the propylene block copolymer, and at least one compound selected from the group consisting of [E] a hindered amine type stabilizer and [F] a metallic salt of a higher aliphatic acid in an amount of 0.001 to 10 parts by weight based on 100 parts by weight of the propylene block copolymer.

The sixteenth propylene polymer composition of the present invention comprises:

[A2] the above-mentioned propylene block copolymer, and

[E] a hindered amine type stabilizer in an amount of 0.001 to 10 parts by weight based on 100 parts by weight of the propylene block copolymer.

The seventeenth propylene polymer composition of the present invention comprises:

[A2] the above-mentioned propylene block copolymer,

[E] a hindered amine type stabilizer in an amount of 0.001 to 10 parts by weight based on 100 parts by weight of the propylene block copolymer, and

[F] a metallic salt of a higher aliphatic acid in an amount of 0.001 to 10 parts by weight based on 100 parts by weight of the propylene block copolymer.

The eighteenth propylene polymer composition of the present invention comprises:

[A2] the above-mentioned propylene block copolymer, and

[F] a metallic salt of a higher aliphatic acid in an amount of 0.001 to 10 parts by weight based on 100 parts by weight of the propylene block copolymer.

The propylene block copolymer used in each of the tenth to eighteenth propylene polymer compositions of the invention preferably contains 10–10,000 ppm of polymer comprising constituent units derived from a compound represented by the aforesaid formula (i) or (ii).

Such propylene polymer compositions as described above have properties of the propylene polymer and is excellent in heat stability during the molding stage, long-term heat stability and weathering resistance.

DETAILED DESCRIPTION OF THE INVENTION

Figure 1:
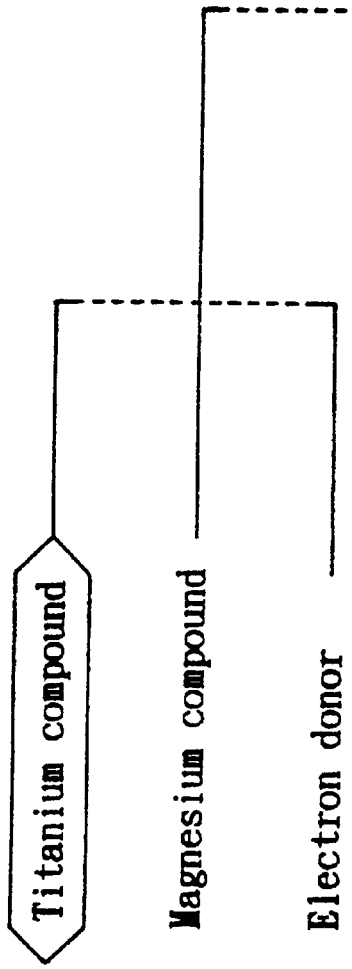
FIG. 1 illustrate steps of a process for preparing a catalyst for olefin polymerization which is used for the preparation of a propylene polymer or a propylene block copolymer according to the present invention.

The propylene polymer, the propylene block copolymer, the process for preparing said polymer or said copolymer and the propylene polymer composition according to the present invention are described in detail hereinafter.

The term "polymerization" used in this specification means not only homopolymerization but also copolymerization, and the term "polymer" used in this specification means not only homopolymer but also copolymer.

The propylene polymer according to the invention is a homopolymer of propylene.

The propylene polymer has a melt flow rate (MFR), as measured at 230° C. under a load of 2.16 kg, of 0.1 to 500 g/10 min, preferably 0.2 to 300 g/10 min. Measurement of the melt flow rate (MFR) is carried out in accordance with ASTM D1238-65T under the conditions of a temperature of 230° C. and a load of 2.16 kg.

In the propylene polymer of the invention, a pentad isotacticity $[M_5]$ obtained from the following formula (1) using absorption intensity [Pmmmm] and [Pw] in a $^{13}$C-NMR spectrum of a boiled heptane-insoluble component contained in said polymer is in the range of 0.970 to 0.995, preferably 0.980 to 0.995, more preferably 0.982 to 0.995.

$$[M_5] = \frac{[Pmmmm]}{[Pw]} \quad (1)$$

wherein

[Pmmmm] is absorption intensity of methyl groups present in the third unit among continuous five propylene units which are bonded to each other with meso form, and

[Pw] is absorption intensity of all methyl groups in a propylene unit.

The propylene block copolymer according to the invention is a block copolymer comprises:

a crystalline polypropylene portion which comprises constituent units derived from ethylene and/or olefin of 4 to 10 carbon atoms in an amount of 0 to 20% by mol and constituent units derived from propylene, and a low-crystalline or non-crystalline copolymer portion which contains two or more kinds of constituent units derived from olefin of 2 to 20 carbon atoms.

In this propylene block copolymer, it is desired that the constituent unites derived from propylene are contained in an amount of 50 to 98% by mol, preferably 60 to 97% by mol, and the constituent units derived from ethylene and/or olefin of 4 to 10 carbon atoms are contained in an amount of 50 to 2% by mol, preferably 40 to 3% by mol.

Concrete examples of the olefins of 4 to 20 carbon atoms include 1-butene, 1-pentene, 1-hexene, 4-methyl-1-pentene, 3-methyl-1-pentene, 1-octene, 3-methyl-1-butene, 1-decene, 1-dodecene, 1-tetradecene, 1-hexadecene, 1-octadecene, 1-eicosene, cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene. The constituent units derived from the above-exemplified olefins of 4 to 20 carbon atoms or derived from ethylene may be contained in combination of two or more kinds.

The propylene block copolymer has a melt flow rate (MFR), as measured at 230° C. under a load of 2.16 kg, of 0.1 to 500 g/10 min, preferably 0.2 to 300 g/10 min. Measurement of the melt flow rate (MFR) is carried out in accordance with ASTM D1238-65T under the conditions of a temperature of 230° C. and a load of 2.16 kg.

In the propylene block copolymer of the invention, a pentad isotacticity $[M_5]$ obtained from the following formula (1A) using absorption intensity [Pmmmm], [Pw], [Sαγ], [Sαδ⁺] and [Tδ⁺δ⁺] in a $^{13}$C-NMR spectrum of a boiled heptane-insoluble component is in the range of 0.970 to 0.995, preferably 0.980 to 0.995, more preferably 0.982 to 0.995.

$$[M_5] = \frac{[Pmmmm]}{[Pw] - 2([S\alpha\gamma] + [S\alpha\delta^+]) + 3[T\delta^+\delta^+]} \quad (1A)$$

wherein

[Pmmmm] is absorption intensity of methyl groups present in the third unit among continuous five propylene units which are bonded to each other with meso form,

[Pw] is absorption intensity of all methyl groups in a propylene unit, [Sαγ] is absorption intensity of such secondary carbons that are present in a main chain and out of two kinds of tertiary carbons positioned nearest to said secondary carbons one is situated at the α position and the other is situated at the γ position,

[Sαδ⁺] is absorption intensity of such secondary carbons that are present in a main chain and out of two kinds of tertiary carbons positioned nearest to said secondary carbons one is situated at the α position and the other is situated at the δ position or farther than the δ position, and

[Tδ⁺δ⁺] is absorption intensity of such tertiary carbons that are present in a main chain and out of two kinds of tertiary carbons positioned nearest to said tertiary carbons one is situated at the δ position or farther than the δ position and the other is also situated at the δ position or farther than the δ position.

Next, the pentad isotacticity $[M_5]$ used for evaluating the stereoregularity of the boiled heptane-insoluble component contained in the propylene polymer and the propylene block copolymer of the invention is concretely described below.

When the boiled heptane-insoluble component is a homopolymer of propylene, this insoluble component can be expressed by the following formula (A):

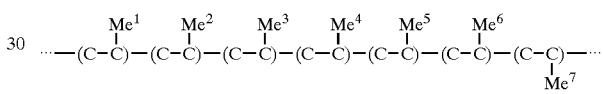

(A)

If a propylene unit

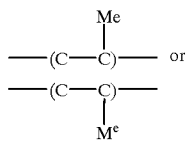

or is symbolized by ⌋ or ⌉, ⌋⌋ is expressed by "m" (meso form), and ⌋⌉ is expressed by "r" (racemo form), continuous five propylene isotactic units are expressed by ⌋m⌋m⌋m⌋m⌋. When absorption intensity, in a $^{13}$C-NMR spectrum, of methyl groups (e.g., Me³, Me⁴) in the third unite among the continuous five propylene units which are bonded to each other with meso form is expressed by [Pmmmm], and absorption intensity of the whole methyl groups (e.g., Me¹, Me², Me³ . . . ) in the propylene units is expressed by [Pw], the stereoregularity of the boiled heptane-insoluble component represented by the above formula (A) can be evaluated by a ratio of [Pmmmm] to [Pw], namely a value of $[M_5]$ obtained from the following formula (1).

Accordingly, the stereoregularity of the boiled heptane-insoluble component in the propylene polymer of the invention can be evaluated by a value of the pentad isotacticity $[M_5]$ obtained from the following formula (1) using the absorption intensity [Pmmmm] and [Pw] in a $^{13}$C-NMR spectrum of the boiled heptane-insoluble component.

$$[M_5] = \frac{[Pmmmm]}{[Pw]} \quad (1)$$

Further, when the boiled heptane-insoluble component contains constituent units derived from other olefins than propylene, for example, ethylene units, in a small amount, said insoluble component can be expressed by the following formula (B-1) or (B-2). The formula (B-1) shows that one ethylene unit is contained in a propylene unit chain, and the formula (B-2) shows that an ethylene unit chain composed of two or more ethylene units is contained in a propylene unit chain.

When the boiled heptane-insoluble component is represented by the formula (B-2), absorption intensity (S$\alpha\delta^+$), in the $^{13}$C-NMR spectrum, of a secondary carbon (C$^4$) which is in the ethylene unit chain composed of two or more ethylene units and bonded to a tertiary carbon (C$^d$) in the propylene unit and absorption intensity (S$\alpha\delta^+$) of a secondary carbon (C$^6$) which is in the propylene unit and bonded to a secondary carbon (C$^5$) in the ethylene unit chain composed of two or more ethylene units are excluded.

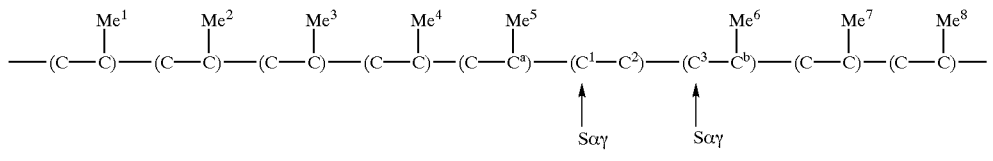

(B-1)

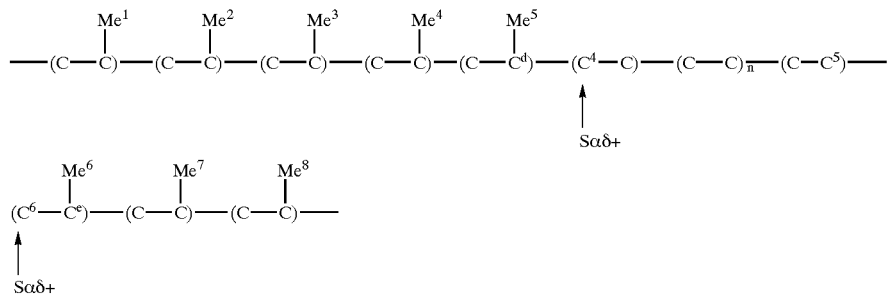

(B-2)

(n is 0 or a positive integer)

In the above cases, for measurement of the pentad isotacticity, the absorption intensity of other methyl groups (Me$^4$, Me$^5$, Me$^6$ and Me$^7$ in the formulas (B-1) and (B-2)) than the methyl group in the third unit among the continuous five isotactic propylene units should be theoretically excluded. However, absorption of these methyl groups are observed to be overlapped on absorption of other methyl groups, and hence it is difficult to quantitatively determine the absorption intensity of those methyl groups.

On that account, when the boiled heptane-insoluble component is represented by the formula (B-1), absorption intensity (S$\alpha\gamma$), in the $^{13}$C-NMR spectrum, of a secondary carbon (C$^1$) which is in the ethylene unit and bonded to a tertiary carbon (C$^a$) in the propylene unit and absorption intensity (S$\alpha\gamma$) of a secondary carbon (C$^3$) which is in the propylene unit and bonded to the secondary carbon (C$^2$) in the ethylene unit are excluded.

In other words, the absorption intensity of other methyl groups (Me$^4$, Me$^5$, Me$^6$ and Me$^7$) than the methyl groups in the third unit among the continuous five isotactic propylene units are excluded by subtracting, from Pw, two times value of the absorption intensity (S$\alpha\gamma$) of such a secondary carbon (C$^1$ or C$^3$) that said secondary carbon is present in a main chain and out of two tertiary carbons positioned nearest to said secondary carbon one (C$^a$ or C$^b$) is situated at the $\alpha$ position and the other (C$^b$ or C$^a$) is situated at the $\gamma$ position.

In other words, the absorption intensity of other methyl groups (Me$^4$, Me$^5$, Me$^6$ and Me$^7$) than the methyl groups in the third unit among the continuous five isotactic propylene units are excluded by subtracting, from Pw, two times value of the absorption intensity [S$\alpha\delta^+$] of such a secondary carbon (C$^4$ or C$^6$) that said secondary carbon is present in a main chain and out of two tertiary carbons positioned nearest to said secondary carbon one (C$^d$ or C$^e$) is situated at the $\alpha$ position and the other (C$^e$ or C$^d$) is situated at the $\delta$ position or farther than the $\delta$ position.

Accordingly, the stereoregularity of the boiled heptane-insoluble component represented by the above formula (B-1) or (B-2) can be evaluated by a value obtained from the following formula (1B).

$$\frac{[Pmmmm]}{[Pw] - 2([S\alpha\gamma] + [S\alpha\delta^+])} \tag{1B}$$

When the boiled heptane-insoluble component contains a small amount of ethylene units and the ethylene unit chain contains one propylene unit, this insoluble component can be represented by the following formula (C).

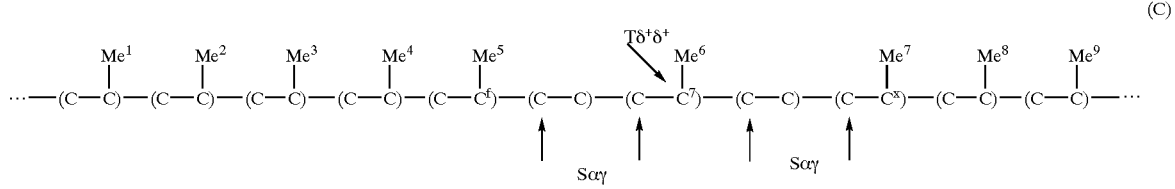

(C)

If the aforementioned formula (1B) is applied to the above case, a further correction should be carried out.

The reason is that there are four methyl groups corresponding to $S\alpha\gamma$ or $S\alpha\delta^+$ in spite that the number of the methyl groups to be excluded is five ($Me^4$, $Me^5$, $Me^6$, $Me^7$ and $Me^8$), and hence if the formula (1B) is applied, the number of the excluded methyl groups is larger by three than the number of other methyl groups than the methyl group in the third unit among the continuous five propylene units.

Accordingly, a further correction is made by using absorption intensity, in the $^{13}$C-NMR spectrum, of a tertiary carbon in the propylene unit contained in the ethylene unit chain. In other words, the correction is made by adding, to Pw, a value of three times of absorption intensity $[T\delta^+\delta^+]$ of such a tertiary carbon ($C^7$) that said tertiary carbon is present in a main chain and out of two tertiary carbons ($C^f$, $C^g$) positioned nearest to said tertiary carbon one ($C^f$) is situated at the $\delta$ position or farther than the $\delta$ position and the other ($C^g$) is also situated at the $\delta$ position or farther than the $\delta$ position.

Thus, the stereoregularity of the boiled heptane-insoluble component represented by the above formula (C) can be evaluated by a value of the pentad isotacticity $[M_5]$ obtained from the following formula (1A).

Accordingly, the stereoregularity of the boiled heptane-insoluble component in the propylene block copolymer of the invention can be evaluated by a value of the pentad isotacticity $[M_5]$ obtained from the following formula (1A).

$$[M_5] = \frac{[Pmmmm]}{[Pw] - 2([S\alpha\gamma] + [S\alpha\delta^+]) + 3[T\delta^+\delta^+]} \quad (1A)$$

The formula (1) and the formula (1B) are not different from the formula (1A), and they can be said to be special cases of the formula (1A). Further, the above-mentioned correction may become unnecessary depending on the kind of constitution unit other than propylene which is contained in the boiled heptane-insoluble components.

In the propylene polymer of the invention, the pentad isotacticity $[M_5]$ of the boiled heptane-insoluble component obtained from the above formula (1) is in the range of 0.970 to 0.995, and a pentad tacticity $[M_3]$ obtained from the following formula (2) using absorption intensity [Pmmrm], [Pmrmr], [Pmrrr], [Prmrr], [Prmmr], [Prrrr] and [Pw] in a $^{13}$C-NMR spectrum of the boiled heptane-insoluble component is in the range of 0.0020 to 0.0050, preferably 0.0023 to 0.0045, more preferably 0.0025 to 0.0040.

$$[M_3] = \frac{[Pmmrm] + [Pmrmr] + [Pmrrr] + [Prmrr] + [Prmmr] + [Prrrr]}{[Pw]} \quad (2)$$

wherein

[Pmmrm] is absorption intensity of methyl groups present in the third unit among continuous five propylene units represented by ]]]]] in which ] and ] are each a propylene unit,

[Pmrmr] is absorption intensity of methyl groups present in the third unit among continuous five propylene units represented by ]]]]] in which ] and ] are each a propylene unit,

[Pmrrr] is absorption intensity of methyl groups present in the third unit among continuous five propylene units represented by ]]]]] in which ] and ] are each a propylene unit,

[Prmrr] is absorption intensity of methyl groups present in the third unit among continuous five propylene units represented by ]]]]] in which ] and ] are each a propylene unit,

[Prmmr] is absorption intensity of methyl groups present in the third unit among continuous five propylene units represented by ]]]]] in which ] and ] are each a propylene unit,

[Prrrr] is absorption intensity of methyl groups present in the third unit among continuous five propylene units represented by ]]]]] in which ] and ] are each a propylene unit, and

[Pw] has the same meaning as defined in the above formula (1).

In the propylene block copolymer of the invention, the pentad isotacticity $[M_5]$ of the boiled heptane-insoluble component obtained from the aforesaid formula (1A) is in the range of 0.970 to 0.995, and a pentad tacticity $[M_3]$ obtained from the following formula (2A) using absorption intensity [Pmmrm], [Pmrmr], [Pmrrr], [Prmrr], [Prmmr], [Prrrr], [Pw], [S$\alpha\gamma$], [S$\alpha\delta^+$] and [T$\delta^+\delta^+$] in a $^{13}$C-NMR spectrum of the boiled heptane-insoluble component is in the range of 0.0020 to 0.0050, preferably 0.0023 to 0.0045, more preferably 0.0025 to 0.0040.

$$[M_3] = \frac{[Pmmrm] + [Pmrmr] + [Pmrrr] + [Prmrr] + [Prmmr] + [Prrrr]}{[Pw] - 2([S\alpha\gamma] + [S\alpha\delta^+]) + 3[T\delta^+\delta^+]} \quad (2A)$$

wherein [Pmmrm], [Pmrmr], [Pmrrr], [Prmrr], [Prmmr] and [Prrrr] have the same meanings as defined in the formula (2), and [Pw], [S$\alpha\gamma$], [S$\alpha\delta^+$] and [T$\delta^+\delta^+$] have the same meanings as defined in the formula (1A).

In the formula (2) and the formula (2A), each of [Pmmrm], [Pmrmr], [Pmrrr], [Prmrr], [Prmmr] and [Prrrr] shows absorption intensity of a methyl group in the third unit among continuous five propylene units having such a structure that three out of five methyl groups in the continuous five propylene units are the same in the direction and the residual two are different in the direction (sometimes referred to as "$M_3$ structure" hereinafter). That is, the value of the pentad tacticity $[M_3]$ obtained from the above formula (2) exhibits a proportion of the $M_3$ structure in the propylene unit chain, while the value of the pentad tacticity $[M_3]$ obtained from the above formula (2A) exhibits a proportion of the $M_3$ structure in the propylene unit chain containing a small amount of other monomer units than the propylene units.

The propylene polymer of the invention has an extremely long mesochain (i.e., propylene unit chain in which directions of α-methyl carbons are the same as each other), because the value of the pentad isotacticity [$M_5$] of the boiled heptane-insoluble component obtained from the formula (1) is in the range of 0.970 to 0.995, and the value of the pentad tacticity [$M_3$] of the boiled heptane-insoluble component obtained from the formula (2) is in the range of 0.0020 to 0.0050.

The crystalline propylene portion of the propylene block copolymer of the invention has an extremely long mesochain, because the value of the pentad isotacticity [$M_5$] of the boiled heptane-insoluble component obtained from the formula (1A) is in the range of 0.970 to 0.995, and the value of the pentad tacticity [$M_3$] of the boiled heptane-insoluble component obtained from the formula (2A) is in the range of 0.0020 to 0.0050.

In general, polypropylene has a longer mesochain as the value of the pentad tacticity [$M_3$] becomes smaller. However, when the value of the pentad isotacticity [$M_5$] is extremely large and the value of the pentad tacticity [$M_3$] is extremely small, polypropylene having a larger value of the pentad tacticity [$M_3$] sometimes has a longer mesochain with the proviso that the pentad isotacticity [$M_5$] is almost the same.

For example, when polypropylene having the following structure (a) is compared with polypropylene having the following structure (b), the polypropylene represented by the structure (a) having the $M_3$ structure has a longer mesochain than the polypropylene represented by the structure (b) not having the $M_3$ structure. (Each of the following structures (a) and (b) is composed of 1,003 propylene units.)

pentad isotacticity [$M_5$] of the boiled heptane-insoluble component is in the range of 0.970 to 0.995, and the pentad tacticity [$M_3$] of the boiled heptane-insoluble component is in the range of 0.0020 to 0.0050. Such propylene polymer of the invention has higher rigidity, heat resistance and moisture resistance than those of the conventional highly crystalline polypropylene, though the reason has not been clarified. If the pentad tacticity [$M_3$] of the boiled heptane-insoluble component is out of the range of 0.0020 to 0.0050, the above-mentioned properties are sometimes deteriorated.

The propylene block copolymer of the invention contains a highly crystalline polypropylene portion having the $M_3$ structure represented by the above structure (a), and in this copolymer, the pentad isotacticity [$M_5$] of the boiled heptane-insoluble component is in the range of 0.970 to 0.995, and the pentad tacticity [$M_3$] of the boiled heptane-insoluble component is in the range of 0.0020 to 0.0050. Such propylene block copolymer of the invention has a better balance between rigidity, heat resistance and impact resistance than the conventional highly crystalline polypropylene, though the reason has not been clarified. If the pentad tacticity [$M_3$] of the boiled heptane-insoluble component is out of the range of 0.0020 to 0.0050, the above-mentioned properties are sometimes deteriorated.

In the invention, the boiled heptane-insoluble component is prepared as follows. In a 1-liter flask equipped with a stirring device is charged 3 g of a polymer sample, 20 mg of 2,6-di-tert-butyl-4-methylphenol and 500 ml of n-decane, and the flask is heated in an oil bath of 145° C. to dissolve

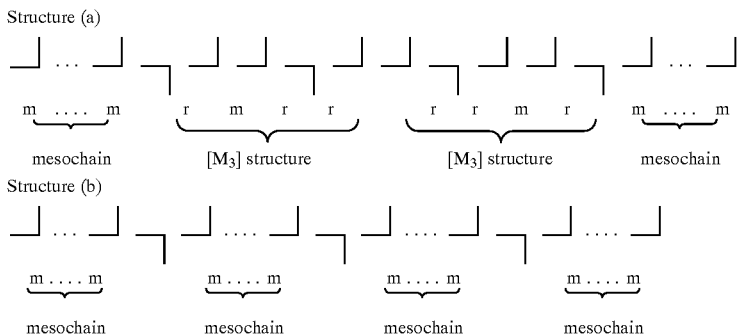

The pentad isotacticity [$M_5$] of polypropylene represented by the structure (a) is 0.986, and the pentad isotacticity [$M_5$] of polypropylene represented by the structure (b) is 0.985, so that those values are almost the same. However, in the polypropylene represented by the structure (a) having the $M_3$ structure, the number of propylene units contained in the mesochain is 497 on an average, while in the polypropylene represented by the structure (b) not having the $M_3$ structure, the number of propylene units contained in the mesochain is 250 on an average. That is, in the polypropylene having an extremely large value of the pentad isotacticity [$M_5$], a proportion of the structure represented by "r" (racemo) contained in the propylene unit chain becomes extremely small. Hence, the polypropylene wherein structures represented by "r" (racemo) are concentrated (i.e., polypropylene having the $M_3$ structure) has a longer mesochain as compared with the polypropylene wherein structures represented by "r" (racemo) are scattered (i.e., polypropylene not having the $M_3$ structure).

The propylene polymer of the invention is a highly crystalline polypropylene having the $M_3$ structure represented by the above structure (a), and in this polymer, the the polymer sample. After the polymer sample is dissolved, the flask is cooled to room temperature over about 8 hours and then kept for 8 hours in an water bath of 23° C. The n-decane suspension containing the precipitated polymer (23° C.-decane-insoluble component) is filtered on a glass filter of G-4 (or G-2) and dried under a reduced pressure. Then, 1.5 g of the polymer is subjected to Soxhlet extraction for not shorter than 6 hours using heptane. Thus, a boiled heptane-insoluble component as a test sample is obtained.

The amount of the boiled heptane-insoluble component in the propylene polymer of the invention is usually not less than 80% by weight, preferably not less than 90% by weight, more preferably not less than 94% by weight, much more preferably not less than 95% by weight, particularly preferably not less than 96% by weight.

The amount of the boiled heptane-insoluble component in the propylene block copolymer of the invention largely depends upon the amount of the 23° C.-decane-soluble component and cannot be determined unconditionally, but the boiled heptane-insoluble component in the 23° C.-decane-insoluble portion is usually not less than 80% by weight, preferably not less than 85% by weight, more preferably not less than 90% by weight, much more preferably not less than 93% by weight, particularly preferably not less than 94% by weight.

The amount of the boiled heptane-insoluble component is determined on the assumption that the 23° C.-decane-soluble component is also soluble in the boiled heptane.

In the invention, the NMR measurement of the boiled heptane-insoluble component is carried out, for example, in the following manner. That is, 0.35 g of the boiled heptane-insoluble component is dissolved in 2.0 ml of hexachlorobutadiene under heating. The resulting solution is filtered over a glass filter (G2), to the filtrate is added 0.5 ml of deuterated benzene, and the mixture is charged in a NMR tube having an inner diameter of 10 mm. Then, $^{13}$C-NMR measurement is conducted at 120° C. using a NMR measuring apparatus (GX-500 type produced by Japan Electron Co., Ltd). The number of integration times is not less than 10,000. The values of the pentad isotacticity [$M_5$] and the pentad tacticity [$M_3$] can be sought from peak intensity based on each structures obtained by the above-mentioned measurement or the sum of the peak intensity.

The boiled heptane-insoluble component in the propylene polymer of the invention has a crystallinity of usually not less than 60%, preferably not less than 65%, more preferably not less than 70%.

The boiled heptane-insoluble component in the propylene block copolymer of the invention has a crystallinity of usually not less than 60%, preferably not less than 65%, more preferably not less than 68%.

The crystallinity can be determined as follows. A sample is molded into an angular plate having a thickness of 1 mm by means of a pressure molding machine of 180° C., and immediately the plate is water cooled to obtain a pressed sheet. Using this pressed sheet, the crystallinity is measured by a measuring device (Rotor Flex RU300 produced by Rigaku Denki K.K., output: 50 kV, 250 mA). In this measurement, a transmission method is utilized, and the measurement is conducted while rotating the sample.

The propylene polymer or the propylene block copolymer of the invention desirably contains polymer comprising constituent units derived from a compound represented by the following formula (i) or (ii) in an amount of 10 to 10,000 ppm, preferably 100 to 5,000 ppm.

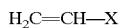  (i)

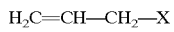  (ii)

wherein X is a cycloalkyl group, an aryl group or

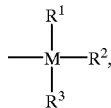

M is carbon or silicon, $R^1$ and $R^2$ are each a hydrocarbon group, and $R^3$ is hydrogen or a hydrocarbon group.

Examples of the cycloalkyl group indicated by X in the above formula (i) or (ii) include a cyclopentyl group, cyclohexyl group, a cycloheptyl group, and examples of the aryl group indicated by X is a phenyl group, a tolyl group, a xylyl group and a naphthyl group.

Examples of the hydrocarbon group indicated by $R^1$, $R^2$ or $R^3$ in the above formula (i) or (ii) include an alkyl group such as a methyl group, an ethyl group, a propyl group and a butyl group; an aryl group such as a phenyl group and a naphthyl group; and a norbornyl group. Further, the hydrocarbon group indicated by $R^1$, $R^2$ or $R^3$ may contain silicon and halogen.

Concrete examples of the compound represented by the formula (i) or (ii) include 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornane, styrene, dimethylstyrenes, vinylnaphthalenes, allyltoluenes, allylbenzene, vinylcyclohexane, vinylcyclopentane, vinylcycloheptane and allyltrialkylsilanes. Of these, preferred are 3-methyl-1-butene, 3-methyl-1-pentene, 3-ethyl-1-hexene, vinylcyclohexane, allyltrimethylsilane and dimethylstyrene. More preferred are 3-methyl-1-butene, vinylcyclohexane and allyltrimethylsilane. Particularly preferred is 3-methyl-1-butene.

Further, the propylene polymer of the invention may contain constituent units derived from olefins having 20 or less carbon atoms other than propylene in a small amount or may contain constituent units derived from diene compounds having 4 to 20 carbon atoms in a small amount.

The propylene block copolymer of the invention may contain constituent units derived from diene compounds having 4 to 20 carbon atoms such as 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicylopentadiene, in an amount of not more than 5% by mol.

The propylene polymer of the invention desirably has a density of 0.900 to 0.936 g/cm$^3$, preferably 0.910 to 0.936 g/cm$^3$. The propylene block copolymer of the invention desirably has a density of 0.900 to 0.936 g/cm$^3$, preferably 0.910 to 0.936 g/cm$^3$.

In the propylene polymer of the invention, it is desired that the amount of the 23° C.-decane-soluble component is not more than 3.0%, preferably not more than 2.5%, more preferably not more than 2.0%, particularly preferably not more than 1.5%. In the propylene block copolymer of the invention, it is desired that the amount of the 23° C.-decane-soluble component is not more than 50%, preferably not more than 30%, more preferably not more than 20%, particularly preferably not more than 15%.

The amount of the 23° C.-decane-soluble component in the propylene polymer or the propylene block copolymer of the invention is measured as follows. In a 1-liter flask equipped with a stirring device is charged 3 g of a polymer sample, 20 mg of 2,6-di-tert-butyl-4-methylphenol and 500 ml of n-decane, and the flask is heated in an oil bath of 145° C. to dissolve the polymer sample. After the polymer sample is dissolved, the flask is cooled to room temperature over about 8 hours and then kept for 8 hours in an water bath of 23° C. The n-decane suspension containing the precipitated polymer and the dissolved polymer is separated by filtration on a glass filter of G-4 (or G-2). The resulting solution is dried at 150° C. and 10 mmHg until its weight becomes unvaried, and the weight is measured. The weight thus measured is the amount of the polymer component soluble in the above-mentioned mixture solvent, and the amount is calculated as percentage to the weight of the sample polymer.

The boiled heptane-insoluble component in the propylene polymer of the invention desirably has a semi-crystallization period at 135° C. of not longer than 500 seconds, preferably not longer than 100 seconds, more preferably not longer than 80 seconds, particularly preferably not longer than 70 seconds. The 23° C.-decane-insoluble component in the propylene block copolymer of the invention desirably has a semi-crystallization period at 135° C. of not longer than 500 seconds, preferably not longer than 100 seconds, more preferably not longer than 80 seconds, particularly preferably not longer than 70 seconds.

The semi-crystallization period at 135° C. of the boiled heptane-insoluble component in the propylene polymer or the propylene block copolymer is measured as follows. That is, a relation between the exotherm caused by the crystallization at 135° C. of the boiled heptane-insoluble component of the polymer and the period required for the crystallization is measured by the use of a differential calorimeter (produced by Perkin Elmer Co.), and the period of time necessary for the exotherm to reach 50% of the whole exotherm is determined as the semi-crystallization period.

In the propylene polymer of the invention, it is desired that a difference between the melting point of the boiled heptane-insoluble component and the crystallization temperature thereof is not more than 45° C., preferably not more than 43° C., particularly preferably not more than 40° C. In the propylene block copolymer of the invention, it is desired that a difference between the melting point of the boiled heptane-insoluble component and the crystallization temperature thereof is not more than 45° C., preferably not more than 43° C., particularly preferably not more than 40° C.

The propylene polymer of the invention desirably has an intrinsic viscosity [η], as measured in decalin at 135° C., of usually 30 to 0.001 dl/g, preferably 10 to 0.01 dl/g, particularly preferably 5 to 0.05 dl/g. The propylene block copolymer of the invention desirably has an intrinsic viscosity [η], as measured in decalin at 135° C., of usually 30 to 0.001 dl/g, preferably 10 to 0.01 dl/g, particularly preferably 8 to 0.05 dl/g.

The propylene polymer of the invention mentioned as above can be prepared, for example, by a process comprising polymerizing propylene in the presence of a catalyst for olefin polymerization (i.e., olefin polymerization catalyst) formed from:

[Ia] a solid titanium catalyst component (a) containing magnesium, titanium, halogen and an electron donor as essential components;

[II] an organometallic catalyst component (b); and

[III] a silicon compound represented by the following formula (iii) or a compound having at least two ether linkages existing via plurality of atoms:

$$R^a_n\text{—Si—}(OR^b)_{4-n} \quad (iii)$$

wherein, n is 1, 2 or 3; when n is 1, $R^a$ is a secondary or a tertiary hydrocarbon group; when n is 2 or 3, at least one of $R^a$ is a secondary or a tertiary hydrocarbon group, Ra may be the same or different, and $R^b$ is a hydrocarbon group of 1 to 4 carbon atoms; and when 4–n is 2 or 3, $R^b$ may be the same or different.

The olefin polymerization catalyst used in the above process is preferably formed from:

[Ib] a prepolymerized catalyst obtained by prepolymerizing at least one olefin selected from olefins represented by the following formula (i) or (ii) in the presence of (a) a solid titanium catalyst component containing magnesium, titanium, halogen and an electron donor as essential components and (b) an organometallic catalyst component;

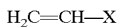

$$H_2C=CH\text{—}X \quad (i)$$

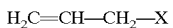

$$H_2C=CH\text{—}CH_2\text{—}X \quad (ii)$$

wherein X is a cycloalkyl group, an aryl group or

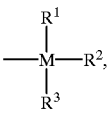

$$\begin{array}{c} R^1 \\ | \\ \text{—M—}R^2, \\ | \\ R^3 \end{array}$$

M is carbon or silicon, $R^1$ and $R^2$ are each a hydrocarbon group, and $R^3$ is hydrogen or a hydrocarbon group;

[II] the organometallic catalyst component (b); and

[III] the silicon -compound represented by the above-mentioned formula (iii) or the compound having at least two ether linkages existing via plurality of atoms.

The propylene block copolymer of the invention can be prepared, for example, by a process comprising a first polymerization stage for homopolymerizing propylene or copolymerizing propylene with ethylene and/or olefin of 4 to 10 carbon atoms to prepare a crystalline polymer (crystalline polypropylene portion) and a second polymerization stage for copolymerizing ethylene with two or more monomers selected from olefins of 3 to 20 carbon atoms to prepare a low-crystalline copolymer (low-crystalline copolymer portion) or a non-crystalline copolymer (non-crystalline copolymer portion), in the presence of a catalyst for olefin polymerization (i.e., olefin polymerization catalyst) formed from:

[Ia] the solid titanium catalyst component (a) containing magnesium, titanium, halogen and an electron donor as essential components;

[II] the organometallic catalyst component (b); and

[III] the silicon compound represented by the above-mentioned formula (iii) or the compound having at least two ether linkages existing via plurality of atoms.

The olefin polymerization catalyst used in the above process is preferably formed from:

[Ib] the prepolymerized catalyst obtained by prepolymerizing at least one olefin selected from olefins represented by the above-mentioned formula (i) or (ii) in the presence of (a) the solid titanium catalyst component containing magnesium, titanium, halogen and an electron donor as essential components and (b) the organometallic catalyst component;

[II] the organometallic catalyst component (b); and

[III] the silicon compound catalyst component represented by the above-mentioned formula (iii) or the compound having at least two ether linkages existing via plurality of atoms.

Figure 2:
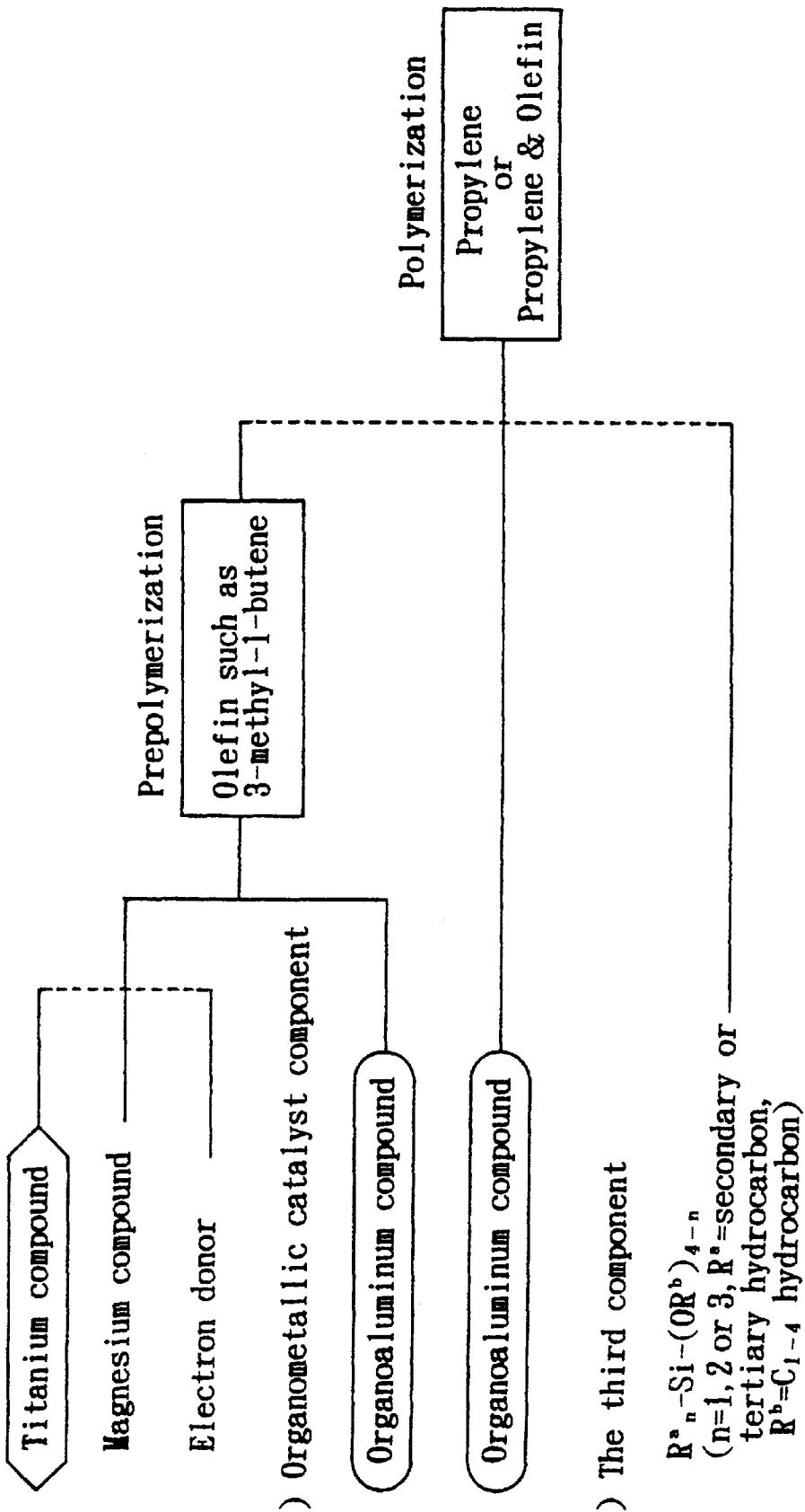
FIG. 2 also illustrate steps of a process for preparing a catalyst for olefin polymerization which is used for the preparation of a propylene polymer or a propylene block copolymer according to the present invention.

Each of FIG. 1 and FIG. 2 illustrates steps of a process for preparing the olefin polymerization catalyst which is used for preparing the propylene polymer or the propylene block copolymer of the present invention.

Each components for forming the olefin polymerization catalyst used for preparing the propylene polymer or the propylene block copolymer of the invention are described in detail hereinafter.

The solid titanium catalyst component (a) can be prepared by bringing a magnesium compound, a titanium compound and an electron donor described below into contact with each other.

The titanium compound used for preparing the solid titanium catalyst component (a) is, for example, a tetravalent titanium compound represented by the following formula:

$$Ti(OR)_gX_{4-g}$$

wherein R is a hydrocarbon group, X is a halogen atom, and g is a number satisfying the condition of $0 \leq g \leq 4$.

Concrete examples of the titanium compounds include:

titanium tetrahalide such as $TiCl_4$, $TiBr4$ and $TiI_4$;

alkoxytitanium trihalide such as $Ti(OCH_3)Cl_3$, $Ti(OC_2H_5)C_3$, $Ti(On-C_4H_9)Cl_3$, $Ti(OC_2H_5)Br_3$ and $Ti(O\text{-}iso\text{-}C_4H_9)Br_3$;

dialkoxytitanium dihalide such as $Ti(OCH_3)_2Cl_2$, $Ti(OC_2H_5)_2Cl_2$, $Ti(On-C_4H_9)_2Cl_2$ and $Ti(OC_2H_5)_2Br_2$;

trialkoxytitanium monohalide such as $Ti(OCH_3)_3Cl$, $ti(OC_2H_5)_3Cl$, $Ti(On-C_4H_9)_3Cl$ and $Ti(OC_2H_5)_3Br$; and tetraalkoxytitanium such as $Ti(OCH_3)_4$, $Ti(OC_2H_5)_4$, $Ti(On-C_4H_9)_4$, $Ti(O\text{-}iso\text{-}C_4H_9)_4$ and $Ti(O\text{-}2\text{-}ethylhexyl)$.

Of the above-exemplified compounds, preferred are halogen-containing compounds, more preferred are titanium tetrahalides, and particularly preferred is titanium tetrachloride. These titanium compounds may be used singly or in combination. Further, they may be diluted in hydrocarbon compounds or halogenated hydrocarbon compounds.

The magnesium compound used for preparing the solid titanium catalyst component (a) includes a magnesium compound having reduction properties and a magnesium compound having no reduction properties.

The magnesium compound having reduction properties is, for example, a magnesium compound having a magnesium-to-carbon bond or a magnesium-to-hydrogen bond. Concrete examples of the magnesium compound having reduction properties include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxylmagnesium, ethylbutylmagnesium and butylmagnsium hydride. These magnesium compounds may be used singly or may be used in combination with organometallic compounds described later to form complex compounds. Further, these magnesium compounds may be liquid or solid, and may be derived by causing metallic magnesium to react with a compound corresponding to the metallic magnesium. Furthermore, they may be derived from metallic magnesium by the above method during the preparation of the catalyst.

Concrete examples of the magnesium compound having no reduction properties include magnesium halide such as magnesium chloride, magnesium bromide, magnesium iodide and magnesium fluoride; alkoxymagnesium halide such as methoxylmagnesium chloride, ethoxymagnesium chloride, isopropoxymagnesium chloride, butoxymagnesium chloride and octoxymagnesium chloride; allyloxymagnesium halide such as phenoxymagnesium chloride and methylphenoxymagnesium chloride; alkoxymagnesium such as ethoxymagnesium, isopropoxymagnesium butoxymagnesium, n-octoxymagnesium and 2-ethylhexoxymagnesium; allyloxymagnesium such as phenoxymagnesium and dimethylphenoxymagnesium; and manesium carboxylate such as magnesium laurate and magnesium stearate.

These magnesium compounds having no reduction properties may be those derived from the above-mentioned magnesium compounds having reduction properties or those derived during the catalyst component preparation stage. In order to derive the magnesium compound having no reduction properties from the magnesium compound having reduction properties, the magnesium compound having reduction properties is brought into contact with halogen, a polysiloxane compound, a halogen-containing silane compound, a halogen-containing aluminum compound, a compound having an active carbon-to-oxygen bond such as alcohol, ester, ketone and aldehyde.

As the magnesium compound, there can be used complex compounds or composite compounds of the above-mentioned magnesium compounds having or not having reduction properties with other metals, or mixtures of the above-mentioned magnesium compounds having or not having reduction properties with other metallic compounds. Further, these compounds may be used in combination of two or more kinds.

Other various magnesium compounds than the above-mentioned ones can be used for preparing the solid titanium catalyst component (a), but it is preferred that the magnesium compound takes a form of a halogen-containing magnesium compound in the solid titanium catalyst component (a) finally obtained. Accordingly, if a magnesium compound containing no halogen is used, the compound is preferably brought into contact with a halogen-containing compound in the course of the catalyst preparation.

Of the above-mentioned magnesium compounds, preferred are magnesium compounds having no reduction properties. More preferred are halogen-containing magnesium compounds. Particularly preferred are magnesium chloride, alkoxymagnesium chloride and allyloxymagnesium chloride.

The solid titanium catalyst component (a) used in the invention is formed by bringing such a magnesium compound as mentioned above into contact with the aforesaid titanium compound and an electron donor.

Concrete examples of the electron donor employable for preparing the solid titanium catalyst component (a) include:

amines such as methylamine, ethylamine, dimethylamine, diethylamine, ethylenediamine, tetramethylenediamine, hexamethylenediamine, tributylamine and tribenzylamine;

pyrroles such as pyrrole, methylpyrrole and dimethylpyrrole;

pyrroline;

pyrrolidine;

indole;

pyridines such as pyridine, methylpyridine, ethylpyridine, propylpyridine, dimethylpyridine, ethylmethylpyridine, trimethylpyridine, phenylpyridine, benzylpyridine and pyridine chloride;

nitrogen-containing cyclic compounds such as piperidines, quinolines and isoquinolines;

oxygen-containing cyclic compounds such as tetrahydrofuran, 1,4-cineol, 1,8-cineol, pinolfuran, methylfuran, dimethylfuran, diphenylfuran, benzofuran, coumaran, phthalan, tetrahydropyran, pyran and dihydropyran;

alcohols of 1 to 18 carbon atoms such as methanol, ethanol, propanol, pentanol, hexanol, octanol, 2-ethylhexanol, dodecanol, octadecyl alcohol, oleyl alcohol, benzyl alcohol, phenylethyl alcohol, cumyl alcohol, isopropyl alcohol and isopropylbenzyl alcohol;

phenols of 6 to 20 carbon atoms which may have lower alkyl group such as phenol, cresol, xylenol, ethylphenol, propylphenol, nonylphenol, cumylphenol and naphthol;

ketones of 3 to 15 carbon atoms such as acetone, methyl ethyl ketone, methyl isobutyl ketone, acetophenone, benzophenone, acetylacetone and benzoquinone;

aldehydes of 2 to 15 carbon atoms such as acetaldehyde, propionaldehyde, octylaldehyde, benzaldehyde, tolualdehyde and naphthaldehyde;

organic esters of 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethyl carbonate;

acid halides of 2 to 15 carbon atoms such as acetylchloride, benzoylchloride, toluic acid chloride and anisic acid chloride;

ethers of 2 to 20 carbon atoms such as methyl ether, ethyl ether, isopropyl ether, butyl ether, amyl ether, anisole and diphenyl ether epoxy-p-menthane;

diethers such as 2-isopentyl-2-isopropyl-1,3-dimethoxypropane, 2,2-isobutyl-1,3-dimethoxypropane, 2,2-isoproyl-1,3-dimethoxypropane, 2-cyclohexylmethyl-2-isopropyl-1,3-dimethoxypropane, 2,2-isopentyl-1,3-dimethoxypropane, 2-isobutyl-2-isopropyl-1,3-dimethoxypropane, 2-cyclohexyl-2-isopropyl-1,3-dimethoxypropane, 2-cyclopentyl-2-isopropyl-1,3-dimethoxypropane, 2,2-dicyclopentyl-1,3-dimethoxypropane, 1,2-bis-methoxymethyl-bicyclo-[2,2,1]-heptane, diphenyldimethoxysilane, isopropyl-t-butyldimethoxysilane, 2,2-diisobutyl-1,3-dimethoxyhexane and 2-isopentyl-2-isopropyl-1,3-dimethoxycylohexane;

acid amides such as acetic acid amide, benzoic acid amide and toluic acid amide;

nitriles such as acetonitrile, benzonitrile and tolunitrile; and acid anhydrides such as acetic anhydride, phthalic anhydride and benzoic anhydride.

Also employable as the electron donor is a silicon compound represented by the formula (iii) described later.

When the titanium compound, the magnesium compound and the electron donor are brought into contact with each other, a carrier compound may be used to prepare a solid titanium catalyst component (a) supported on a carrier.

Examples of the carrier compounds include $Al_2O_3$, $SiO_2$, $B_2O_3$, MgO, CaO, $TiO_2$, ZnO, $ZnO_2$, $SnO_2$, BaO, ThO and resins such as a styrene/divinylbenzene copolymer. Of these carrier compounds, preferred are $SiO_2$, $Al_2O_3$, MgO, ZnO and $ZnO_2$.

The above-mentioned components may be brought into contact with each other in the presence of a reaction agent such as silicon, phosphorus and aluminum.

The solid titanium catalyst component (a) is prepared by bringing the aforementioned titanium compound, magnesium compound and the electron donor into contact with each other by known methods.

Examples of the processes for preparing the solid titanium catalyst component (a) are briefly described below.

(1) A process comprising bringing a solution consisting of a magnesium compound, an electron donor and a hydrocarbon solvent into contact with an organometallic compound, after or simultaneously with precipitating a solid by bringing the solution into contact with a titanium compound.

(2) A process comprising bringing a complex composed of a magnesium compound and an electron donor into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor and/or an organometallic compound.

(4) A process comprising obtaining an inorganic or organic carrier on which a magnesium compound is supported from a mixture of an inorganic or organic carrier and a solution containing a magnesium compound and an electron donor (and further a hydrogen solvent in some cases), and then bringing the obtained carrier into contact with a titanium compound.

(5) A process comprising bringing a solution containing a magnesium compound, a titanium compound and an electron donor (and further a hydrogen solvent in some cases) into contact with an inorganic or organic carrier to obtain a solid titanium catalyst component on which magnesium and titanium are supported.

(6) A process comprising bringing a liquid organic magnesium compound into contact with a halogen-containing titanium compound. In this case, an electron donor is used at least one time.

(7) A process comprising bringing a liquid organic magnesium compound into contact with a halogen-containing compound, and then bringing the product thus obtained into contact with a titanium compound. In this case, an electron donor is used at least one time (8) A process comprising bringing an alkoxy group-containing magnesium compound into contact with a halogen-containing titanium compound. In this case, an electron donor is used at least one time (9) A process comprising bringing a complex composed of an alkoxy group-containing magnesium compound and an electron donor into contact with a titanium compound.

(10) A process comprising bringing a complex composed of an alkoxy group-containing magnesium compound and an electron donor into contact with an organometallic compound, and then bringing the product thus obtained into contact with a titanium compound.

(11) A process comprising bringing a magnesium compound, an electron donor and a titanium compound into contact with each other in an optional order. In this reaction, each components may be pretreated with an electron donor and/or a reaction assistant such as an organometallic compound or a halogen-containing silicon compound. In this case, an electron donor is preferably used at least one time

(12) A process comprising bringing a liquid magnesium compound not having reducing ability into contact with a liquid titanium compound, if necessary in the presence of an electron donor, to precipitate a solid magnesium/titanium complex compound.

(13) A process comprising further bringing the reaction product obtained in the above process (12) into contact with an titanium compound.

(14) A process comprising further bringing the reaction product obtained in the above process (11) or (12) into contact with an electron donor and a titanium compound.

(15) A process comprising pulverizing a magnesium compound and a titanium compound (and if necessary an electron donor) to obtain a solid product, and treating the solid product with either halogen, a halogen compound or aromatic hydrocarbon. This process may include a step of pulverizing only a magnesium compound, a step of pulverizing a complex compound composed of a magnesium compound and an electron donor, or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor or a reaction assistant may be used in the pulverization stage and/or the contacting reaction stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor.

(19) A process comprising bringing a magnesium compound such as a magnesium salt of organic acid, alkoxymagnesium or aryloxymagnesium into contact with a titanium compound and/or halogen-containing hydrocarbon and if necessary an electron donor.

(20) A process comprising bringing a hydrocarbon solution containing at least a magnesium compound and alkoxytitanium into contact with a titanium compound and/or an electron donor. In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) complex compound, and then bringing the resulting compound into contact with an electron donor and a titanium compound.

The amount of each component used in the preparation of the solid titanium catalyst component (a) differs from each preparation method, and can not be defined in general. However, for example, the electron donor is used in an amount 0.01 to 10 mol, preferably 0.1 to 5 mol, and the titanium compound is used in an amount of 0.01 to 1000 mol, preferably 0.1 to 200 mol, both based on 1 mol of the magnesium compound.

The solid titanium catalyst component (a) thus obtained contains titanium, magnesium, halogen and an electron donor as its essential ingredients.

In the solid titanium catalyst component (a), a ratio of halogen/titanium (atomic ratio) is about 2 to 200, preferably about 4 to 100, the a ratio of electron donor/titanium (molar ratio) is about 0.01 to 100, preferably about 0.02 to 10 and, a ratio of magnesium/titanium (atomic ratio) is 1 to 100, preferably 2 to 50.

The solid titanium catalyst component (a) (catalyst component [Ia]) is desirably used as a prepolymerized catalyst component [Ib] obtained by prepolymerization of olefin in the presence of said solid titanium catalyst component (a) and the following organometallic catalyst component (b).

The organometallic catalyst component (b) used in the preparation of the prepolymerized catalyst component [Ib] includes a organometallic compound of the metals belonging to the Group I to III of the periodic table,in concrete, such compounds as mentioned below;

organoaluminum compounds represented by the following formula (b-1)

$$R^1_m Al(OR^2)_n H_p X_q \quad (b-1)$$

wherein $R^1$ and $R^2$ may be the same or different and represent independently a hydrocarbon group having normally 1 to 15 carbon atoms, preferably 1 to 4 carbon atoms; X is halogen; and m, n, p and q are numbers satisfying $0<m\leq3$, $0\leq n<3$, $0\leq p<3$, $0\leq q<3$ and $m+n+p+q=3$;

complex alkyl compounds of aluminum with Group I metals of the periodic table, represented by the following formula (b-2)

$$M^1 AlR^1_4 \quad (b-2)$$

wherein $M^1$ is Li, Na or K and $R^1$ is as defined above; and dialkyl compounds of Group II or III metals represented by the following formula $$R^1 R^2 M^2 \quad (b-3)$$

wherein $R^1$ and $R^2$ are as defined above, and $M^2$ is Mg, Zn or Cd.

Examples of the organoaluminum compounds having the formula (b-1) include:

compounds having the general formula of $R^1_m Al(OR^2)_{3-m}$ wherein $R^1$ and $R^2$ are as defined above, and m is a number preferably satisfying $1.5\leq m\leq 3$;

compounds having the general formula of $R^1_m AlX_{3-m}$ wherein $R^1$ and X are as defined above, and m is a number preferably satisfying $0<m<3$;

compounds having the general formula of $R^1_m Al_{3-m}$ wherein $R^1$ is as defined above, and m is a number preferably satisfying $2\leq m<3$; and compounds having the general formula of $R^1_m Al(OR^2)_n X_q$ wherein $R^1$, $R^2$ and X are as defined above, and m, n and q are numbers satisfying $0<m\leq3$, $0\leq n<3$, $0\leq q<3$ and $m+n+q=3$.

Concrete examples of the organoaluminum compounds having the formula (b-1) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of $R^1_{2.5} Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydride, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the organoaluminum compounds similar to the above-mentioned compounds represented by formula (b-1) include organoaluminum compounds in which two or more aluminum atoms are bonded together via, for example, an oxygen atom or a nitrogen atom. Concrete examples of such compounds are as follows:

(C₂H₅)₂AlOAl(C₂H₅)₂,

(C₄H₉)₂AlOAl(C₄H₉)₂, and

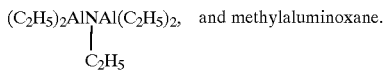(C₂H₅)₂AlNAl(C₂H₅)₂, and methylaluminoxane.
        |
        C₂H₅

Examples of the organoaluminum compounds having the formula (b-2) include

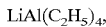LiAl(C₂H₅)₄, and

LiAl(C₇H₁₅)₄.

Among the above-exemplified compounds, preferred are organoaluminum compounds.

The olefin used in the preparation of the prepolymerization catalyst component [Ib] includes the compound represented by the above-mentioned formula (i) or (ii), concretely, olefins having a branched structure such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornene, styrene, dimethylstyrenes, vinylnaphthalene, allyltoluenes, allylbenzene, vinylcyclohexane, vinylcyclopentane, vinylcycloheptane and allyltrialkylsilanes. Of these, preferred are 3-methyl-1-butene, 3-methyl-1-pentene, 3-ethyl-1-hexene, vinylcyclohexane, allyltrimethylsilane and dimethylstylene, more preferred are 3-methyl-1-butene, vinylcyclohexane and allyltrimethylsilane, and particularly preferred is 3-methyl-1-butene.

Furthermore, linear chain olefins such as ethylene, propylene, 1-butene, 1-octene, 1-hexadecene and 1-eicocene may be used in combination with the above-mentioned branched olefins.

The prepolymerization can be carried out in the presence of considerably higher-concentration of catalyst compared to the catalyst concentration in the system of propylene polymerization.

In the pre-polymerization, the solid titanium catalyst component (a) is desirably used in a concentration of normally about 0.01 to 200 mmol, preferably about 0.05 to 100 mmol, in terms of titanium atom, based on 1 liter of the later-described inert hydrocarbon solvent.

The organometallic catalyst component (b) is used in an amount so as to produce a polymer of 0.1 to 1000 g, preferably 0.3 to 500 g per 1 gram of the solid titanium catalyst component (a), and is used in a concentration of normally about 0.1 to 100 mmol, preferably about 0.5 to 50 mmol based on 1 mol of titanium atom in the solid titanium catalyst component (a).

In the prepolymerization, an electron donor may be optionally used with the solid titanium catalyst component (a) and organometallic catalyst component (b). The electron donor employable in the prepolymerization include, concretely, the aforementioned electron donor used in the preparation of the solid titanium catalyst component (a), the later-described silicon compound represented by the formula (iii), a compound having at least two ether linkages existing via plurality of atoms, and an organosilicon compound represented by the following formula (c-i);

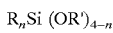RₙSi(OR')₄₋ₙ          (c-i)

wherein each of R and R' is a hydrocarbon group, and n is a number satisfying the condition of 0<n<4.

The later-described silicon compounds represented by the formula (iii) are not included in the organosilicon compounds represented by this formula (c-i).

Concrete examples of the organosilicon compounds represented by the above formula (c-i) include: trimethylmethoxysilane, trimethylethoxysilane, dimethyldimethoxysilane, dimethyldiethoxysilane, diphenyldimethoxysilane, phenylmethyldimethoxysilane, diphenyldiethoxysilane, bis-o-tolyldimethoxysilane, bis-p-tolyldiethoxysilane, bis-ethylphenyldimethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-aminopropyltriethoxysilane, chlorotriethoxysilane, ethyltrisopropoxysilane, vinyltributoxysilane, ethyl silicate, butyl silicate, trimethylphenoxysilane, methyltriallyoxysilane, vinyltris(β-methoxyethoxysilane), vinyltriacetoxysilane and dimethyltetraethoxysilane.

The above-mentioned electron donors (c) may be used in combination of two or more kinds.

In the case of using an electron donor in the prepolymerization, the amount of the electron donor is in the range of 0.1 to 50 mol, preferably 0.5 to 30 mol, more preferably 1 to 10 mol, per 1 mol to titanium atom contained in the solid titanium catalyst component (a).

The prepolymerization is preferably carried out under a mild condition by adding the olefin represented by the above formula (i) or (ii) and the above mentioned catalyst components into an inert hydrocarbon solvent.

Concrete examples of the above-mentioned inert solvents include:

aliphatic hydrocarbons such as propane, butane, pentane, hexane, heptane, octane, decane, dodecane and kerosine;

alicyclic hydrocarbons such as cyclopentane, cyclohexane and methylcyclopentane;

aromatic hydrocarbons such as benzene, toluene and xylene;

halogenated hydrocarbons such as ethylene chloride and chlorobenzene; and mixtures of these hydrocarbons.

Of these inert hydrocarbon media, preferably used are aliphatic hydrocarbons.

The reaction temperature in the prepolymerization is a temperature at which the resulting prepolymer is not substantially dissolved in the inert hydrocarbon solvent, and is desired to be in the range of usually about −20 to +100° C., preferably about −20 to +80° C., more preferably −10 to +40° C. A molecular weight regulator such as hydrogen can be used in the prepolymerization.

The prepolymerization is desirably carried out so as to obtain about 0.1 to 1000 g, preferably about 0.3 to 500 g of polymer, per 1 g of the above mentioned solid titanium catalyst component (a). When the amount of the polymer produced in the prepolymerization is too much, the productive efficiency of the (co)polymer produced in the main polymerization is lowered, and the films formed from the resulting (co)polymer have a tendency to create a fish-eye.

The prepolymerization can be carried out by any process of a batch process and a continuous process.

The olefin polymerization catalyst used for the preparation of the propylene polymer or propylene block copolymer according to the present invention is formed from the above mentioned solid titanium catalyst component [Ia] or the prepolymerized catalyst component [Ib], an organometallic catalyst component [II], and [III] a silicon compound or a compound having at least two ether linkages existing via plurality of atoms.

As the organometallic catalyst component [II], the aforementioned organometallic catalyst component (b) used in the preparation of the prepolymerized catalyst component [Ib] can be employed.

The silicon compound [III] is the compound represented by the following formula (iii);

$$R^a{}_n\text{—Si—}(OR^b)_{4-n} \tag{iii}$$

wherein, n is 1, 2 or 3; when n is 1, $R^a$ is a secondary or a tertiary hydrocarbon group; when n is 2 or 3, at least one of $R^a$ is a secondary or a tertiary hydrocarbon group, $R^a$ may be the same or different, and $R^b$ is a hydrocarbon group of 1 to 4 carbon atoms; and when 4−n is 2 or 3, $R^b$ may be the same or different.

In the silicon compound represented by the formula (iii), the secondary or the tertiary hydrocarbon group includes cyclopentyl, cyclopentenyl and cyclopentadienyl, and substituted thereof, and the hydrocarbon group in which the carbon adjacent to Si is a secondary or tertiary.

More concretely, the substituted cyclopentyl group includes cyclopentyl group having alkyl group such as 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl;

the substituted cyclopentenyl group includes cyclopentenyl group having alkyl group such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl;

the substituted cyclopentadienyl group includes cyclopentadienyl group having alkyl group such as 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

The hydrocarbon group in which the carbon adjacent to Si is a secondary includes i-propyl, s-butyl, s-amyl and α-benzyl; and the hydrocarbon group in which the carbon adjacent to Si is a tertiary includes t-butyl, t-amyl, α, α-diemethylbenzyl and admantyl.

When n is 1, the silicon compound represented by the formula (iii) includes trialkoxysilanes such as cyclopentyltrimethoxysilane, 2-methylcyclopentyltrimethoxysilane, 2,3-dimethylcyclopentyltrimethoxysilane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane, and 2-norbornanetriethoxysilane;

when n is 2, the silicon compound represented by the formula (iii) includes dialkoxysilanes such as dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, and 2-norbornanemethyldimethoxysilane.

When n is 2, the silicon compound represented by the formula (iii) is preferably dimethoxy compound represented by the following formula (iv);

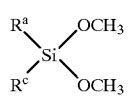

(iv)

wherein, $R^a$ and $R^c$ are each independently a cyclopentyl group, a substituted cyclopentyl group, a cyclopentenyl group, a substituted cyclopentenyl group, cyclopentadienyl group, a substituted cyclopentadienyl group or a hydrocarbon group whose carbon adjacent to Si is a secondary carbon or a tertiary carbon.

The silicon compound represented by the formula (iv) includes, for example, dicyclopentyldimethoxysilane, dicyclopentenyldimethoxyxilane, dicyclopentadienyldimethoxyxilane, di-t-butyldimethoxysilane, di-(2-methylcyclopentyl) dimethoxysilane, di-(3-methylcyclopentyl)dimethoxysilane, di-(2-ethylcyclopentyl)dimethoxysilane, di-(2,3-dimethylcyclopentyl)dimethoxysilane, di-(2,4-dimethylcyclopentyl)dimethoxysilane, di-(2,5-dimethylcyclopentyl)dimethoxysilane, di-(2,3-diethylcyclopentyl)dimethoxysilane, di-(2,3,4-trimethylcyclopentyl)dimethoxysilane, di-(2,3,5-trimethylcyclopentyl)dimethoxysilane, di-(2,3,4-triethylcyclopentyl)dimethoxysilane, di-(tetramethylcyclopentyl)dimethoxysilane, di-(tetraethylcyclopentyl)dimethoxysilane, di-(2-methylcyclopentenyl)dimethoxysilane, di-(3-methylcyclopentenyl)dimethoxysilane, di-(2-ethylcyclopentenyl)dimethoxysilane, di-(2-n-butycyclopentenyl)dimethoxysilane, di-(2,3-dimethylcyclopentenyl)dimethoxysilane, di-(2,4-dimethylcyclopentenyl)dimethoxysilane, di-(2,5-dimethylcyclopentenyl)dimethoxysilane, di-(2,3,4-trimethylcyclopentenyl)dimethoxysilane, di-(2,3,5-trimethylcyclopentenyl)dimethoxysilane, di-(2,3,4-triethylcyclopentenyl)dimethoxysilane, di-(tetramethylcyclopentenyl)dimethoxysilane, di-(tetraethylcyclopentenyl)dimethoxysilane, di-(2-ethylcyclopentadienyl)dimethoxysilane, di-(3-methylcyclopentadienyl)dimethoxysilane, di-(2-ethylcyclopentadienyl)dimethoxysilane, di-(2-n-butylcyclopentadienyl)dimethoxysilane, di-(2,3-dimethylcyclopentadienyl)dimethoxysilane, di-(2,4-dimethylcyclopentadienyl)dimethoxysilane, di-(2,5-dimethylcyclopentadienyl)dimethoxysilane, di-(2,3-diethylcyclopentadienyl)dimethoxysilane, di-(2,3,4-trimethylcyclopentadienyl)dimethoxysilane, di-(2,3,5-trimethylcyclopentadienyl)dimethoxysilane, di-(2,3,4-triethylcyclopentadienyl)dimethoxysilane, di-(2,3,4,5-tetramethylcyclopentadienyl)dimethoxysilane, di-(2,3,4,5-tetraethylcyclopentadienyl)dimethoxysilane, di-(1,2,3,4,5-pentamethylcyclopentadienyl)dimethoxysilane, di-(1,2,3,4,5-pentaethylcyclopentadienyl)dimethoxysilane, di-t-amyldimethoxysilane, di-(α,α'-dimethylbenzyl)dimethoxysilane, di-(admantyl)dimethoxysilane, admantyl-t-butyldimethoxysilane, cyclopentyl-t-butyldimethoxysilane, di-isopropyldimethoxysilane, di-s-butyldimethoxysilane, di-s-amyldimethoxysilane, and isopropyl-s-butyldimethoxysilane.

When n is 3, the silicon compound represented by the formula (iii) includes monoalkoxysilanes such as tricyclopentylmethoxysilane, tricyclopentylethoxysilane, dicyclopentylmethylmethoxysilane, dicyclopentylethylmethoxysilane, dicyclopentylmethylethoxysilane, dicyclopentyldimethylmethoxysilane, cyclopentyldiethylmethoxysilane, and cyclopentyldimethylethoxysilane.

Of these, preferred are dimethoxysilanes, particularly preferred are dimethoxysilanes represented by the formula (iv), to be concretely, preferably used is dicyclopentyldimethoxysilane, di-t-butyldimethoxysilane, di-(2-methylcyclopentyl)dimethoxysilane, di-(3-methylcyclopentyl)dimethoxysilane or do-t-amyldimethoxysilane.

In the compound (hereinafter sometimes referred as "polyether compound") having at least two ether linkages existing via plurality of atoms used in the present invention, the atoms existing between these ether linkages are at least one kind of atom selected from the group consisting of carbon, silicon, oxygen, sulfur, phosphorus and boron, and the number of the atoms are not less than two. Of these compounds mentioned above, preferred are those in which a relatively bulky substituent attaches to the atom intermediately existing between the ether linkages. The relatively bulky substituent concretely means the substituent having 2 or more of carbon atoms, preferably the substituent having a structure of linear, branched or cyclic containing 3 or more of carbon atoms, particularly the substituent having branched or cyclic structure. Further, preferred is a compound containing plurality of, preferably 3 to 20, more preferably 3 to 10, particularly preferably 3 to 7 carbon atoms in the atoms intermediately existing between at least two ether linkages.

Such polyether compound as mentioned above includes, for example, those represented by the following formula

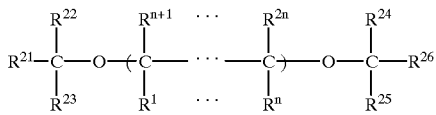

wherein n is an integer of $2 \leq n \leq 10$, $R^1$–$R^{26}$ are each a substituent having at least one element selected from among carbon, hydrogen, oxygen, halogen, nitrogen, sulfur, phosphorus, boron and silicon, any of $R^1$–$R^{26}$, preferably $R^1$–$R^2n$ may form, together a ring other than a benzene ring, and the main chain of the compound may contain atoms other than carbon.

The polyether compound as illustrated above includes 2-(2-ethylhexyl)-1,3-dimethoxypropane, 2-isopropyl-1,3-dimethoxypropane, 2-butyl-1,3-dimethoxypropane, 2-s-butyl-1,3-dimethoxypropane, 2-cyclohexyl-1,3-dimethoxypropane, 2-phenyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(2-fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-iso-propyl-1,3-dimethoxypropane, 2-methyl-2-phenyl-1,3-dimethoxypropane, 2-methyl-2-cyclohexyl-1,3-dimethoxypropane, 2,2-bis(p-chlorophenyl)-1,3-dimethoxypropane, 2,2-bis(2-cyclohexylethyl)-1,3-dimethoxypropane, 2-methyl-2-iso-butyl-1,3-dimethoxypropane, 2-methyl-2-(2-ethylhexyl)-1,3-dimethoxypropane, 2,2-di-iso-butyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-di-iso-butyl-1,3-diethoxypropane, 2,2-di-iso-butyl-1,3-dibutoxypropane, 2-iso-butyl-2-iso-propyl-1,3-dimethoxypropane, 2-(1-methylbutyl)-2-isopropyl-1,3-dimethoxypropane, 2-(1-methylbutyl)-2-s-butyl-1,3-dimethoxypropane, 2,2-di-s-butyl-1,3-dimethoxypropane, 2,2-di-t-butyl-1,3-dimethoxypropane, 2,2-dineopentyl-1,3-dimethoxypropane, 2-iso-propyl-2-iso-pentyl-1,3-dimethoxypropane, 2-phenyl-2-isopropyl-1,3-dimethoxypropane, 2-phenyl-2-s-butyl-1,3-dimethoxypropane, 2-benzyl-2-isopropyl-1,3-dimethoxypropane, 2-benzyl-2-s-butyl-1,3-dimethoxypropane, 2-phenyl-2-benzyl-1,3-dimethoxypropane, 2-cyclopentyl-2-isopropyl-1,3-dimethoxypropane, 2-cyclopentyl-2-s-butyl-1,3-dimethoxypropane, 2-cyclohexyl-2-isopropyl-1,3-dimethoxypropane, 2-cyclohexyl-2-s-butyl-1,3-dimethoxypropane, 2-isopropyl-2-s-butyl-1,3-dimethoxypropane, 2-cyclohexyl-2-cyclohexylmethyl-1,3-dimethoxypropane, 2,3-diphenyl-1,4-diethoxybutane, 2,3-dicyclohexyl-1,4-diethoxybutane, 2,2-dibenzyl-1,4-diethoxybutane, 2,3-dicyclohexyl-1,4-diethoxybutane, 2,3-di-iso-propyl-1,4-diethoxybutane, 2,2-bis(p-methylphenyl)-1,4-dimethoxybutane, 2,3-bis(p-chlorophenyl)-1,4-dimethoxybutane, 2,3-bis(p-fluorophenyl)-1,4-dimethoxybutane, 2,4-diphenyl-1,5-dimethoxypentane, 2,5-diphenyl-1,5-dimethoxyhexane, 2,4-di-iso-propyl-1,5-dimethoxypentane, 2,4-di-iso-butyl-1,5-dimethoxypentane, 2,4-di-iso-amyl-1,5-dimethoxypentane, 3-methoxymethyltetrahydrofuran, 3-methoxymethyldioxane, 1,3-di-iso-butoxypropane, 1,2-di-iso-butoxypropane, 1,2-di-iso-butoxyethane, 1,3-di-iso-amyloxypropane, 1,3-di-iso-neopentyloxyethane, 1,3-dineopentyloxypropane, 2,2-tetramethylene-1,3-dimethoxypropane, 2,2-pentamethylene-1,3-dimethoxypropane, 2,2-hexamethylene-1,3-dimethoxypropane, 1,2-bis(methoxymethyl)cyclohexane, 2,8-dioxaspiro[5,5]undecane, 3,7-dioxabicyclo[3,3,1]nonane, 3,7-dioxabicyclo[3,3,0]octane, 3,3-di-iso-butyl-1,5-oxononane, 6,6-di-iso-butyldioxyheptane, 1,1-dimethoxymethylcyclopentane, 1,1-bis(dimethoxymethyl)cyclohexane, 1,1-bis(methoxymethyl)bicyclo[2,2,]heptane, 1,1-dimethoxymethylcyclopentane, 2-methyl-2-methoxymethyl-1,3-dimethoxypropane, 2-cyclohexyl-2-ethoxymethyl-1,3-diethoxypropane, 2-cyclohexyl-2-methoxymethyl-1,3-dimethoxypropane, 2,2-di-iso-butyl-1,3-dimethoxycyclohexane, 2-iso-propyl-2-iso-amyl-1,3-dimethoxycyclohexane, 2-cyclohexyl-2-methoxymethyl-1,3-dimethoxycyclohexane, 2-iso-propyl-2-methoxymethyl-1,3-dimethoxycyclohexane, 2-iso-butyl-2-methoxymethyl- 1,3-dimethoxycyclohexane, 2-cyclohexyl-2-ethoxymethy-1,
3-diethoxycyclohexane, 2-cyclohexyl-2-ethoxymethyl-1,3-
dimethoxycyclohexane, 2-iso-propyl-2-ethoxymethyl-1,3-
diethoxycyclohexane, 2-iso-propyl-2-ethoxymethyl-1,3-
dimethoxycyclohexane, 2,-iso-butyl-2-ethoxymethyl-1,3-
diethoxycyclohexane, 2-iso-butyl-2-ethoxymethyl-1,3-
dimethoxycyclohexane, tris (p-methoxyphenyl)phospine,
methlphenylbis(methoxymethyl)silane, diphenylbis
(methoxymethyl) silane, methylcyclohexylbis
(methoxymethyl) silane, di-t-butylbis(methoxymethyl)
silane, cyclohexyl-t-butylbis (methoxymethyl)silane and
iso-propyl-t-butylbis(methoxymethyl)silane.

Of these compounds, preferred are 1,3-diethers, especially, 2,2-di-iso-butyl-1,3-dimethoxypropane, 2-iso-propyl-2-iso-pentyl-1,3-dimethoxypropane, 2,2-dicyclohexyl-1,3 dimethoxypropane and Z,2-bis (cyclohexylmethyl)1,3-dimethoxypropane. These compounds may be used either singly or in combination.

Next, processes for preparing the propylene polymer and the propylene block copolymer of the invention are described.

The propylene polymer of the invention can be obtained by polymerizing propylene in the presence of the olefin polymerization catalyst formed from the solid titanium catalyst component [Ia], the organometallic catalyst component [III] and the silicon compound represented by the formula (iii) or the polyether compound [III], preferably in the presence of the olefin polymerization catalyst formed from the prepolymerized catalyst component [Ib], the organometallic catalyst component [II] and the silicon compound catalyst component represented by the formula (iii) or the polyether compound [III].

In the polymerization of propylene, a small amount of other olefin than propylene or a small amount of a diene compound may be present in the polymerization system in addition to propylene.

Examples of the olefin other than propylene include ethylene and olefins of 3 to 8 carbon atoms such as 1-butene, 1-pentene, 1-hexene, 4-methyl-1-pentene, 3-methyl-1-pentene, 1-octene and 3-methyl-1-butene.

Examples of the diene compound include diene compounds of 4 to 20 carbon atoms such as 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1, 6-nonadiene, 7-methyl-1, 6-nonadiene, 6-ethyl-1,6-nonadiene, 7-ethyl-1, 6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicyclopentadiene.

The polymerization of propylene is generally conducted in a gas phase or a liquid phase.

When the polymerization is a slurry polymerization or a solution polymerization, the same inert hydrocarbon as used for preparing the aforesaid prepolymerized catalyst component [Ib] can be employed as a reaction solvent.

In the polymerization system, the solid titanium catalyst component [Ia] or the prepolymerized catalyst component [Ib] is used in an amount of usually about 0.0001 to 50 mmol, preferably about 0.001 to 10 mmol, in terms of titanium atom contained in the solid titanium catalyst component [Ia] or contained in the prepolymerized catalyst component [Ib], per 1 liter of the polymerization volume. The organometallic catalyst component [II] is used in such an amount that the amount of the metal atom contained in the organometallic catalyst component [II] might be in the range of usually about 1 to 2,000 mol, preferably about 2 to 500 mol, per 1 mol of the titanium atom in the polymerization system. The silicon compound or the polyether compound [III] is used in an amount of usually about 0.001 to 50 mol, preferably about 0.01 to 20 mol, per 1 mol of the metal atom in the organometallic catalyst component [II].

If hydrogen is used in the polymerization stage, a propylene polymer having a high melt flow rate can be obtained. Further, the molecular weight of the propylene polymer can be controlled by adjusting the amount of hydrogen. Even in the case of using hydrogen, the obtained propylene polymer of the invention is never lowered in the crystallinity and the pentad isotacticity, and moreover the catalytic activity is not reduced.

In the invention, the polymerization of propylene is carried out at a temperature of usually about −50 to 200 ° C., preferably about 20 to 100° C., under a pressure of usually an ordinary pressure to 100 kg/cm$^2$, preferably about 2 to 50 kg/cm$^2$. The polymerization may be carried out either batchwise, semi-continuously or continuously.

In this process of the invention, propylene is desirably polymerized in an amount of 3,000 to 1,000,000 g per 1 g of the solid titanium catalyst component (a) in the aforesaid prepolymerized catalyst component [Ib].

When a propylene polymer is prepared as above, an yield of the propylene polymer per unit amount of the solid catalyst component can be increased, and hence the amount of the catalyst residue (particularly halogen content) in the propylene polymer can be relatively reduced. Accordingly, an operation for removing the catalyst residue contained in the propylene polymer can be omitted, and moreover in the case of molding the obtained propylene polymer, a mold can be easily prevented from occurrence of rust.

In the propylene polymer obtained as above, an amount of an amorphous component (amorphous portion) is extremely small, and thereby an amount of the hydrocarbon-soluble component is also small. Accordingly, when a film is formed from the propylene polymer, the film is low in the surface tackiness.

The propylene polymer of the invention may be prepared in two or more polymerization stages having different reaction conditions. In this case, the polymerization is carried out in a gas phase or a liquid phase using 2 to 10 polymerizers.

When the polymerization is a slurry polymerization or a solution polymerization, the same inert hydrocarbon as used for preparing the aforesaid prepolymerized catalyst component [Ib] can be employed as a reaction solvent.

In this polymerization process, polymerization of propylene is conducted in at least one polymerizer among the two or more polymerizers, to prepare a polymer having an intrinsic viscosity [η] of 3 to 40 dl/g, preferably 5 to 30 dl/g, particularly preferably 7 to 25 dl/g. This polymerization is sometimes referred to as "A polymerization" hereinafter.

It is desired that the isotactic pentad value (pentad isotacticity) [M$_5$] determined by the NMR measurement of the boiled heptane-insoluble component in the polymer obtained in this A polymerization is in the range of 0.960 to 0.995, preferably 0.970 to 0.995, more preferably 0.980 to 0.995, most preferably 0.982 to 0.995.

It is also desired that the amount of the boiled heptane-insoluble component in the polymer is not less than 80%, preferably not less than 90%, more preferably not less than 94%, much more preferably not less than 95%, particularly preferably not less than 96%.

In the A polymerization, the polymer is desirably prepared in such a manner that the amount of the polymer obtained in the A polymerization might be in the range of 0.1 to 55%, preferably 2 to 35%, particularly preferably 5 to 30%, based on the amount of the polymer finally obtained.

In the case of preparing the propylene polymer using two or more polymerizers, polymerization of propylene is also conducted in the residual polymerizers out of the two or more polymerizers to prepare a propylene polymer having a melt flow rate of 0.1 to 500 g/10 min as a final polymer. This polymerization is sometimes referred to as "B polymerization" hereinafter.

In the A polymerization and the B polymerization, the solid titanium catalyst component [Ia] or the prepolymerized catalyst component [Ib] is used in an amount of usually about 0.0001 to 50 mmol, preferably about 0.001 to 10 mmol, in terms of titanium atom contained in the solid titanium catalyst component [Ia] or contained in the prepolymerized catalyst component [Ib], per 1 liter of the polymerization volume. The organometallic catalyst component [II] is used in such an amount that the amount of the metal atom contained in the organometallic catalyst component [II] might be in the range of usually about 1 to 2,000 mol, preferably about 2 to 500 mol, per 1 mol of the titanium atom in the polymerization system. The silicon compound or the polyether compound [III] is used in an amount of usually about 0.001 to 50 mol, preferably about 0.01 to 20 mol, per 1 mol of the metal atom in the organometallic catalyst component [III].

If necessary, the solid titanium catalyst component [Ia] or the prepolymerized catalyst component [Ib], the organometallic catalyst component [II] and the silicon compound or the polyether compound [III] may be added to any of the plural polymerizers. Further, the electron donor used in the preparation of the solid titanium catalyst component (a) and/or the organosilicon compound represented by the above formula (c-i) may be added to any of the plural polymerizers.

Further, in any of the A polymerization and the B polymerization, hydrogen may be fed or removed, whereby the molecular weight of the propylene polymer can be easily regulated. Even in this case, the obtained propylene polymer of the invention is never lowered in the crystallinity and the pentad isotacticity, and moreover the catalytic activity is not reduced. The feed amount of hydrogen varies according to the reaction conditions, but generally, the feed amount of hydrogen is such an amount that the melt flow rate of the polymer finally obtained might be in the range of 0.1 to 500 g/10 min.

The value $[M_5]$ of the boiled heptane-insoluble component is usually in the range of 0.975 to 0.995, preferably 0.980 to 0.995, more preferably 0.982 to 0.995; and the value $[M_3]$ of the boiled heptane-insoluble component is usually in the range of 0.0020 to 0.0050, preferably 0.0023 to 0.0045, more preferably 0.0025 to 0.0040.

In the A polymerization and the B polymerization, the polymerization of propylene is carried out at a temperature of usually about −50 to 200° C., preferably about 20 to 100° C., under a pressure of usually an ordinary pressure to 100 kg/cm$^2$, preferably about 2 to 50 kg/cm$^2$. The polymerization may be carried out either batchwise, semi-continuously or continuously.

In this process of the invention, propylene is desirably polymerized in an amount of 3,000 to 100,000 g per 1 g of the solid titanium catalyst component (a) in the aforesaid prepolymerized catalyst component [Ib].

The propylene block copolymer of the invention can be prepared by a process comprising a first polymerization stage for homopolymerizing propylene or copolymerizing propylene with ethylene and/or olefin of 4 to 10 carbon atoms to prepare a crystalline polymer (crystalline polypropylene portion) and a second polymerization stage for copolymerizing two or more monomers selected from olefins of 2 to 20 carbon atoms to prepare a low-crystalline copolymer (low-crystalline copolymer portion) or a non-crystalline copolymer (non-crystalline copolymer portion), in the presence of a catalyst for olefin polymerization (i.e., olefin polymerization catalyst) formed from the solid titanium catalyst component [Ia], the organometallic catalyst component [II] and the silicon compound represented by the aforesaid formula (iii) or the polyether compound (III), preferably in the presence of the olefin polymerization catalyst formed from the prepolymerized catalyst component [Ib], the organometallic catalyst component [II] and the silicon compound represented by the aforesaid formula (iii) or the polyether compound [III].

In this process for preparing a propylene block copolymer, at first, homopolymerization of propylene or copolymerization of propylene with ethylene and/or olefin of 4 to 10 carbon atoms is carried out in the first polymerization stage.

Concrete examples of the olefin of 4 to 10 carbon atoms include 1-butene, 1-pentene, 1-hexene, 4-methyl-1-pentene, 3-methyl-1-pentene, 1-octene, 3-methyl-1-butene, 1-decene, 1-dodecene, 1-tetradecene, 1-hexadecene, 1-octadecene, 1-eicosene, cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

in the first polymerization stage, the polymerization is carried out generally in a gas phase or a liquid phase.

When the polymerization is a slurry polymerization or a solution polymerization, the same inert hydrocarbon as used for preparing the aforesaid prepolymerized catalyst component [Ib] can be employed as a reaction solvent.

In the first polymerization stage, the solid titanium catalyst component [Ia] or the prepolymerized catalyst component [Ib] is used in an amount of usually about 0.0001 to 50 mmol, preferably about 0.001 to 10 mmol, in terms of titanium atom contained in the solid titanium catalyst component [Ia] or contained in the prepolymerized catalyst component [Ib], per 1 liter of the polymerization volume. The organometallic catalyst component [II] is used in such an amount that the amount of the metal atom contained in the organometallic catalyst component [II] might be in the range of usually about 1 to 2,000 mol, preferably about 2 to 500 mol, per 1 mol of the titanium atom in the polymerization system. The silicon compound or the polyether compound [III] is used in an amount of usually about 0.001 to 50 mol, preferably about 0.01 to 20 mol, per 1 mol of the metal atom in the organometallic catalyst component [II].

Hydrogen may be used in the first polymerization stage, whereby the molecular weight of the polymer obtained can be regulated.

In the first polymerization stage, the polymerization of propylene is carried out at a temperature of usually about ±50 to 200° C., preferably about 20 to 100° C., under a pressure of usually an ordinary pressure to 100 kg/cm$^2$, preferably about 2 to 50 kg/cm$^2$. The polymerization may be carried out either batchwise, semi-continuously or continuously.

It is desired that a content of the constituent units derived from ethylene and/or olefin of 4 to 10 carbon atoms in the polymer obtained in the first polymerization stage is in the range of 0 to 20% by mol, preferably 0 to 15% by mol, particularly preferably 0 to 10% by mol.

It is also desired that the polymer obtained in the first polymerization stage has an intrinsic viscosity [η], as measured in decalin at 135° C., of 40 to 0.001 dl/g, preferably 30 to 0.01 dl/g, particularly preferably 20 to 0.05 dl/g.

In the first polymerization stage, in addition to propylene and ethylene and/or olefin of 4 to 10 carbon atoms, a small amount of a diene compound may be added to the polymerization system so as to introduce constituent units derived from the diene compound into the polymer obtained in the first polymerization stage.

Examples of the diene compounds employable herein include diene compounds of 4 to 20 carbon atoms such as 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicyclopentadiene. Of these, preferred are diene compounds of 5 to 12 carbon atoms such as 1,4-hexadiene, 1,5-hexadiene, 4-methyl-1,4-hexadiene, 5-methyl-1,4-hexadiene, 7-methyl-1,6-octadiene, ethylidenenorbornene and vinylnorbornene.

In the preparation of the propylene block copolymer according to the invention, there is a method, for example, after the first polymerization stage, copolymerization of two or more monomers selected from olefins of 2 to 20 carbon atoms is carried out in the presence of the polymer obtained in the first polymerization stage.

Examples of the olefins of 2 to 20 carbon atoms used herein include ethylene, propylene, 1-butene, 1-pentene, 1-hexene, 4-methyl-1-pentene, 3-methyl-1-pentene, 1-octene, 3-methyl-1-butene, 1-decene, 1-dodecene, 1-tetradecene, 1-hexadecene, 1-octadecene, 1-eicosene, cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene. Preferably used are olefins of 3 to 12 carbon atoms.

In the second polymerization stage, the polymerization is carried out generally in a gas phase or a liquid phase.

When the polymerization is a slurry polymerization or a solution polymerization, the same inert hydrocarbon as used for preparing the aforesaid prepolymerized catalyst component [Ib] can be employed as a reaction solvent.

In the second polymerization stage, if necessary, the solid titanium catalyst component [Ia] or the prepolymerized catalyst component [Ib], organometallic catalyst component [II], and the silicon compound or the polyether compound [III] may be added. The solid titanium catalyst component [Ia] or the prepolymerized catalyst component [Ib] may be added in an amount of usually about 0.0001 to 50 mmol, preferably about 0.001 to 10 mmol, in terms of titanium atom contained in the solid titanium catalyst component [Ia] or contained in the prepolymerized catalyst component [Ib], per 1 liter of the polymerization volume. The organometallic catalyst component [II] may be added in such an amount that the amount of the metal atom contained in the organometallic catalyst component [II] might be in the range of usually about 1 to 2,000 mol, preferably about 2 to 500 mol, per 1 mol of the titanium atom added in the polymerization system. The silicon compound or the polyether compound [III] may be used in an amount of usually about 0.001 to 50 mol, preferably about 0.01 to 20 mol, per 1 mol of the metal atom in the organometallic catalyst component [II].

If hydrogen is used in the second polymerization system, the molecular weight of resulting low-crystalline or non-crystalline olefin copolymer can be regulated by adjusting the amount of hydrogen.

In the second polymerization stage, the polymerization of propylene is carried out at a temperature of usually about −50 to 200° C., preferably about 20 to 100° C., under a pressure of usually an ordinary pressure to 100 kg/cm$^2$, preferably about 2 to 50 kg/cm$^2$. The polymerization may be carried out either batchwise, semi-continuously or continuously.

In the second polymerization stage, small amount of diene compound may be introduced into the reaction system as similar to the above-mentioned first polymerization stage. Further, the electron donor used in the preparation of the solid titanium catalyst component (a) and/or the organosilicon compound represented by the above formula (c-i) may be added to any of the first and second polymerization stage.

When a propylene block copolymer is prepared as above, an yield of the propylene block copolymer per unit amount of the solid catalyst component can be increased, and hence the amount of the catalyst residue (particularly halogen content) in the propylene block copolymer can be relatively reduced. Accordingly, an operation for removing the catalyst residue contained in the propylene block copolymer can be omitted, and moreover in the case of molding the obtained propylene block copolymer, a mold can be easily prevented from occurrence of rust.

In the propylene block copolymer obtained by the above process, a content of the propylene units is in the range of 50 to 98% by mol, preferably 60 to 97% by mol.

The amount of the decane-soluble component in the propylene block copolymer is not more than 50%, and this 1decane-soluble component mainly contains a copolymer obtained in the second polymerization stage. The composition of the copolymer varies depending on the kind of olefin used, and hence it cannot be determined generally. However, in the copolymerization of ethylene with propylene, it is desired that a content of the propylene units in the copolymer is in the range of 20 to 80% by mol, preferably 25 to 75% by mol, particularly preferably 30 to 70% by mol. The decane-soluble component desirably has an intrinsic viscosity [η], as measured in decalin at 135° C., of 0.5 to 20 dl/g, preferably 1 to 15 dl/g, more preferably 2 to 12 dl/g, particularly preferably 2.5 to 10 dl/g.

Further, the MFR of the prepylene block copolymer is in the range of 0.1 to 500 g/10 min, preferably 0.2 to 300 g/10 min, and is easily controlled by varying the conditions of first or second polymerization stage, such as an amount of feeding hydrogen and polymerization temperature.

The propylene polymer and the propylene block copolymer according to the invention may contain such a nucleating agent as described later. By adding the nucleating agent to the propylene polymer or the propylene block copolymer, the crystal particles can be made more fine and the crystallization speed can be heightened, whereby high-speed molding is attained.

There is no specific limitation on the nucleating agent employable herein, and various nucleating agents conventionally known can be used. Of various nucleating agents, preferred are those represented by the following formulas.

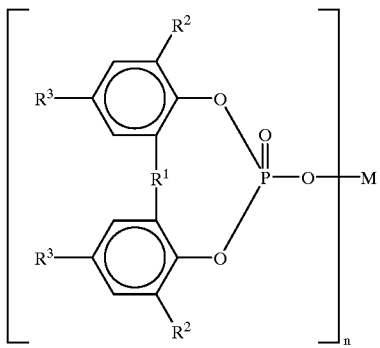

wherein $R^1$ is oxygen, sulfur or a hydrocarbon group of 1 to 10 carbon atoms; each of $R^2$ and $R^3$ is hydrogen or a hydrocarbon group of 1 to 10 carbon atoms; $R^2$ and $R^3$ may be the same as or different from each other; two of $R^2$, two of $R^3$, or $R^2$ and $R^3$ may be bonded together to form a ring, M is a monovalent to trivalent metal atom; and n is an integer of 1 to 3.

Concrete examples of the nucleating agents represented by the above formula include sodium-2,2'-methylene-bis(4,6-di-t-butylphenyl)phosphate, sodium-2,2'-ethylidene-bis(4,6-di-t-butylphenyl)phosphate, lithium-2,2'-methylene-bis(4,6-di-t-butylphenyl)phosphate, lithium-2,2'-ethylidene-bis(4,6-di-t-butylphenyl)phosphate, sodium-2,2'-ethylidene-bis(4-i-propyl-6-t-butylphenyl)phosphate, lithium-2,2'-methylene-bis(4-methyl-6-t-butylphenyl)phosphate, lithium-2,2-methylene-bis (4-ethyl-6-t-butylphenyl) phosphate, calcium-bis [2,2'-thiobis (4-methyl-6-t-butylphenyl)phosphate], calcium-bis[2,2'-thiobis(4-ethyl-6-t-butylphenyl)phosphate], calcium-bis[2,2'-thiobis-(4,6-di-t-butylphenyl)phosphate], magnesium-bis[2,2'-thiobis-(4,6-di-t-butylphenyl)phosphate], magnesium-bis[2,2'-thiobis-(4-t-octylphenyl)phosphate], sodium-2,2'-butylidene-bis (4,6-dimethylphenyl)phosphate, sodium-2,2'-butylidene-bis (4,6-di-t-butylphenyl)phosphate, sodium-2,2'-t-octylmethylene-bis(4,6-dimethylphenyl)phosphate, sodium-2,2'-t-octylmethylene-bis(4,6-di-t-butylphenyl)phosphate, calcium-bis[2,2'-methylene-bis(4,6-di-t-butylphenyl)phosphate], magnesium-bis[2,2'-methylene-bis(4,6-di-t-butylphenyl)phosphate], barium-bis[2,2'-methylene-bis(4,6-di-t-butylphenyl)phosphate], sodium-2,2'-methylene-bis(4-methyl-6-t-butylphenyl)phosphate, sodium-2,2'-methylene-bis(4-ethyl-6-t-butylphenyl)phosphate, sodium(4,4'-dimethyl-5,6'-di-t-butyl-2,2'-biphenyl)phosphate, calcium-bis[(4,4'-dimethyl-6,6'-di-t-butyl-2,2'-biphenyl)phosphate], sodium-2,2'-ethylidene-bis(4-m-butyl-6-t-butylphenyl)phosphate, sodium-2,2'-methylene-bis(4,6-dimethylphenyl)phosphate, sodium-2,2'-methylene-bis(4,6-diethylphenyl)phosphate, potassium-2,2'-ethylidene-bis(4,6-di-t-butylphenyl)phosphate, calcium-bis[2,2'-ethylidene-bis(4,6-di-t-butylphenyl)phosphate], magnesium-bis[2,2'-ethylidene-bis(4,6-di-t-butylphenyl)phosphate], barium-bis [2,2'-ethylidene-bis(4,6-di-t-butylphenyl)phosphate], aluminum-tris[2,2'-methylene-bis(4,6-di-t-butylphenyl)phosphate] and aluminum-tris[2,2'-ethylidene-bis(4,6-di-t-butylphenyl)phosphate]. Mixtures of two or more of these nucleating agents are also employable. Of these, sodium-2,2'-methylene-bis(4,6-di-t-butylphenyl)phosphate is particularly preferred.

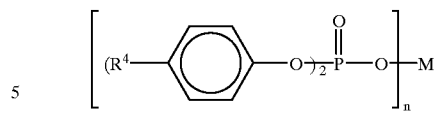

wherein $R^4$ is hydrogen or a hydrocarbon group of 1 to 10 carbon atoms; M is a monovalent to trivalent metal atom; and n is an integer of 1 to 3.

Concrete examples of the nucleating agents represented by the above formula include sodium-bis(4-t-butylphenyl)phosphate, sodium-bis(4-methylphenyl)phosphate, sodium-bis(4-ethylphenyl)phosphate, sodium-bis(4-i-propylphenyl)phosphate, sodium-bis(4-t-octylphenyl)phosphate, potassium-bis(4-t-butylphenyl)phosphate, calcium-bis(4-t-butylpheyl) phosphate, magnesium-bis(4-t-butylpheyl) phosphate, lithium-bis(4-t-butylpheyl)phosphate and aluminum-bis(4-t-butylpheyl)phosphate. Mixtures of two or more of these nucleating agents are also employable. Of these, sodium-bis(4-t-butylphenyl)phosphate is particularly preferred.

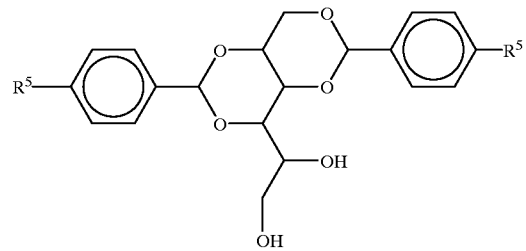

wherein $R^5$ is hydrogen or a hydrocarbon group of 1 to 10 carbon atoms.

Concrete examples of the nucleating agents represented by the above formula include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol and 1,3,2,4-di(p-chlorobenzylidene)sorbitol. Mixtures of two or more of these nucleating agents are also employable. Of these, 1,3,2,4-dibenzylidenesorbitol, 1,3,2,4-di(p-methylbenzylidene)sorbitol, 1,3,2,4-di(p-ethylbenzylidene) sorbitol, 1,3-p-chlorobenzylidene-2,4-p-methylbenzylidenesorbitol, 1,3,2,4-di(p-chlorobenzylidene)sorbitol and mixtures of two or more of these nucleating agents are particularly preferred.

Also employable are other nucleating agents such as metallic salts of aromatic carboxylic acids and metallic salts of aliphatic carboxylic acids. Concrete examples thereof include aluminum benzoate, aluminum p-t-butylbenzoate, sodium adipate, sodium thiophenecarboxylate and sodium pyrrolecarboxylate.

Inorganic compounds such as talc described later may be also used.

In the propylene polymer of the invention, the nucleating agent is used in an amount of 0.001 to 10 parts by weight, preferably 0.01 to 5 parts by weight, more preferably 0.1 to 3 parts by weight, based on 100 parts by weight of the propylene polymer.

By the use of the nucleating agent in the above-mentioned amount, there can be obtained a propylene polymer having extremely fine crystalline particles and enhanced in crystallinity without deterioration of excellent properties inherently belonging to the propylene polymer.

In the propylene block copolymer of the invention, the nucleating agent is used in an amount of 0.001 to 10 parts by weight, preferably 0.01 to 5 parts by weight, more preferably 0.1 to 3 parts by weight, based on 100 parts by weight of the propylene block copolymer.

By the use of the nucleating agent in the above-mentioned amount, there can be obtained a propylene block copolymer having extremely fine crystalline particles and enhanced in crystallinity without deterioration of excellent properties inherently belonging to the propylene block copolymer.

To the propylene polymer and the propylene block copolymer of the invention may be added various additives such as rubber component to enhance impact strength, heat stabilizer, weathering stabilizer, antioxidant, slip agent, antiblocking agent, antifogging agent, lubricant, dye, pigment, natural oil, synthetic oil and wax. They can be added in appropriate amounts.

Further, to the propylene polymer and the propylene block copolymer of the invention may be added fillers such as silica, diatomaceous earth, alumina, titanium oxide, magnesium oxide, pumice powder, pumice balloon, aluminum oxide, magnesium oxide, basic magnesium carbonate, dolomite, calcium sulfate, potassium titanate, barium sulfate, calcium sulfite, talc, clay, mica, asbestos, glass fiber, glass flake, glass bead, calcium silicate, montmorillonite, bentonite, graphite, aluminum powder, molybdenum sulfide, borone fiber, silicon carbide fiber, polyethylene fiber, polypropylene fiber, polyester fiber and polyamide fiber, with the proviso that the objects of the invention are not marred.

The propylene polymer of the invention can be used without specific limitation in a field where polypropylene has been conventionally used, and particularly it can be favorably used for extruded sheet, unstretched film, stretched film, filament, injection molded product and blow molded product.

There is no specific limitation on the shape and the kind of the extrusion molded product made of the propylene polymer of the invention. Concretely, there can be mentioned sheet, film (unstretched film), pipe, hose, electric wire cover and filament. The extrusion molded product made of the propylene polymer is particularly preferably used as sheet, film (unstretched film) and filament.

In order to extrusion mold the propylene polymer of the invention into a sheet, a film (unstretched film) or the like, conventionally known extrusion apparatuses such as a single screw extruder, a kneading extruder, a ram extruder and a gear extruder can be used. Using such extruder, a molten propylene polymer is extruded from a T-die or the like to prepare an extrusion molded product. The extrusion molding can be carried out under the molding conditions conventionally known.

The extruded sheet and film (unstretched film) prepared as above are excellent in rigidity, heat resistance and moisture resistance.

A stretched film can be prepared from the above-mentioned sheet or film made of the propylene polymer by conventional stretching methods using known stretching machines, such as tentering (lengthwise-crosswise stretching, crosswise-lengthwise stretching), simultaneous biaxial stretching (biaxial orientation) and monoaxial stretching. The stretch ratio of the biaxially stretched (oriented) film is preferably in the range of 20 to 70 times, while the stretch ratio of the monoaxially stretched film is preferably in the range of 2 to 10 times. The thickness of the stretched film is desirably in the range of 5 to 200 $\mu$m.

Such stretched film is excellent in rigidity, heat resistance and moisture resistance.

From the propylene polymer of the invention, an inflation film can be also prepared.

Since the sheet, the unstretched film and the stretched film composed of the propylene polymer of the invention are excellent in heat resistance, transparency, see-through properties, glossiness, rigidity, moisture resistance, gas barrier properties, etc., they can be widely applied to packaging films or other uses. In particular, they are very suitable for press through pack used for packaging of pharmaceutical tablets or capsules.

The filament composed of the propylene polymer of the invention can be prepared, for example, by extruding a molten propylene polymer through a spinning nozzle. The filament thus obtained may be further subjected to stretching. This stretching is carried out in such a manner that the molecular orientation at least in the monoaxial direction is effectively given to the propylene polymer, and the stretch ratio is desirably in the range of 5 to 10 times.

Such filament is excellent in rigidity and heat resistance.

The injection molded product composed of the propylene polymer of the invention can be prepared using a conventionally known injection molding apparatus. The injection molding can be carried out under the molding conventionally known. Since the injection molded product is excellent in rigidity, heat resistance, impact resistance, surface glossiness, chemical resistance, abrasion resistance, etc., it can be widely used for automotive interior trims, automotive exterior trims, housings for electrical appliances, containers, etc.

The blow molded product composed of the propylene polymer of the invention can be prepared using a conventionally known blow molding apparatus. The blow molding can be carried out under the molding conditions conventionally known. For example, in the extrusion blow molding, a molten propylene polymer is extruded from a die to form a tubular parison at a resin temperature of 100 to 300° C., then the parison is kept within a mold having an aimed shape, and air is blown into the mold at a resin temperature of 130 to 300° C. to obtain a hollow molded product. In this case, the stretch ratio is desirably within the range of 1.5 to 5 times in the crosswise direction.

In the injection blow molding, a molten propylene polymer is injected into a mold to form a parison at a resin temperature of 100 to 300° C., then the parison is kept within a mold having an aimed shape, and air is blown into the mold at a resin temperature of 120 to 300° C. to obtain a hollow molded product. In this case, the stretch ratio is desirably within the range of 1.1 to 1.8 times in the lengthwise direction and within the range of 1.3 to 2.5 times in the crosswise direction.

Such blow molded product is excellent in rigidity, heat resistance and moisture resistance.

The propylene polymer of the invention can be used as a substrate in a method wherein a skin material and a substrate are subjected to press molding at the same time to prepare an integrally molded product (i.e., mold stamping method). The molded product obtained by the mold stamping can be favorably used as automotive interior trims such as door trim, rear package trim, sheet back garnish and instrument panel.

The molded product obtained by the mold stamping is excellent in rigidity and heat resistance.

The propylene block copolymer of the invention can be used without specific limitation in a field where polypropylene has been conventionally used, and particularly it can be favorably used for extruded sheet, filament, injection molded product and blow molded product.

There is no specific limitation on the shape and the kind of the extrusion molded product composed of the propylene block copolymer of the invention. Concretely, there can be mentioned sheet, pipe, hose, electric wire cover and filament. The extrusion molded product made of the propylene block copolymer is particularly preferably used as sheet and filament.

In order to extrusion mold the propylene block copolymer of the invention into a sheet, or the like, conventionally known extrusion apparatuses such as a single screw extruder, a kneading extruder, a ram extruder and a gear extruder can be used. Using such extruder, a molten propylene block copolymer is extruded from a T-die or the like to prepare an extrusion molded product. The extrusion molding can be carried out under the molding conditions conventionally known.

The extruded sheet prepared as above is excellent in a balance between rigidity, heat resistance and impact resistance.

The filament composed of the propylene block copolymer of the invention can be prepared, for example, by extruding a molten propylene block copolymer through a spinning nozzle. The filament thus obtained may be further subjected to stretching. This stretching is carried out in such a manner that the molecular orientation at least in the monoaxial direction is effectively given to the propylene block copolymer, and the stretch ratio is desirably in the range of 5 to 10 times.

Such filament is excellent in rigidity and heat resistance.

The injection molded product composed of the propylene block copolymer of the invention can be prepared using a conventionally known injection molding apparatus. The injection molding can be carried out under the molding conditions conventionally known. Since the injection molded product is excellent in rigidity, heat resistance, impact resistance, surface glossiness, chemical resistance, abrasion resistance, etc., it can be widely used for automotive interior trims, automotive exterior trims, housings for electrical appliances, containers, etc.

The blow molded product composed of the propylene block copolymer of the invention can be prepared using a conventionally known blow molding apparatus. The blow molding can be carried out under the molding conditions conventionally known. For example, in the extrusion blow molding, a molten propylene block copolymer is extruded from a die to form a tubular parison at a resin temperature of 180 to 300° C., then the parison is kept within a mold having an aimed shape, and air is blown into the mold at a resin temperature of 130 to 300° C. to obtain a hollow molded product. In this case, the stretch ratio is desirably within the range of 1.5 to 5 times in the crosswise direction.

In the injection blow molding, a molten propylene block copolymer is injected into a mold to form a parison at a resin temperature of 110 to 300° C., then the parison is kept within a mold having an aimed shape, and air is blown into the mold at a resin temperature of 120 to 300° C. to obtain a hollow molded product. In this case, the stretch ratio is desirably within the range of 1.1 to 1.8 times in the lengthwise direction and within the range of 1.3 to 2.5 times in the crosswise direction.

Such blow molded product is excellent in rigidity, heat resistance and moisture resistance.

The propylene block copolymer of the invention can be used as a substrate in a method wherein a skin material and a substrate are subjected to press molding at the same time to prepare an integrally molded product (i.e., mold stamping method). The molded product obtained by the mold stamping can be favorably used as automotive interior trims such as door trim, rear package trim, sheet back garnish and instrument panel.

The molded product obtained by the mold stamping is excellent in a balance between rigidity, heat resistance and impact resistance.

Next, the propylene polymer compositions of the invention are described.

The first propylene polymer composition of the invention is formed from:

[A1] the aforesaid propylene polymer, and

[B] a phenol type stabilizer in an amount of 0.001 to 10 parts by weight, preferably 0.003 to 5 parts by weight, more preferably 0.005 to 3 parts by weight, based on 100 parts by weight of the above propylene polymer.

The second propylene polymer composition of the invention is formed from:

[A1] the aforesaid propylene polymer,

[B] a phenol type stabilizer in an amount of 0.001 to 10 parts by weight, preferably 0.003 to 5 parts by weight, more preferably 0.005 to 3 parts by weight, based on 100 parts by weight of the above propylene polymer, and at least one compound selected from the group consisting of [C] an organophosphite type stabilizer, [D] a thioether type stabilizer, [E] a hindered amine type stabilizer and [F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene polymer.

When the content of the phenol type stabilizer [B] is within the above range based on 100 parts by weight of the propylene polymer, heat resistance can be highly improved, the stabilizer is available at a low cost, and properties of the propylene polymer such as tensile strength are not deteriorated.

When the content of at least one compound selected from the group consisting of the organophosphite type stabilizer [C], the thioether type stabilizer [D], the hindered amine type stabilizer [E] and the metallic salt of a higher aliphatic acid [F] is within the above range based on 100 parts by weight of the propylene polymer, heat resistance can be highly improved, the stabilizer is available at a low cost, and properties of the propylene polymer such as tensile strength are not deteriorated.

When the content of the metallic salt of a higher aliphatic acid [F] is within the above range, a residual chlorine of the catalyst remained in the propylene polymer can be sufficiently absorbed, whereby properties of the propylene polymer are never deteriorated.

It is particularly preferred that the second propylene polymer composition of the invention contains the phenol type stabilizer [B] in an amount of 0.005 to 2 parts by weight, the organophosphite type stabilizer [C] in an amount of 0.005 to 2 parts by weight, the thioether type stabilizer [D] in an amount of 0.005 to 2 parts by weight, the hindered amine type stabilizer [E] in an amount of 0.005 to 2 parts by weight and the metallic salt of higher aliphatic acid [F] in an amount of 0.005 to 2 parts by weight, each based on 100 parts by weight of the propylene polymer.

The third propylene polymer composition of the invention is formed from:

[A1] the aforesaid propylene polymer, and

[C] an organophosphite type stabilizer in an amount of 0.001 to 10 parts by weight, preferably 0.003 to 5 parts by weight, more preferably 0.005 to 3 parts by weight, based on 100 parts by weight of the above propylene polymer.

The fourth propylene polymer composition of the invention is formed from:

[A1] the aforesaid propylene polymer,

[C] an organophosphite type stabilizer in an amount of 0.001 to 10 parts by weight, preferably 0.003 to 5 parts by weight, more preferably 0.005 to 3 parts by weight, based on 100 parts by weight of the above propylene polymer, and at least one compound selected from the group consisting of [D] a thioether type stabilizer, [E] a hindered amine type stabilizer and [F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene polymer.

When the content of the organophosphite type stabilizer [C] is within the above range based on 100 parts by weight of the propylene polymer, heat resistance can be highly improved, the stabilizer is available at a low cost, and properties of the propylene polymer such as tensile strength are not deteriorated.

When the content of at least one compound selected from the group consisting of the thioether type stabilizer [D], the hindered amine type stabilizer [E] and the metallic salt of a higher aliphatic acid [F] is within the above range based on 100 parts by weight of the propylene polymer, heat resistance can be highly improved, the stabilizer is available at a low cost, and properties of the propylene polymer such as tensile strength are not deteriorated.

When the content of the metallic salt of a higher aliphatic acid [F] is within the above range, a residual chlorine of the catalyst remained in the propylene polymer can be sufficiently absorbed, whereby properties of the propylene polymer are never deteriorated.

It is particularly preferred that the fourth propylene polymer composition of the invention contains the organophosphite type stabilizer [C] in an amount of 0.005 to 2 parts by weight, the thioether type stabilizer [D] in an amount of 0.005 to 2 parts by weight, the hindered amine type stabilizer [E] in an amount of 0.005 to 2 parts by weight and the metallic salt of higher aliphatic acid [F] in an amount of 0.005 to 2 parts by weight, each based on 100 parts by weight of the propylene polymer [A1].

The fifth propylene polymer composition of the invention is formed from:

[A1] the aforesaid propylene polymer, and [D] a thioether type stabilizer in an amount of 0.001 to 10 parts by weight, preferably 0.003 to 5 parts by weight, more preferably 0.005 to 3 parts by weight, based on 100 parts by weight of the above propylene polymer.

The sixth propylene polymer composition of the invention is formed from:

[A1] the aforesaid propylene polymer,

[D] a thioether type stabilizer in an amount of 0.001 to 10 parts by weight, preferably 0.003 to 5 parts by weight, more preferably 0.005 to 3 parts by weight, based on 100 parts by weight of the above propylene polymer, and at least one compound selected from the group consisting of [E] a hindered amine type stabilizer and [F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene polymer.

When the content of the thioether type stabilizer [D] is within the above range based on 100 parts by weight of the propylene polymer, heat resistance can be highly improved, the stabilizer is available at a low cost, and properties of the propylene polymer such as tensile strength are not deteriorated.

When the content of at least one compound selected from the group consisting of the hindered amine type stabilizer [E] and the metallic salt of a higher aliphatic acid [F] is within the above range based on 100 parts by weight of the propylene polymer, heat resistance can be highly improved, the stabilizer is available at a low cost, and properties of the propylene polymer such as tensile strength are not deteriorated.

When the content of the metallic salt of a higher aliphatic acid [F] is within the above range, a residual chlorine of the catalyst remained in the propylene polymer can be sufficiently absorbed, whereby properties of the propylene polymer are never deteriorated.

It is particularly preferred that the sixth propylene polymer composition of the invention contains the thioether type stabilizer [D] in an amount of 0.005 to 2 parts by weight, the hindered amine type stabilizer [E] in an amount of 0.005 to 2 parts by weight and the metallic salt of higher aliphatic acid [F] in an amount of 0.005 to 2 parts by weight, each based on 100 parts by weight of the propylene polymer [A1].

The seventh propylene polymer composition of the invention is formed from:

[A1] the aforesaid propylene polymer, and

[E] a hindered amine type stabilizer in an amount of 0.001 to 10 parts by weight, preferably 0.003 to 5 parts by weight, more preferably 0.005 to 3 parts by weight, based on 100 parts by weight of the above propylene polymer.

The eighth propylene polymer composition of the invention is formed from:

[A1] the aforesaid propylene polymer,

[E] a hindered amine type stabilizer in an amount of 0.001 to 10 parts by weight, preferably 0.003 to 5 parts by weight, more preferably 0.005 to 3 parts by weight, based on 100 parts by weight of the above propylene polymer, and

[F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene polymer.

When the content of the hindered amine type stabilizer [E] is within the above range based on 100 parts by weight of the propylene polymer, heat resistance can be highly improved, the stabilizer is available at a low cost, and properties of the propylene polymer such as tensile strength are not deteriorated.

When the content of the metallic salt of a higher aliphatic acid [F] is within the above range based on 100 parts by weight of the propylene polymer, a residual chlorine of the catalyst remained in the propylene polymer can be sufficiently absorbed, the stabilizer is available at a low cost, and properties of the propylene polymer are never deteriorated.

The ninth propylene polymer composition of the invention is formed from:

[A1] the aforesaid propylene polymer, and

[F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene polymer.

When the content of the metallic salt of a higher aliphatic acid [F] is within the above range based on 100 parts by weight of the propylene polymer, a residual chlorine of the catalyst remained in the propylene polymer can be sufficiently absorbed, the stabilizer is available at a low cost, and properties of the propylene polymer such as tensile strength are not deteriorated.

The tenth propylene polymer composition of the invention is formed from:

[A2] the aforesaid propylene block copolymer,

[B] a phenol type stabilizer in an amount of 0.001 to 10 parts by weight, preferably 0.003 to 5 parts by weight, more preferably 0.005 to 3 parts by weight, based on 100 parts by weight of the above propylene block copolymer.

The eleventh propylene polymer composition of the invention is formed from:

[A2] the aforesaid propylene block copolymer,

[B] a phenol type stabilizer in an amount of 0.001 to 10 parts by weight, preferably 0.003 to 5 parts by weight, more preferably 0.005 to 3 parts by weight, based on 100 parts by weight of the above propylene block copolymer, and at least one compound selected from the group consisting of [C] an organophosphite type stabilizer, [D] a thioether type stabilizer, [E] a hindered amine type stabilizer and [F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene block copolymer.

When the content of the phenol type stabilizer [B] is within the above range based on 100 parts by weight of the propylene block copolymer, heat resistance can be highly improved, the stabilizer is available at a low cost, and properties of the propylene block copolymer such as tensile strength are not deteriorated.

When the content of at least one compound selected from the group consisting of the organophosphite type stabilizer [C], the thioether type stabilizer [D], the hindered amine type stabilizer [E] and the metallic salt of a higher aliphatic acid [F] is within the above range based on 100 parts by weight of the propylene block copolymer, heat resistance can be highly improved, the stabilizer is available at a low cost, and properties of the propylene block copolymer such as tensile strength are not deteriorated.

When the content of the metallic salt of a higher aliphatic acid [F] is within the above range, a residual chlorine of the catalyst remained in the propylene block copolymer can be sufficiently absorbed, whereby properties of the propylene block copolymer are never deteriorated.

It is particularly preferred that the eleventh propylene polymer composition of the invention contains the phenol type stabilizer [B] in an amount of 0.005 to 2 parts by weight, the organophosphite type stabilizer [C] in an amount of 0.005 to 2 parts by weight, the thioether type stabilizer [D] in an amount of 0.005 to 2 parts by weight, the hindered amine type stabilizer [E] in an amount of 0.005 to 2 parts by weight and the metallic salt of higher aliphatic acid [F] in an amount of 0.005 to 2 parts by weight, each based on 100 parts by weight of the propylene block copolymer.

The twelfth propylene polymer composition of the invention is formed from:

[A2] the aforesaid propylene block copolymer, and

[C] an organophosphite type stabilizer in an amount of 0.001 to 10 parts by weight, preferably 0.003 to 5 parts by weight, more preferably 0.005 to 3 parts by weight, based on 100 parts by weight of the above propylene block copolymer.

The thirteenth propylene polymer composition of the invention is formed from:

[A2] the aforesaid propylene block copolymer,

[C] an organophosphite type stabilizer in an amount of 0.001 to 10 parts by weight, preferably 0.003 to 5 parts by weight, more preferably 0.005 to 3 parts by weight, based on 100 parts by weight of the above propylene block copolymer, and at least one compound selected from the group consisting of [D] a thioether type stabilizer, [E] a hindered amine type stabilizer and [F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene block copolymer.

When the content of the organophosphite type stabilizer [C] is within the above range based on 100 parts by weight of the propylene block copolymer, heat resistance can be highly improved, the stabilizer is available at a low cost, and properties of the propylene block copolymer such as tensile strength are not deteriorated.

When the content of at least one compound selected from the group consisting of the thioether type stabilizer [D], the hindered amine type stabilizer [E] and the metallic salt of a higher aliphatic acid [F] is within the above range based on 100 parts by weight of the propylene block copolymer, heat resistance can be highly improved, the stabilizer is available at a low cost, and properties of the propylene block copolymer such as tensile strength are not deteriorated.

When the content of the metallic salt of a higher aliphatic acid [F] is within the above range, a residual chlorine of the catalyst remained in the propylene block copolymer can be sufficiently absorbed, whereby properties of the propylene block copolymer are never deteriorated.

It is particularly preferred that the thirteenth propylene polymer composition of the invention contains the organophosphite type stabilizer [C] in an amount of 0.005 to 2 parts by weight, the thioether type stabilizer [D] in an amount of 0.005 to 2 parts by weight, the hindered amine type stabilizer [E] in an amount of 0.005 to 2 parts by weight and the metallic salt of higher aliphatic acid [F] in an amount of 0.005 to 2 parts by weight, each based on 100 parts by weight of the propylene block copolymer [A2].

The fourteenth propylene polymer composition of the invention is formed from:

[A2] the aforesaid propylene block copolymer, and

[D] a thioether type stabilizer in an amount of 0.001 to 10 parts by weight, preferably 0.003 to 5 parts by weight, more preferably 0.005 to 3 parts by weight, based on 100 parts by weight of the above propylene block copolymer.

The fifteenth propylene polymer composition of the invention is formed from:

[A2] the aforesaid propylene block copolymer,

[D] a thioether type stabilizer in an amount of 0.001 to 10 parts by weight, preferably 0.003 to 5 parts by weight, more preferably 0.005 to 3 parts by weight, based on 100 parts by weight of the above propylene block copolymer, and at least one compound selected from the group consisting of [E] a hindered amine type stabilizer and [F] a metallic salt of a higher aliphatic acid in an amount of 20 0.001 to 10 parts by weight, preferably 0.003 to 5 parts by weight, more preferably 0.005 to 3 parts by weight, based on 100 parts by weight of the above propylene block copolymer.

When the content of the thioether type stabilizer [D] is within the above range based on 100 parts by weight of the propylene block copolymer, heat resistance can be highly improved, the stabilizer is available at a low cost, and properties of the propylene block copolymer such as tensile strength are not deteriorated.

When the content of at least one compound selected from the group consisting of the hindered amine type stabilizer [E] and the metallic salt of a higher aliphatic acid [F] is within the above range based on 100 parts by weight of the propylene block copolymer, heat resistance can be highly improved, the stabilizer is available at a low cost, and properties of the propylene block copolymer such as tensile strength are not deteriorated.

When the content of the metallic salt of a higher aliphatic acid [F] is within the above range, a residual chlorine of the catalyst remained in the propylene block copolymer can be sufficiently absorbed, whereby properties of the propylene block copolymer are never deteriorated.

It is particularly preferred that the fifteenth propylene polymer composition of the invention contains the thioether type stabilizer [D] in an amount of 0.005 to 2 parts by weight, the hindered amine type stabilizer [E] in an amount of 0.005 to 2 parts by weight and the metallic salt of higher aliphatic acid [F] in an amount of 0.005 to 2 parts by weight, each based on 100 parts by weight of the propylene block copolymer [A2].

The sixteenth propylene polymer composition of the invention is formed from:

[A2] the aforesaid propylene block copolymer, and

[E] a hindered amine type stabilizer in an amount of 0.001 to 10 parts by weight, preferably 0.003 to 5 parts by weight, more preferably 0.005 to 3 parts by weight, based on 100 parts by weight of the above propylene block copolymer.

The seventeenth propylene polymer composition of the invention is formed from:

[A2] the aforesaid propylene block copolymer, [E] a hindered amine type stabilizer in an amount of 0.001 to 10 parts by weight, preferably 0.003 to 5 parts by weight, more preferably 0.005 to 3 parts by weight, based on 100 parts by weight of the above propylene block copolymer, and

[F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene block copolymer.

When the content of the hindered amine type stabilizer [E] is within the above range based on 100 parts by weight of the propylene block copolymer, heat resistance can be highly improved, the stabilizer is available at a low cost, and properties of the propylene block copolymer such as tensile strength are not deteriorated.

When the content of the metallic salt of a higher aliphatic acid [F] is within the above range based on 100 parts by weight of the propylene block copolymer, a residual chlorine of the catalyst remained in the propylene block copolymer can be sufficiently absorbed, the stabilizer is available at a low cost, and properties of the propylene block copolymer are never deteriorated.

The eighteenth propylene polymer composition of the invention is formed from:

[A2] the aforesaid propylene block copolymer, and

[F] a metallic salt of a higher aliphatic acid in an amount of 0.001 to 10 parts by weight, preferably 0.003 to 5 parts by weight, more preferably 0.005 to 3 parts by weight, based on 100 parts by weight of the above propylene block copolymer.

When the content of the metallic salt of a higher aliphatic acid [F] is within the above range based on 100 parts by weight of the propylene block copolymer, a residual chlorine of the catalyst remained in the propylene block copolymer can be sufficiently absorbed, the stabilizer is available at a low cost, and properties of the propylene block copolymer such as tensile strength are not deteriorated.

Next, the stabilizers used in the present invention are explained below in the order of [B] Phenol type stabilizer, [C] Organophosphite type stabilizer, [D] Thioether type stabilizer,[E] Hindered amine type stabilizer, and [F] Metallic salt of higher aliphatic acid.

Phenol Type Stabilizers [B]

Though conventionally known phenolic compounds are used as phenol type stabilizers without specific restriction, concrete examples of the phenol type stabilizers include 2,6-di-tert-butyl-4-methylphenol, 2,6-di-tert-butyl-4-ethylphenol, 2,6-dicyclohexyl-4-methylphenol, 2,6-diisopropyl-4-ethylphenol, 2,6-di-tert-amyl-4-methylphenol, 2,6-di-tert-octyl-4-n-propylphenol, 2,6-dicyclohexyl-4-n-octylphenol, 2-isopropyl-4-methyl-6-tert-butylphenol, 2-tert-butyl-2-ethyl-6-tert-octylphenol, 2-isobutyl-4-ethyl-6-tert-hexylphenol, 2-cyclohexyl-4-n-butyl-6-isopropylphenol, dl-α-tocopherol, tert-butylhydroquinone, 2,2'-methylenebis(4-methyl-6-tert-butylphenol), 4,4'-butylidenebis(3-methyl-6-tert-butylphenol), 4,4'-thiobis(3-methyl-6-tert-butylphenol), 2,2-thiobis(4-methyl-6-tert-butylphenol), 4,4'-methylenebis(2,6-di-tert-butylphenol), 2,2'-methylenebis[6-(1-methylcyclohexyl)-p-cresol], 2,2'-ethylidenebis(2,4-di-tert-butylphenol), 2,2'-butylidenebis(2-tert-butyl-4-methylphenol), 1,1,3-tris(2-methyl-4-hydroxy-5-tert-butylphenyl)-butane, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,2'-thiodiethylenebis[3-(3,5-di-tert-butyl-4-hydroxyphenyl)propionate], N,N'-hexamethylenebis(3,5-di-tert-butyl-4-hydroxyhydrocinnamamide), 3,5-di-tert-butyl-4-hydroxybenzyl phosphonate diethyl ester, 1,3,5-tris(2,6-dimethyl-3-hydroxy-4-tert-butylbenzyl) isocyanurate, 1,3,5-tris[(3,5-di-tert-butyl-4-hydroxyphenyl)-propionyloxyethyl] isocyanurate, tris(4-tert-butyl-2,6-dimethyl-3-hydroxybenzyl) isocyanurate, 2,4-bis(n-octylthio)-6-(4-hydroxy-3,5-di-tert-butyl-anilino)-1,3,5-triazine, tetrakis[methylene-3-(3,5-di-tert-butyl-4-hydroxyphenyl)propionate]methane, bis(3,5-di-tert-butyl-4-hydroxybenzylphosphonic acid ethyl ester) calcium, bis(3,5-di-tert-butyl-4-hydroxybenzylphosphonic acid ethyl ester) nickel, bis[3,3-bis(3-tert-butyl-4-hydroxyphenyl)butyric acid] glycol ester, N,N'-bis[(3,5-di-tert-butyl-4-hydroxyphenyl)-propionyl] hydrazine, 2,2'-oxamidobis[ethyl-3-(3,5-di-tert-butyl-4-hydroxyphenyl)propionate], 2,2'-methylenebis(4-methyl-6-tert-butylphenol) terephthalate, 1,3,5-trimethyl-2,4,6-tris(3,5-di-tert-butyl-4-hydroxybenzyl)benzene, 3,9-bis[1,1-dimethyl-2-{β-(3-tert-butyl-4-hydroxy-5-methylphenyl)propionyloxy}ethyl]-2,4,8,10-tetraoxaspiro[5,5]-undecane, 2,2-bis[4-(2-(3,5-di-tert-butyl-4-hydroxyhydrocinnamoyloxy))ethoxyphenyl]propane, and alkyl esters of β-(3,5-di-tert-butyl-4-hydroxyphenyl)-propionic acid.

Of these compounds, preferred are triethylene glycol-bis[3-(3-tert-butyl-5-methyl-4-hydroxyphenyl)propionate], 1,6-hexanediol-bis [3-(3,5-di-tert-butyl-4-hydroxyphenyl)propionate], 2,2-thiodiethylenebis [3-(3,5-di-tert-butyl-4-hydroxyphenyl)propionate], N,N'-hexamethylenebis(3,5-di-tert-butyl-4-hydroxyhydrocinnamamide), 3,5-di-tert-butyl-4-hydroxybenzyl phosphonate-diethyl ester, 1,3,5-tris (2,6-dimethyl-3-hydroxy-4-tert-butylbenzyl) isocyanurate, 1,3,5-tris [(3,5-di-tert-butyl-4-hydroxyphenyl)-propionyloxyethyl] isocyanurate, tris (4-tert-butyl-2,6-dimethyl-3-hydroxybenzyl) isocyanurate, 2,4-bis(n-octylthio)-6-(4-hydroxy-3,5-di-tert-butyl-anilino)-1,3,5-triazine, tetrakis [methylene-3-(3,5-di-tert-butyl-4-hydroxyphenyl)propionate]methane, bis (3,5-di-tert-butyl-4-hydroxybenzylphosphonic acid ethyl ester) calcium, bis (3,5-di-tert-butyl-4-hydroxybenzylphosphonic acid ethyl ester) nickel, bis[3,3-bis(3-tert-4-hydroxyphenyl)butyric acid] glycol ester, N,N'-bis[(3,5-di-tert-butyl-4-hydroxyphenyl)-propionyl] hydrazine, 2,2'-oxamidobis[ethyl-3-(3,5-di-tert-butyl-4-hydroxyphenyl)propionate], 2,2'-methylenebis(4-methyl-6-tert-butylphenol) terephthalate, 1,3,5-trimethyl-2,4,6-tris(3,5-di-tert-butyl-4-hydroxybenzyl)benzene, 3,9-bis[1,1-dimethyl-2-{β-(3-tert-butyl-4-hydroxy-5-methylphenyl)propionyloxy}ethyl]-2,4,8,10-tetraoxaspiro[5,5]-undecane, 2,2-bis [4-(2-(3,5-di-tert-butyl-4-hydroxyhydrocinnamoyloxy))ethoxyphenyl]propane, and alkyl esters of β-(3,5-di-tert-butyl-4-hydroxyphenyl)-propionic acid.

Of the alkyl esters of β-(3,5-di-tert-butyl-4-hydroxyphenyl)propionic acid mentioned above, particu-larly preferred are alkyl esters having alkyl group of not greater than 18 carbon atoms.

Furthermore, the following compounds are particularly preferably used in the present invention:

tetrakis[methylene-3-(3,5-di-tert-butyl-4-hydroxyphenyl)propionate]methane, bis(3,5-di-tert-butyl-4-hydroxybenzylphosphonic acid ethyl ester) calcium, bis(3,5-di-tert-butyl-4-hydroxybenzylphosphonic acid ethyl ester) nickel, bis[3,3-bis(4-hydroxy-3-tert-butylphenyl)butyric acid] glycol ester, N,N'-bis[(3,5-di-tert-butyl-4-hydroxyphenyl)-propionyl] hydrazine, 2,2'-oxamidobis[ethyl-3-(3,5-di-tert-butyl-4-hydroxyphenyl)propionate], 2,2'-methylenebis(4-methyl-6-tert-butylphenol) terephthalate, 1,3,5-trimethyl-2,4,6-tris(3,5-di-tert-butyl-4-hydroxybenzyl)benzene, 3,9-bis[1,1-dimethyl-2-{β-(3-tert-butyl-4-hydroxy-5-methylphenyl)propionyloxy}ethyl]-2,4,ϵ,10-tetraoxaspiro[5,5]-undecane, 1,3,5-tris[(3,5-di-tert-butyl-4-hydroxyphenyl) propionyloxyethyl]isocyanurate, and 2,2-bis[4-(2-(3,5-di-tert-butyl-4-hydroxyhydrocinnamoyloxy))ethoxyphenyl]propane.

These phenol type stabilizers are used singly or in combination.

Organophosphite Type Stabilizers [C]

Though conventionally known organophosphite type stabilizers are used without specific restriction in the present invention, concrete examples of the organophosphite type stabilizers include trioctyl phosphite, trilauryl phosphite, tridecyl phosphite, octyl diphenyl phosphite, tris(2,4-di-tert-butylphenyl) phosphite, triphenyl phosphite, tris(butoxyethyl) phosphite, tris(nonylphenyl) phosphite, distearylpentaerithrytol diphosphite, tetra(tridecyl)-1,1,3-tris(2-methyl-5-tert-butyl-4-hydroxyphenyl)butane diphosphite, tetra($C_{12}$-$C_{15}$ mixed alkyl)-4,4'-isopropylidenediphenyl diphosphite, tetra (tridecyl)-4,4'-butylidenebis(3-methyl-6-tert-butylphenol) diphosphite, tris(3,5-di-tert-butyl-4-hydroxyphenyl) phosphite, tris(mixed monononylphenyl, dinonylphenyl) phosphite, hydrogenated-4,4'-isopropylidenediphenol polyphosphite, bis(octylphenyl)-bis[4,4'-butylidenebis(3-methyl-6-tert-butylphenol) ]-1,6-hexanediol diphosphite, phenyl-4,4'-isopropylidenediphenol-pentaerythritol diphosphite, tris[4,4'-isopropylidenebis(2-tert-butylphenol)] phosphite, phenyl-diisodecyl phosphite, di(nonylphenyl) pentaerythritol diphosphite, tris(1,3-di-stearoyloxyisopropyl) phosphite, 4,4'-isopropylidenebis(2-tert-butylphenol)-di(nonylphenyl) phosphite, and 9,10-dihydro-9-oxa-9-oxa-10-phosphaphenanthrene-10-oxide.

In addition, bis(dialkylphenyl) pentaerythritiol diphosphite esters having the formula (iv) of spiro type or the formula (v) of cage type illustrated below are also used:

Usually, a mixture of both isomers is most often used due to utilization of an economically advantageous process for manufacturing such phosphite ester.

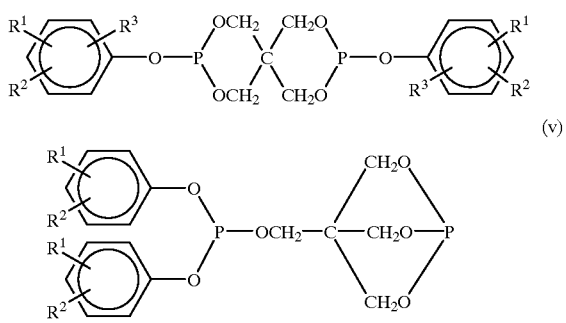

wherein $R^1$, $R^2$ and $R^3$ are each a hydrogen or an alkyl group having 1 to 9 carbon atoms, preferably a branched alkyl group, particularly preferably a tert-butyl group, the most preferable substitution positions of $R^1$, $R^2$ and $R^3$ on the phenyl groups being 2-, 4- and 6-positions. Preferable phosphite esters include bis(2,4-di-tert-butylphenyl) pentaerythritol diphosphite and bis(2,6-di-tert-butyl-4-methylphenyl)pentaerythritol diphosphite, and there may also be mentioned phosphonites having a structure wherein a carbon atom is directly bonded to a phosphorus atom, such as tetrakis(2,4-di-tert-butylphenyl)-4,4'-biphenylene diphosphonite.

These organophosphite type stabilizers are used singly or in combination.

Thioether Type Stabilizers [D]

Though conventionally known thioether type stabilizers are used without specific restriction in the present invention, concrete examples of the thioether type stabilizers include dialkyl esters such as dilauryl, dimyristyl and distearyl ester of thiodipropionic acid, esters of alkylthiopropionic acid such as butyl-, octyl-, lauryl- and stearylthiopropionic acid with a polyhydric alcohol (for example, glycerine, trimethylolethane, trimethylolpropane, pentaerythritol and trishydroxyethyliscyanurate), such as pentaerythritoltetra-laurylthiopropionate. More concretely, the thioether stabilizers include dilauryl thiodipropionate, dimyristyl thiodipropionate, lauryl stearyl thiodipropionate and distearyl thiodibutyrate.

These thioether type stabilizers are used singly or in combination.

Hindered Amine Type Stabilizers [E]

There are used without specific restriction as the hindered amine type stabilizers conventionally known compounds having a structure wherein methyl groups are substituted for all the hydrogen atoms bonded to the carbon atoms at the 2- and 6-positions of piperidine. Concrete examples of the hindered amine type stabilizers include (1) bis(2,2,6,6-tetramethyl-4-piperidyl) sebacate,
(2) dimethyl succinate-1-(2-hydroxyethyl)-4-hydroxy-2,2,6,6-tetramethylpiperidine polycondensate,
(3) poly[[6-(1,1,3,3-tetramethylbutyl)imino-1,3,5-triazine-2,4-diyl][(2,2,6,6-tetramethyl-4-piperidyl)imino] hexamethylene[(2,2,6,6-tetramethyl-4-piperidyl)imino]],
(4) tetrakis(2,2,6,6-tetramethyl-4-piperidyl) 1,2,3,4-butanetetracarboxylate,
(5) 2,2,6,6-tetramethyl-4-piperidyl benzoate
(6) bis(1,2,6,6-pentamethyl-4-piperidyl)-2-(3,5-di-tert-butyl-4-hydroxybenzyl)-2-n-butyl malonate,
(7) bis-(N-methyl-2,2,6,6-tetramethyl-4-piperidyl) sebacate,
(8) 1,1'-(1,2-ethanediyl)bis(3,3,5,5-tetramethyl-piperazinone),
(9) (mixed 2,2,6,6-tetramethyl-4-piperidyl/tridecyl) 1,2,3,4-butanetetracarboxylate,
(10) (mixed 1,2,2,6,6-pentamethyl-4-piperidyl/tridecyl) 1,2,3,4-butanetetracarboxylate,
(11) mixed {2,2,6,6-tetramethyl-4-piperidyl/β,β,β',β'-tetramethyl-3,9-[2,4,8,10-tetraoxasprio(5,5)-undecane] diethyl} 1,2,3,4-butanetetracarboxylate,
(12) mixed {1,2,2,6,6-pentamethyl-4-piperidyl/β,β,β',β'-tetramethyl-3,9-[2,4,8,10-tetraoxaspiro(5,5)-undecane] diethyl} 1,2,3,4-butanetetracarboxylate,
(13) N,N'-bis(3-aminopropyl)ethylenediamine-2,4-bis[N-butyl-N-(1,2,2,6,6-pentamethyl-4-piperidyl)amino]-6-chloro-1,3,5-triazine condensate,
(14) poly[[6-N-morpholinyl-1,3,5-triazine-2,4-diyl ]-[(2,2,6,6-tetramethyl-4-piperidyl)imino]hexamethylene[(2,2,6,6-tetramethyl-4-piperidyl)imino]],
(15) condensate of N,N'-bis(2,2,6,6-tetramethyl-4-piperidyl) hexamethylenediamine with 1,2-dibromoethane, and
(16) [N-(2,2,6,6-tetramethyl-4-piperidyl)-2-methyl-2-(2,2,6,6-tetramethyl-4-piperidyl)imino]propionamide.

Of the hindered amine type stabilizers, those especially preferably employed are the compounds denoted by (1), (2), (3), (4), (8), (10), (11), (14) and (15).

These hindered amine type stabilizers are used singly or in combination.

Metallic Salts of Higher Aliphatic Acid [F]

Examples of metallic salts of the higher aliphatic acid which may be used in the invention include alkaline earth metal salts such as magnesium salts, calcium salts and barium salts, alkali metal salts such as sodium salts, potassium salts and lithium salts, cadmium salts, zinc salts and lead salts of higher aliphatic acids such as stearic acid, oleic acid, lauric acid, capric acid, ariachidic acid, palmitic acid, behenic acid, 12-hydroxystearic acid, ricinolic acid, and montanic acid. Concrete examples of the metallic salt of higher aliphatic acid include magnesium stearate, magnesium laurate, magnesium palmitate, calcium stearate, calcium oleate, calcium laurate, barium stearate, barium oleate, barium laurate, barium arachidate, barium behenate, zinc stearate, zinc oleate, zinc laurate, lithium stearate, sodium stearate, sodium palmitate, sodium laurate, potassium stearate, potassium laurate, calcium 12-hydroxystearate and calcium montanate.

These metallic salts of higher aliphatic acid are used singly or in combination.

Metallic salts of higher aliphatic acid as described above act as a lubricant and a rust-preventive agent.

Propylene polymer compositions containing such metallic salts of higher aliphatic acid therefore are excellent in moldability and effective in rust prevention of molding machines, etc.

The propylene polymer compositions of the invention can be used without specific limitation in a field where polypropylene has been conventionally used, and particularly they can be favorably used for extruded sheet, unstretched film, stretched film, filament, injection molded product and blow molded product.

There is no specific limitation on the shape and the kind of the extrusion molded product made of the propylene polymer composition of the invention. Concretely, there can be mentioned sheet, film (unstretched film), pipe, hose, electric wire cover and filament. The extrusion molded product of the propylene polymer composition is particularly preferably used as sheet, film (unstretched film) and filament.

In order to extrusion mold the propylene polymer composition of the invention into a sheet, a film (unstretched film) or the like, conventionally known extrusion apparatuses such as a single screw extruder, a kneading extruder, a ram extruder and a gear extruder can be used. Using such extruder, a molten propylene polymer composition is extruded from a T-die or the like to prepare an extrusion molded product. The extrusion molding can be carried out under the molding conditions conventionally known.

The extruded sheet and film (unstretched film) prepared as above are excellent in rigidity, heat resistance and moisture resistance.

A stretched film can be prepared from the above-mentioned sheet or film made of the propylene polymer composition by conventional stretching methods using known stretching machines, such as tentering (lengthwise-crosswise stretching, crosswise-lengthwise stretching), simultaneous biaxial stretching (biaxial orientation) and monoaxial stretching. The stretch ratio of the biaxially stretched (oriented) film is preferably in the range of 20 to 70 times, while the stretch ratio of the monoaxially stretched film is preferably in the range of 2 to 10 times. The thickness of the stretched film is desirably in the range of 5 to 200 μm.

Such stretched film is excellent in rigidity, heat resistance and moisture resistance.

From the propylene polymer composition of the invention, an inflation film can be also prepared.

Since the sheet, the unstretched film and the stretched film composed of the propylene polymer composition of the invention are excellent in heat resistance, transparency, see-through properties, glossiness, rigidity, moisture resistance, gas barrier properties, etc., they can be widely applied to packaging films or other uses. In particular, they are very suitable for press through pack used for packaging of pharmaceutical tablets or capsules.

The filament composed of the propylene polymer composition of the invention can be prepared, for example, by extruding a molten propylene polymer composition through a spinning nozzle. The filament thus obtained may be further subjected to stretching. This stretching is carried out in such a manner that the molecular orientation at least in the monoaxial direction is effectively given to the propylene polymer, and the stretch ratio is desirably in the range of 5 to 10 times.

Such filament is excellent in rigidity and heat resistance.

The injection molded product composed of the propylene polymer composition of the invention can be prepared using a conventionally known injection molding apparatus. The injection molding can be carried out under the molding conditions conventionally known.

Since the injection molded product is excellent in rigidity, heat resistance, impact resistance, surface glossiness, chemical resistance, abrasion resistance, etc., it can be widely used for automotive interior trims, automotive exterior trims, housings for electrical appliances, containers, etc.

The blow molded product composed of the propylene polymer composition of the invention can be prepared using a conventionally known blow molding apparatus. The blow molding can be carried out under the molding conditions conventionally known. For example, in the extrusion blow molding, a molten propylene polymer composition is extruded from a die to form a tubular parison at a resin temperature of 100 to 300° C., then the parison is kept within a mold having an aimed shape, and air is blown into the mold at a resin temperature of 130 to 300° C. to obtain a hollow molded product. In this case, the stretch ratio is desirably within the range of 1.5 to 5 times in the crosswise direction.

In the injection blow molding, a molten propylene polymer composition is injected into a mold to form a parison at a resin temperature of 100 to 300° C., then the parison is kept within the mold having an aimed shape, and air is blown into the mold at a resin temperature of 120 to 300° C. to obtain a hollow molded product. In this case, the stretch ratio is desirably within the range of 1.1 to 1.8 times in the lengthwise direction and within the range of 1.3 to 2.5 times in the crosswise direction.

Such blow molded product is excellent in rigidity, heat resistance and moisture resistance.

The propylene polymer compositions of the invention can be used as a substrate in a method wherein a skin material and a substrate are subjected to press molding at the same time to prepare an integrally molded product (i.e., mold stamping method). The molded product obtained by the mold stamping can be favorably used as automotive interior trims such as door trim, rear package trim, sheet back garnish and instrument panel.

The molded product obtained by the mold stamping is excellent in rigidity and heat resistance.

Effect of the Invention

The propylene polymer of the invention has a high crystallinity of a boiled heptane-insoluble component contained therein and a high stereoregularity, and moreover it has an extremely long mesochain. Hence, the propylene polymer is excellent in rigidity, heat resistance and moisture resistance.

The propylene block copolymer of the invention has a high crystallinity of a boiled heptane-insoluble component contained therein and a high stereoregularity, and moreover it has an extremely long mesochain. Hence, the propylene block copolymer is well-balanced between rigidity, heat resistance and impact resistance.

The propylene polymer composition of the invention is formed from the propylene polymer or the propylene block copolymer which has a high crystallinity of a boiled heptane-insoluble component contained therein, a high stereoregularity and an extremely long mesochain, and a specific stabilizer. Hence, the propylene polymer composition is excellent in heat stability during the molding stage, long-term heat stability, weathering resistance, etc., and moreover a molded product obtained from this propylene polymer composition is excellent in rigidity, heat resistance and moisture resistance.

The present invention is further illustrated by the following examples, but the invention is in no way restricted to those examples.

EXAMPLE

Example 1

Preparation of Solid Titanium Catalyst Component (A)

95.2 g of anhydrous magnesium chloride, 442 ml of decane and 390.6 g of 2-ethylhexylalcohol were mixed and heated at 130° C. for 2 hours to give a homogeneous solution. Then, to the solution was added 21.3 g of phthalic anhydride and they were mixed and stirred at 130° C. for 1 hour to dissolve the phthalic anhydride in the solution. The thus obtained homogeneous solution was cooled to room temperature, and then 75 ml of the homogeneous solution was dropwise added to 200 ml of titanium tetrachloride kept at −20° C. over a period of 1 hour. After the addition was completed, the temperature of the resulting mixture liquid was raised to 110° C. over a period of 4 hours. When the temperature of the mixture liquid reached to 110° C., 5.22 g of diisobutyl phthalate (DIBP) was added to the mixture liquid, and then resulting mixture was stirred at the same temperature for 2 hours.

After the reaction was completed, a solid portion was recovered from the reaction liquid by means of hot filtration. The solid portion was suspended again in 275 ml of titanium tetrachloride, and the obtained suspension was further heated at 110° C. for 2 hours. After the reaction was completed, a solid portion was recovered again by means of hot filtration. The solid portion was well washed with decane and hexane kept at 110° C. until no titanium compound liberating in the solution was detected.

The solid titanium catalyst component (A) prepared as above was stored as a decane slurry. A part of the slurry was dried to examine the catalyst composition. The catalyst component (A) obtained had a composition comprising 2.4% by weight of titanium, 60% by weight of chlorine, 20% by weight of magnesium and 13.0% by weight of DIBP.

Preparation of Prepolymerized Catalyst (B)

Into a 2-liter autoclave equipped with a stirrer, 500 ml of purified hexane, 57.5 g of 3-methyl-1-butene, 50 mmol of triethylaluminum, 50 mmol of triemethylmethoxysilane and 5.0 mmol Ti (in terms of titanium atom) of the above-obtained solid titanium catalyst component (A) were charged in a nitrogen atmosphere to perform a reaction for 2 hours. The polymerization temperature in the autoclave was kept at 20° C.

After the reaction was completed, the reactor was purged with nitrogen, and a washing operation consisting of removal of the supernatant liquid and addition of purified hexane was carried out three times. Thereafter, the obtained reaction liquid was suspended again using purified hexane, and all of the resulting suspension was transferred into a catalyst bottle to obtain a prepolymerized catalyst (B). 5.7 g of poly-3-methyl-1-butene was produced based on 1 g of the solid titanium catalyst component (A).

Polymerization

Into a 2-liter autoclave, 750 ml of purified n-hexane was charged, and further 0.75 mmol of triethylaluminum, 0.75 mmol of dicyclopentyldimethoxysilane (DCPMS) and 0.015 mmol Ti (in terms of titanium atom) of the above-obtained prepolymerized catalyst (B) were charged at 60° C. in a propylene atmosphere.

Further, 1200 ml of hydrogen was introduced into the autoclave, and the temperature in the autoclave was raised to 70° C., followed by keeping the same temperature for 2 hours to perform a propylene polymerization. The pressure during the polymerization was kept at 7 kg/cm$^2$-G. After the polymerization was completed, a slurry containing the produced solid was filtered and separated into a white powder and a liquid phase portion.

The yield of the white powder polymer was 303.2 g on the dry basis, and the white powder polymer had a melt flow rate (MFR) of 12.5 g/10 mm and an apparent bulk specific gravity of 0.45 g/ml. Further, the obtained white powder was dissolved in decane for a time, and then gradually cooled to obtain a powder. The amount of the boiled heptane-insoluble component contained in this powder was 96.9% by weight and the crystallinity of the boiled heptane-insoluble component was 75.0%.

On the other hand, 2.0 g of a solvent-soluble polymer was obtained by concentration of the above-obtained liquid phase portion. Accordingly, the activity was 20,300 g-PP/mM-Ti, and the amount of the boiled heptane-insoluble component contained in the whole polymer was 96.3% by weight.

The results are set forth in Table 1.

Example 2

The procedure of the polymerization as in Example 1 was repeated except that the polymerization temperature was changed to 80° C.

The results are set forth in Table 1.

Example 3

The procedure of the polymerization as in Example 1 was repeated except that the polymerization temperature was changed to 90° C.

The results are set forth in Table 1.

Example 4

Polymerization

Into a 2-liter autoclave, 500 g of propylene and 6 liters of hydrogen were charged, and the temperature in the autoclave was raised to 60° C. Then, 0.6 mmol of triethylaluminum, 0.6 mmol of dicyclopentyldimethoxysilane (DCPMS) and 0.006 mmol Ti (in terms of titanium atom) of the above-obtained prepolymerized catalyst (B) were charged into the autoclave.

The temperature in the autoclave was raised to 70° C., followed by keeping the same temperature for 40 minutes to perform a propylene polymerization. The reaction was terminated by the addition of a small amount of ethanol. After the unreacted propylene was removed, a white powder polymer was dried under a reduced pressure.

The results are set forth in Table 1.

Example 5

The procedure of the polymerization as in Example 1 was repeated except that the polymerization temperature was changed to 80° C.

The results are set forth in Table 1.

Comparative Example 1

The procedure of the polymerization as in Example 1 was repeated except that 0.075 mmol of cyclopentyldimethyoxysilane was used instead of the DCPMS and 500 ml of hydrogen was used.

The results are set forth in Table 1.

Comparative Example 2

The procedure of the polymerization as in Example 1 was repeated except that 0.075 mmol of diphenyldimethoxysilane was used instead of the DCPMS and 700 ml of hydrogen was used.

The results are set forth in Table 1.

Comparative Example 3

Preparation of Solid Titanium Catalyst Component (C)

1.2 mol of diisoamylether was dropwise added to a mixture of 500 ml of n-hexane and 0.5 mol of diethylaluminum chloride at 25° C. over a period of 2 minutes to perform a reaction for 10 minutes.

A 2-liter reactor thoroughly purged with nitrogen was charged with 4.0 mol of titanium tetrachloride, and the temperature in the reactor was raised to 35° C. To the reactor, the above reaction solution was dropwise added over a period 3 hours, followed by keeping the same temperature for 30 minutes. Then, the temperature in the reactor was raised to 75° C. and the reaction was further performed for 1 hour. The resulting reaction solution was cooled to room temperature and the supernatant liquid was removed, and then the thus produced solid was washed with 1 liter of hexane. The washing operation was further carried out three times.

100 g of the obtained solid was suspended using 2 liter of n-hexane, and to the resulting suspension were added 80 g of diisoamylether and 180 g of titanium tetrachloride at room temperature over a period of 1 minute to perform a reaction at 65° C. for 1 hour. After the reaction was completed, the temperature was cooled to room temperature and the supernatant was removed by decantation. The thus produced solid was washed with 2 liters of hexane. Then, the washing operation was further carried out three times, to thereby obtain a solid titanium catalyst component (C).

Preparation of Prepolymerized Catalyst (D)

Into a 2-liter autoclave equipped with a stirrer, 1 liter of purified hexane, 30 mmol of diethylaluminum chloride and 3 g of the above-obtained solid titanium catalyst component (C) were charged in a nitrogen atmosphere. Thereafter, 2 liters of hydrogen was introduced into the autoclave and propylene was fed to the reactor to perform a prepolymerization for 5 minutes. The pressure during the reaction was kept at 5 kg/cm$^2$-G.

After the reaction was completed, the unreacted propylene and hydrogen were removed and the reactor was purged with nitrogen, and a washing operation consisting of removal of supernatant liquid and addition of purified hexane was carried out three times, to thereby obtain a prepolymerized catalyst (D). The thus obtained prepolymerized catalyst (D) was suspended again using purified decane and stored.

Polymerization

Into a 2-liter autoclave equipped with a stirrer, 750 ml of purified n-hexane was charged, and further 0.75 mmol of diethylaluminum chloride, 0.75 mmol of p-toluic acid methyl ester and 1.1 g of the above-obtained prepolymerized catalyst (D) were charged at 60° C. in a propylene atmosphere.

Further, 8 liters of hydrogen was introduced into the autoclave, and the temperature in the autoclave was raised to 70° C., followed by keeping the same temperature for 4 hours to perform a propylene polymerization. The pressure during the polymerization was kept at 7 kg/cm$^2$-G. After the polymerization was completed, 200 ml of methanol was added to the resulting mixture and the temperature was raised to 80° C. After 30 minutes, 1 ml of an aqueous solution containing 20% of sodium hydroxide was added to the resulting mixture and the unreacted gas was removed.

After the liquid phase was removed, the resulting hexane slurry was washed with 300 ml of deionized water for 20 minutes and the aqueous phase was removed. Then, the hexane slurry was filtered, and then washed and dried, to thereby obtain a polypropylene powder.

The results are set forth in Table 1.

TABLE 1

| | Activity *1) | MFR g/10 min | Apparent bulk specific gravity (g/ml) | Amount of boiled heptene-insoluble component (wt %) | Boiled heptane-insoluble component | | |
|---|---|---|---|---|---|---|---|
| | | | | | Crystallinity (%) | [M$_5$] | [M$_3$] |
| Ex 1 | 20,300 | 12.5 | 0.45 | 96.3 | 75.0 | 0.992 | 0.0027 |
| Ex. 2 | 25,300 | 21.2 | 0.42 | 96.5 | 78.5 | 0.994 | 0.0025 |
| Ex. 3 | 25,500 | 33.4 | 0.40 | 96.9 | 79.3 | 0.995 | 0.0025 |
| Ex. 4 | 17,200 | 16.0 | 0.47 | 96.2 | 74.8 | 0.992 | 0.0029 |
| Ex. 5 | 22,700 | 23.5 | 0.40 | 96.6 | 78.9 | 0.994 | 0.0026 |
| Comp Ex. 1 | 19,300 | 11.0 | 0.45 | 90.0 | 65.3 | 0.965 | 0.0036 |
| Comp Ex. 2 | 20,000 | 13.8 | 0.45 | 90.9 | 65.0 | 0.966 | 0.0036 |
| Comp Ex. 3 | 1,000 | 16.0 | 0.35 | 92.5 | 58.5 | 0.980 | 0.0017 |

*1) g-PP/mmol-Ti

Example 6

Polymerization

Into a 2-liter autoclave, 500 g of propylene and 17 liters of hydrogen was charged, and the temperature in the autoclave was raised to 60° C. Then, 0.6 mmol of triethylaluminum, 0.6 mmol of dicyclopentyldimethoxysilane (DCPMS) and 0.006 mmol Ti (in terms of titanium atom) of the above-obtained prepolymerized catalyst (B) were charged into the autoclave. The temperature in the autoclave was raised to 70° C., followed by keeping the same temperature for 40 minutes to perform a propylene homopolymerization. After the hompolymerization was completed, a vent valve was opened and the unreacted propylene was removed until the pressure in the autoclave reached to atmospheric pressure.

After the removal was completed, ethylene and propylene were copolymerized under conditions such that ethylene, propylene and hydrogen were fed into the autoclave at 80N-liter/hr, 120N-liter/hr and 2N-liter/hr, respectively. The vent opening degree of the autoclave was controlled so that the pressure in the autoclave was kept at 10 kg/cm². The temperature in the autoclave was kept at 70° C. to perform a polymerization for 60 minutes. The polymerization reaction was terminated by the addition of a small amount of ethanol and the unreacted gas in the autoclave was purged out.

The yield of the white powder polymer was 143.3 g, and the polymer had a melt flow rate (MFR) of 48 g/10 min and an apparent bulk specific gravity of 0.44 g/ml. The amount of a decane-soluble component in the white powder polymer was 11.4% by weight and the intrinsic viscosity [η] of the decane-soluble component was 3.7 dl/g.

Further, the amount of the boiled heptane-insoluble component in the decane-insoluble component was 94.4% by weight, the [$M_5$] value, [$M_3$] value and crystallinity of the boiled heptane-insoluble component were 0.991, 0.0035 and 73.2%, respectively.

Example 7

Polymerization

The procedure as in Example 6 was repeated except that hydrogen was not used during the copolymerization.

The results are set forth in Table 2.

Example 8

Polymerization

The procedure as in Example 6 was repeated except that the temperature of the propylene homopolymerization was changed to 80° C.

The results are set forth in Table 2.

Example 9

Polymerization

Into a 2-liter autoclave, 750 ml of purified n-hexane was charged, and further 0.75 mmol of triethylaluminum, 0.75 mmol of dicyclopentadimethoxysilane (DCPMS) and 0.015 mmol Ti (in terms of titanium atom) of the above-obtained prepolymerized catalyst (B) were charged at 60° C. in a propylene atmosphere.

Then, 2700 ml of hydrogen was introduced into the autoclave and the temperature in the autoclave was raised to 70° C., followed by keeping the same temperature for 2 hours to perform a propylene homopolymerization. The pressure during the polymerization was kept at 7 Kg/cm²-G. After the homopolymerization was completed, the unreacted gas was purged out until the pressure in the autoclave reached to atmospheric pressure.

Thereafter, 120 ml of hydrogen was introduced, and ethylene and propylene were copolymerized under conditions such that a mixture gas of 64 mol % of propylene and 36 mol % of ethylene were fed to perform a copolymerization at 70° C. for 1 hour. The pressure during the polymerization was kept at 2 Kg/cm²-G. After the reaction was completed, the resulting slurry containing the produced solid was filtered, to thereby obtain a white powder polymer.

The yield of the white powder polymer was 372.2 g on the dry basis, and the white powder polymer had a melt flow rate (MFR) of 46 g/10 min, and an apparent bulk specific gravity of 0.45 g/ml. The amount of a decane-soluble component in the white powder polymer was 12.0% by weight and the intrinsic viscosity [η] of the decane-soluble component was 3.9 dl/g.

Further, the amount of the boiled heptane-insoluble component contained in the decane-insoluble component was 94.7% by weight, the [$M_5$] value, [$M_3$] value and crystallinity of the boiled heptane-insoluble component were 0.992, 0.0035 and 73.5%, respectively.

Example 10

Polymerization

The procedure as in Example 9 was repeated except that hydrogen was not used during the copolymerization.

The results are set forth in Table 2.

Example 11

Polymerization

The procedure as in Example 9 was repeated except that the propylene homopolymerization temperature was changed to 80° C.

The results are set forth in Table 2.

Example 12

Polymerization

The procedure as in Example 9 was repeated except that the propylene homopolymerization temperature was changed to 90° C.

The results are set forth in Table 2.

Example 13

Polymerization

The procedure as in Example 7 was repeated except that hexyltrimethoxysilane was used instead of dicyclopentyldimethoxysilane.

The results are set forth in Table 2.

Example 14

Polymerization

The procedure as in Example 13 was repeated except that the propylene homopolymerization temperature was 80° C.

The results are set forth in Table 2.

Comparative Example 4

The procedure as in Example 9 was repeated except that 0.075 mmol of diphenyldimethoxysilane was used instead of DCPMS and 1600 ml of hydrogen was used during the homopolymerization.

The results are set forth in Table 2.

Comparative Example 5

The procedure of the polymerization as in Comparative Example 4 was repeated except that hydrogen was not used during the copolymerization.

The results are set forth in Table 2.

Comparative Example 6

Preparation of Solid Titanium Catalyst Component (E)

1.2 mol of diisoamylether was dropwise added to a mixture of 500 ml of n-hexane and 0.5 mol of diethylaluminum chloride at 25° C. over a period of 2 minutes to perform a reaction for 10 minutes.

A 2-liter rector thoroughly purged with nitrogen was charged with 4.0 mol of titanium tetrachloride, and the temperature in the reactor was raised to 35° C. To the reactor, the above prepared reaction solution was dropwise added over a period of 3 hours, followed by keeping the same temperature for 30 minutes. Then, the temperature in the reactor was raised to 75° C. and the reaction was further performed for 1 hour. The resulting reaction solution was cooled to room temperature and the supernatant liquid was removed. Then, the thus produced solid was washed with 1 liter of hexane. The washing operation was further carried out three times.

100 g of the obtained solid was suspended using 2 liter of n-hexane, and to the resulting suspension were added 80 g of isoamylether and 180 g of titanium tetrachloride at room temperature over a period of 1 minute to perform a reaction at 65° C. for 1 hour. After the reaction was completed, the temperature was cooled to room temperature and the supernatant was removed by decantation. The thus produced solid was washed with 2 liters of hexane. Then, the washing operation was further carried out three times to thereby obtain a solid titanium catalyst component (E).

Preparation of Prepolymerized Catalyst (F)

Into a 2-liter reactor equipped with a stirrer, 1 liter of purified hexane, 30 mmol of diethylaluminum chloride and 3 g of the above-obtained solid titanium catalyst component (E) were charged in a nitrogen atmosphere. Thereafter, 2 liters of hydrogen was introduced into the reactor and propylene was fed to the reactor to perform a prepolymerization for 5 minutes. The pressure during the reaction was kept at 5 Kg/cm$^2$-G.

After the reaction was completed, the unreacted propylene and hydrogen were removed and the reactor was purged with nitrogen, and a washing operation consisting of removal of the supernatant liquid and addition of purified hexane was carried out three times, to thereby obtain a prepolymerized catalyst F. The thus obtained prepolymerized catalyst F was suspended again using purified decane and stored.

Polymerization

Into a 2-liter autoclave equipped with stirrer, 750 ml of purified n-hexane was charged, and further 0.75 mmol of diethylaluminum chloride, 0.75 mmol of p-toluic acid methyl ester and 1.1 g of the above obtained prepolymerized catalyst (F) were charged at 60° C. in a propylene atmosphere.

Further, 18 liters of hydrogen was introduced into the autoclave, and the temperature in the autoclave was raised to 70° C., followed by keeping the same temperature for 4 hours to perform a propylene polymerization. The pressure during the polymerization was kept at 7 Kg/cm$^2$-G. After the homopolymerization was completed, the unreacted gas was purged out until the pressure reached to atmospheric pressure.

Thereafter, 120 ml of hydrogen was introduced, and ethylene and propylene were copolymerized under conditions such that a mixture gas of 64 mol % of propylene and 36 mol % of ethylene were fed to perform a copolymerization at 70° C. for 2 hours. The pressure during the polymerization was kept at 2 Kg/cm$^2$-G. After the reaction was completed, 200 ml of methanol was added to the resulting mixture and the temperature was raised to 80° C. After 30 minutes, 1 ml of an aqueous solution containing 20% of sodium hydroxide was added to the resulting mixture and the unreacted gas was removed.

After the liquid phase was removed, the resulting hexane slurry was washed with 300 ml of deionized water for 20 minutes and the aqueous phase was removed. Then, the hexane slurry was filtered, and then washed and dried, to thereby obtain a white solid. The properties of the hexane slurry were poor and a considerable white turbidity was observed.

The results are set forth in Table 2.

TABLE 2

| | Activity | MFR | Apparent bulk specific | Decane-soluble component | | Amount of boiled heptane-insoluble component in decane-insoluble component at 23° C. | Boiled heptane-insoluble component | | |
|---|---|---|---|---|---|---|---|---|---|
| | g/mmol-Ti | g/10 min | gravity g/ml | wt % | [η] dl/g | wt % | Crystallinity | [M$_5$] | [M$_3$] |
| Ex. 6 | 23,900 | 48 | 0.44 | 11.4 | 3.7 | 94.4 | 73.2 | 0.991 | 0.0035 |
| Ex. 7 | 22,800 | 41 | 0.45 | 8.8 | 6.7 | 95.0 | 73.0 | 0.991 | 0.0036 |
| Ex. 8 | 26,700 | 52 | 0.42 | 9.3 | 3.9 | 95.8 | 74.0 | 0.994 | 0.0032 |
| Ex. 9 | 24,800 | 46 | 0.45 | 12.0 | 3.9 | 94.7 | 73.5 | 0.992 | 0.0035 |
| Ex. 10 | 24,100 | 40 | 0.46 | 9.5 | 6.6 | 94.9 | 73.3 | 0.992 | 0.0031 |
| Ex. 11 | 26,000 | 51 | 0.44 | 9.7 | 3.7 | 95.4 | 74.4 | 0.994 | 0.0030 |
| Ex. 12 | 25,500 | 56 | 0.42 | 9.2 | 3.6 | 95.8 | 75.0 | 0.995 | 0.0029 |
| Ex. 13 | 21,800 | 45 | 0.45 | 8.0 | 6.3 | 94.6 | 72.1 | 0.990 | 0.0035 |
| Ex. 14 | 26,200 | 55 | 0.44 | 7.1 | 6.2 | 95.4 | 73.4 | 0.993 | 0.0034 |
| Comp Ex. 4 | 25,100 | 52 | 0.45 | 13.0 | 2.3 | 90.8 | 66.7 | 0.960 | 0.0036 |
| Comp Ex. 5 | 23,700 | 43 | 0.46 | 9.2 | 4.3 | 91.1 | 66.3 | 0.962 | 0.0038 |
| Comp Ex. 6 | 1,200 | 34 | 0.29 | 18.0 | 3.0 | 84.3 | 62.6 | 0.978 | 0.0016 |

Examples 15 to 45 and Comparative Example 7

To a propylene polymer having such properties that a melt flow rate is 10 g/10 min (MFR:ASTM D1238, 230° C., 2.16 kg load), and a boiled heptane-insoluble component therein satisfies [$M_5$] of 0.992, [$M_3$] of 0.0027 and a crystallinity of 72.6%, various stabilizers as indicated in Table 3 were added in an amount indicated in Table 3. The resulting mixture was pelletized at 230° C. by means of an extruder having a screw diameter of 45 mm$\phi$.

The thus obtained pellets were formed by means of a commercially available T-die film forming machine equipped with an extruder of 65 mm$\phi$ into a film of 420 mm in width and 0.04 mm in thickness. At the time of film forming, the resin temperature was 250° C., the film forming speed was 20 m/min, and a draft ratio was 0.6.

MFR, heat aging resistance and weathering resistance of the film obtained were evaluated.

The results are set forth in Table 4.

Estimation of the stabilizers of films are measured by the following methods.

Thermal Stability in the Molding Stage

MFR of films: The films shows better thermal stability when the difference between the MFR of the pellets and that of the film is smaller.

Long-term Heat Stability

A film is aged at 100° C. in a gear oven, and a period of time from the start of aging to the time when the tensile elongation becomes ½ of that of the initial value is measured.

The film has better heat-resistant and aging-resistant properties when it shows a longer period of time.

Weathering Resistance

A film is irradiated with light for 500 hours by using a sunshine weatherometer at a discharge voltage of 50 V and a discharge current of 60 A, and with rain, and a retention of tensile elongation thereof is measured.

The film has better weathering resistance when it shows a larger retention of tensile elongation.

TABLE 3

| | Types of Stabilizers and Amounts added (parts by weight/parts by weight-PP) | | | | | | | | | | | | |
|---|---|---|---|---|---|---|---|---|---|---|---|---|---|
| | Phenolic Stabilizer | | Organic Phosphite Stabilizer | | Thioether Stabilizer | | | Hindered Amine Stabilizer | | Metal Salts of Higher Aliphatic Acid | | | |
| | A | B | C | D | E | F | G | H | I | J | K | L | M |
| Ex. 15 | 0.10 | — | 0.10 | — | — | — | — | — | — | — | — | — | — |
| Ex. 16 | — | 0.10 | — | 0.10 | — | — | — | — | — | — | — | — | — |
| Ex. 17 | 0.10 | — | — | — | 0.10 | — | — | — | — | — | — | — | — |
| Ex. 18 | — | 0.10 | — | — | 0.10 | — | — | — | — | — | — | — | — |
| Ex. 19 | 0.10 | — | — | — | — | — | — | 0.10 | — | — | — | — | — |
| Ex. 20 | — | 0.10 | — | — | — | — | — | 0.10 | — | — | — | — | — |
| Ex. 21 | 0.10 | — | — | — | — | — | — | — | — | 0.10 | — | — | — |
| Ex. 22 | — | 0.10 | — | — | — | — | — | — | — | 0.10 | — | — | — |
| Ex. 23 | — | — | 0.10 | — | 0.10 | — | — | — | — | — | — | — | — |
| Ex. 24 | — | — | — | 0.10 | 0.10 | — | — | — | — | — | — | — | — |
| Ex. 25 | — | — | 0.10 | — | — | — | — | 0.10 | — | — | — | — | — |
| Ex. 26 | — | — | — | 0.10 | — | — | — | 0.10 | — | — | — | — | — |
| Ex. 27 | — | — | 0.10 | — | — | — | — | — | — | 0.10 | — | — | — |
| Ex. 28 | — | — | — | 0.10 | — | — | — | — | — | 0.10 | — | — | — |
| Ex. 29 | — | — | — | — | 0.10 | — | — | 0.10 | — | — | — | — | — |
| Ex. 30 | — | — | — | — | — | 0.10 | — | 0.10 | — | — | — | — | — |
| Ex. 31 | — | — | — | — | — | — | 0.10 | 0.10 | — | — | — | — | — |
| Ex. 32 | — | — | — | — | 0.10 | — | — | — | — | 0.10 | — | — | — |
| Ex. 33 | — | — | — | — | — | 0.10 | — | — | — | 0.10 | — | — | — |
| Ex. 34 | — | — | — | — | — | — | 0.10 | — | — | 0.10 | — | — | — |
| Ex. 35 | — | — | — | — | 0.10 | — | — | 0.10 | — | 0.10 | — | — | — |
| Ex. 36 | — | — | — | — | — | — | — | 0.10 | — | 0.10 | — | — | — |
| Ex. 37 | — | — | — | — | — | — | — | — | 0.10 | 0.10 | — | — | — |
| Ex. 38 | — | — | — | — | — | — | — | 0.10 | 0.10 | 0.10 | — | — | — |
| Ex. 39 | — | — | — | — | — | — | — | — | — | 0.10 | — | — | — |
| Ex. 40 | — | — | — | — | — | — | — | — | — | — | 0.10 | — | — |
| Ex. 41 | — | — | — | — | — | — | — | — | — | — | — | 0.10 | — |
| Ex. 42 | — | — | — | — | — | — | — | — | — | — | — | — | 0.10 |
| Ex. 43 | — | — | — | — | — | — | — | — | — | 0.10 | 0.10 | — | — |
| Ex. 44 | — | — | — | — | — | — | — | — | — | 0.10 | — | 0.10 | — |

TABLE 3-continued

| | Phenolic Stabilizer | | Organic Phosphite Stabilizer | | Thioether Stabilizer | | | Hindered Amine Stabilizer | | Metal Salts of Higher Aliphatic Acid | | | |
|---|---|---|---|---|---|---|---|---|---|---|---|---|---|
| | A | B | C | D | E | F | G | H | I | J | K | L | M |
| Ex. 45 | — | — | — | — | — | — | — | — | — | 0.10 | — | — | 0.10 |
| Comp. Ex. 7 | | — | — | — | — | — | — | — | — | — | — | — | — |

The stabilizers used in the Examples are listed as follows.
USED STABILIZERS
Phenol type Stabilizes
A: Stearyl ester of β-(3,5-di-tert-butyl-4-hydroxyphenyl)-propionic acid. (trade name; Irganox 1076, from Nippon Ciba Geigy, Co.)
B: Tetrakis[methylene-3-(3,5-di-tert-butyl-4-hydroxyphenyl)propionate]methane (trade name; Irganox 1010, from Nippon Ciba Geigy, Co.)
Organophosphite type Stabilizers
C: Tris(2,4-di-tert-butylphenyl) phosphite (trade name; Phosphite 168, from Nippon Ciba Geigy, Co.)
D: Tetrakis(2,4-d-tert-butylphenyl)-4,4'-biphenylene diphosphonite (trade name; Sandostab P-EPQ, from Sandoz, Co.)
Thioether type Stabilizers
E: Dilauryl thiodipropionate (trade name; Antiox L, from Nippon Yusi, Co.)
F: Distearyl thiodipropionate (trade name: DSTP "Yoshitomi", from Yoshitomi Pharmacy, Co.)
G: Pentaerythritol tetra β-mercapto laurylthiopropionate (trade name: Seenox 412S, from Shipro Chemical, Co.)
Hindered Amine type Stabilizers
H: Bis(2,2,6,6-tetramethyl-4-piperidyl) sebacate (trade name: Sanol LS770, from Sankyo, Co.)
I: Poly[[6-(1,1,3,3-tetramethylbutyl)imino-1,3,5-triazine-2,4-diyl][(2,2,6,6,-tetramethyl-4-piperidyl)imino]hexamethylene[(2,2,6,6-tetramethyl-4-piperidyl)imino]] (trade name: Chimassorb 944LD, from Nippon Ciba Geigy, Co.)
Metal Salts of Higher Aliphatic Acid
J: Calcium stearate
K: Calcium 12-hydroxystearate
L: Magnesium Stearate
M: Calcium montanate The stabilizers used in the Examples are listed as follows.

Used Stabilizers

Phenol Type Stabilizes

A: Stearyl ester of β-(3,5-di-tert-butyl-4-hydroxyphenyl)-propionic acid. )trade name; Irganox 1076, from Nippon ciba Geigy, Co.)
B: Tetrakis[methylene-3-(3,5-di-tert-butyl-4-hydroxyphenyl)propionate]methane (trade name; Irganox 1010, from Nippon Ciba Geigy, Co.)

Organophosphite Type Stabilizers

C: Tris(2,4-di-tert-butylphenyl) phosphite (trade name; Phosphite 168, Nippon Ciba Geigy, Co.)
D: Tetrakis(2,4-d-tert-butylphenyl)-4,4'-biphenylene diphosphonite (trade name; Sandostab P-EPQ, from Snadoz, Co.)

Thioether Type Stabilizers

E: Dilauryl thiodipropionate (trade name; Antiox L, from Nippon Yusi, Co.)
F: Distearyl thiodipropionate (trade name; DSTP "Yoshitomi", from Yoshitomi Pharmacy, Co.)
G: Pentaerythritol tetra β-mercapto laurylthiopropionate (trade name: Seenox 412S, from Shipro Chemical, Co.)

Hindered Amine Type Stabilizers

H: Bis(2,2,6,6-tetramethyl-4-piperidyl) sebacate (trade name; Sanol LS770, from Sankyo, Co.)
I: Poly[[6-(1,1,3,3-tetramethylbutyl)imino-1,3,5-triazane-2,4-diyl][(2,2,6,6,-tetramethyl-4-piperidyl)imino]hexamethylene[(2,2,6,6-tetramethyl-4-piperidyl)imino]] (trade name: Chimassorb 944LD, from Nippon Ciba Geigy, Co.)

Metal Salts of Higher Aliphatic Acid

J: Calcium stearate
K: Calcium 12-hydroxystearate
L: Magnesium Stearate
M: Calcium motanate

TABLE 4

| | MFR | | Resistance to heat aging | Weathering resistance |
|---|---|---|---|---|
| | Pellet | Film | (day) | (%) |
| Ex. 15 | 10.0 | 10.5 | 30 | 20 |
| Ex. 16 | 10.0 | 11.0 | 28 | 20 |
| Ex. 17 | 10.0 | 11.0 | 30 | 25 |
| Ex. 18 | 10.0 | 10.5 | 26 | 20 |
| Ex. 19 | 10.0 | 11.0 | 28 | 25 |
| Ex. 20 | 10.0 | 11.0 | 30 | 30 |
| Ex. 21 | 10.0 | 10.5 | 35 | 30 |
| Ex. 22 | 10.0 | 10.0 | 35 | 30 |
| Ex. 23 | 10.0 | 11.0 | 70 | 25 |
| Ex. 24 | 10.0 | 10.5 | 80 | 30 |
| Ex. 25 | 10.0 | 10.5 | 100 | 25 |
| Ex. 26 | 10.0 | 11.0 | 120 | 25 |
| Ex. 27 | 10.0 | 10.0 | 120 | 35 |
| Ex. 28 | 10.0 | 10.0 | 120 | 30 |
| Ex. 29 | 10.0 | 11.5 | 45 | 20 |
| Ex. 30 | 10.0 | 11.5 | 50 | 25 |
| Ex. 31 | 10.0 | 12.0 | 50 | 25 |

TABLE 4-continued

| | MFR | | Resistance to heat aging | Weathering resistance |
|---|---|---|---|---|
| | Pellet | Film | (day) | (%) |
| Ex. 32 | 10.0 | 11.5 | 50 | 25 |
| Ex. 33 | 10.0 | 12.5 | 55 | 30 |
| Ex. 34 | 10.0 | 11.0 | 55 | 30 |
| Ex. 35 | 10.0 | 10.5 | 70 | 40 |
| Ex. 36 | 10.0 | 13.0 | 150 | 50 |
| Ex. 37 | 10.0 | 12.0 | 220 | 55 |
| Ex. 38 | 10.0 | 12.0 | 250 | 70 |
| Ex. 39 | 10.0 | 12.0 | 25 | 25 |
| Ex. 40 | 10.0 | 12.5 | 25 | 25 |
| Ex. 41 | 10.0 | 13.0 | 30 | 25 |
| Ex. 42 | 10.0 | 13.5 | 25 | 25 |
| Ex. 43 | 10.0 | 11.5 | 35 | 30 |
| Ex. 44 | 10.0 | 11.5 | 40 | 35 |
| Ex. 45 | 10.0 | 12.0 | 35 | 30 |
| Comp. Ex. 7 | 15.0 | 29.0 | 13 | 10 |

What is claimed is:

1. A process for preparing a propylene polymer having a crystallinity of not less than 60%, which comprises polymerizing propylene in the presence of a catalyst for olefin polymerization comprising:

(I) a prepolymerized catalyst obtained by prepolymerizing at least one reactive monomer represented by the following formula (i) or (ii) using (a) a solid titanium catalyst component containing magnesium, titanium, halogen and an electron donor as essential components, (b) an organometallic catalyst component and an organosilicon compound represented by the following formula (c-i)

$$R_nSi(OR')_{4-n} \quad (c\text{-}i)$$

wherein each of R and R' is a hydrocarbon group, and n is a number satisfying the condition of 0>n>4, said reactive monomer being prepolymerized in an amount of 0.1 to 1,000 g per 1 g of the solid titanium catalyst component (a);

$$H_2C=CH-X \quad (i)$$

$$H_2C=CH-CH_2-X \quad (ii)$$

wherein X is a cycloalkyl group, an aryl group or

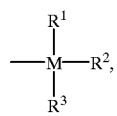

M is carbon or silicon, $R^1$ and $R^2$ are each a hydrocarbon group, and $R^3$ is hydrogen or a hydrocarbon group;

(II) the organometallic catalyst component (b); and (III) a silicon compound represented by the following formula (iii) or a compound having at least two ether linkages existing via plurality of atoms:

$$R^a_n\text{—Si—}(OR^b)_{4-n} \quad (iii)$$

wherein, n is 1, 2 or 3; when n is 1, $R^a$ is a cyclopentyl group which may have a substituent group or a tertiary hydrocarbon group; when n is 2 or 3, at least one of Ra is the cyclopentyl group which may have a substituent group or a tertiary hydrocarbon group, Ra may be the same or different, and $R^b$ is a hydrocarbon group of 1 to 4 carbon atoms; and when 4−n is 2 or 3, $R^b$ may be the same or different;

in said process, propylene being polymerized in an amount of 3,000 to 1,000,000 g per 1 g of the solid titanium catalyst component (a) contained in the prepolymerized catalyst.

2. A process for preparing a propylene polymer, which comprises preparing a propylene polymer having an intrinsic viscosity (η) of 3 to 40 dl/g in an amount of 0.1 to 55% by weight based on the amount of the resulting polymer using one or more polymerizers out of two or more polymerizers and then further preparing a propylene polymer using the residual polymerizers in the presence of the propylene polymer produced in the previous polymerization stages, in the presence of a catalyst for olefin polymerization comprising:

(I) a prepolymerized catalyst obtained by prepolymerizing at least one reactive monomer represented by the following formula (i) or (ii) using (a) a solid titanium catalyst component containing magnesium, titanium, halogen and an electron donor as essential components, (b) an organometallic catalyst component and an organosilicon compound represented by the following formula (c-i)

$$R_nSi(OR')_{4-n} \quad (c\text{-}i)$$

wherein each of R and R' is a hydrocarbon group, and n is a number satisfying the condition of 0>n>4, said reactive monomer being prepolymerized in an amount of 0.1 to 1,000 g per 1 g of the solid titanium catalyst component (a);

$$H_2C=CH-X \quad (i)$$

$$H_2C=CH-CH_2-X \quad (ii)$$

X is a cycloalkyl group, an aryl group or

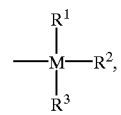

M is carbon or silicon, $R^1$ and $R^2$ are each a hydrocarbon group, and $R^3$ is hydrogen or a hydrocarbon group;

(II) the organometallic catalyst component (b); and (III) a silicon compound represented by the following formula (iii) or a compound having at least two ether linkages existing via plurality of atoms:

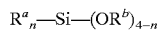
 (iii)

wherein, n is 1, 2 or 3; when n is 1, is a secondary or a tertiary hydrocarbon group; when n is 2 or 3, at least one of Ra is a secondary or a tertiary hydrocarbon group, Ra may be the same or different, and $R^b$ is a hydrocarbon group of 1 to 4 carbon atoms; and when 4−n is 2 or 3, $R^b$ may be the same or different;

the propylene polymer obtained by said process satisfying the following requisites:

(a) a crystallinity of said polymer is not less than 60%, (b) a melt flow rate of said polymer at 230° C. is in the range of 0.1 to 500 g/10 min, and (c) said polymer is a propylene in an amount of 3,000 to 100,000 g per 1 g of the solid titanium catalyst component (a) contained in the prepolymerized catalyst.

3. The process as claimed in claim 1, wherein, in formula (iii), n is 2, $R^a$ is unsubstituted cyclopentyl group or tertiary hydrocarbon group, and $R^b$ is a methyl group.

* * * * *

UNITED STATES PATENT AND TRADEMARK OFFICE
CERTIFICATE OF CORRECTION

PATENT NO. : 6,630,559 B2
DATED : October 7, 2003
INVENTOR(S) : Tetsunori Shinozaki et al.

It is certified that error appears in the above-identified patent and that said Letters Patent is hereby corrected as shown below:

<u>Title page,</u>
Item [73], change "[73] Assignee: Mitsui Chismicans, Inc." to
-- [73] Assignee: Mitsui Chemicals, Inc. --

Signed and Sealed this

Thirtieth Day of December, 2003

JAMES E. ROGAN
*Director of the United States Patent and Trademark Office*